US012689502B2

(12) United States Patent
Lim et al.

(10) Patent No.: US 12,689,502 B2
(45) Date of Patent: \*Jul. 21, 2026

(54) METHOD BY WHICH DEVICE SHARES DIGITAL KEY

(71) Applicant: Samsung Electronics Co., Ltd., Gyeonggi-do (KR)

(72) Inventors: Taehyung Lim, Gyeonggi-do (KR); Sooyeon Jung, Gyeonggi-do (KR); Inyoung Shin, Gyeonggi-do (KR); Duckey Lee, Gyeonggi-do (KR); Hyewon Lee, Gyeonggi-do (KR); Jonghyo Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 61 days.

This patent is subject to a terminal disclaimer.

(21) Appl. No.: 18/816,682

(22) Filed: Aug. 27, 2024

(65) Prior Publication Data

US 2024/0421984 A1 Dec. 19, 2024

Related U.S. Application Data

(63) Continuation of application No. 17/295,344, filed as application No. PCT/KR2019/014482 on Oct. 30, 2019, now Pat. No. 12,088,700.

(30) Foreign Application Priority Data

Nov. 20, 2018 (KR) ........................ 10-2018-0143914
Jan. 17, 2019 (KR) ........................ 10-2019-0006454

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/088* (2013.01); *H04L 9/3247* (2013.01)

(58) Field of Classification Search
CPC ....... H04L 9/085; H04L 9/0825; H04L 9/088; H04L 9/3247; H04L 9/0894;
(Continued)

(56) References Cited

U.S. PATENT DOCUMENTS 9,331,989 B2 5/2016 Dover
9,384,613 B2 7/2016 Vasquez
(Continued)

FOREIGN PATENT DOCUMENTS

KR 1020100063156 6/2010
KR 1020130047803 5/2013
(Continued)

OTHER PUBLICATIONS

International Search Report dated Feb. 5, 2020 issued in counterpart application No. PCT/KR2019/014482, 17 pages.
(Continued)

*Primary Examiner* — Quazi Farooqui
(74) *Attorney, Agent, or Firm* — The Farrell Law Firm, P.C.

(57) ABSTRACT

Provided is a method of sharing a digital key between devices, and a method, performed by an owner device in a wireless communication system, including transmitting, to a friend device, key configuration data, receiving, from the friend device, certification information signed by a private key of the friend device, the certification information including a public key of the friend device, generating a key attestation based on the certification information and the key configuration data, and transmitting, to the friend device, information including the key attestation.

20 Claims, 35 Drawing Sheets

(58) Field of Classification Search
CPC ........ H04L 2209/84; H04L 9/08; H04W 4/40;
H04W 4/80; H04W 12/04; H04W 12/108
See application file for complete search history.

(56) References Cited

U.S. PATENT DOCUMENTS

| | | | |
|---|---|---|---|
| 2004/0243812 | A1 | 12/2004 | Yui et al. |
| 2010/0098248 | A1 | 4/2010 | Anantharaman |
| 2017/0124356 | A1* | 5/2017 | Allyn .................... H04L 9/3297 |
| 2018/0139612 | A1 | 5/2018 | Rhelimi |
| 2018/0213405 | A1 | 7/2018 | Jung et al. |
| 2018/0330079 | A1 | 11/2018 | Gray |
| 2020/0052905 | A1* | 2/2020 | Mathias ................ H04L 9/0861 |

FOREIGN PATENT DOCUMENTS

| | | |
|---|---|---|
| KR | 1020180086118 | 7/2018 |
| WO | WO 2018/160863 | 9/2018 |

OTHER PUBLICATIONS

Korean Office Action dated Apr. 29, 2025 issued in counterpart application No. 10-2019-0006454, 6 pages.
Korean Office Action dated Mar. 25, 2026 issued in counterpart application No. 10-2019-0006454, 11 pages.

\* cited by examiner

| | |
|---|---|
| RECEIVE PUBLIC KEY GENERATED BY TARGET DEVICE | — S410 |
| GENERATE DIGITAL KEY INCLUDING DATA INCLUDING PUBLIC KEY, AND SIGNATURE REGARDING DATA | — S420 |
| TRANSMIT DIGITAL KEY TO TARGET DEVICE | — S430 |

| | |
|---|---|
| TRANSMIT PUBLIC KEY TO OWNER DEVICE | — S510 |
| RECEIVE DIGITAL KEY INCLUDING PUBLIC KEY FROM OWNER DEVICE | — S520 |
| CONTROL ELECTRONIC DEVICE BY USING DIGITAL KEY | — S530 |

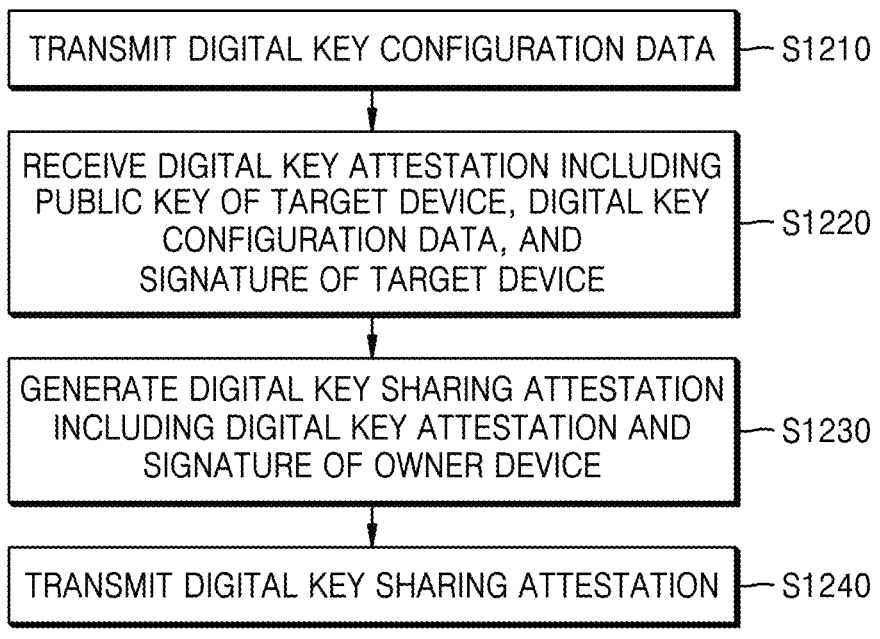

| TRANSMIT DIGITAL KEY CONFIGURATION DATA | S1210 |

| RECEIVE DIGITAL KEY ATTESTATION INCLUDING PUBLIC KEY OF TARGET DEVICE, DIGITAL KEY CONFIGURATION DATA, AND SIGNATURE OF TARGET DEVICE | S1220 |

| GENERATE DIGITAL KEY SHARING ATTESTATION INCLUDING DIGITAL KEY ATTESTATION AND SIGNATURE OF OWNER DEVICE | S1230 |

| TRANSMIT DIGITAL KEY SHARING ATTESTATION | S1240 |

FIG. 13

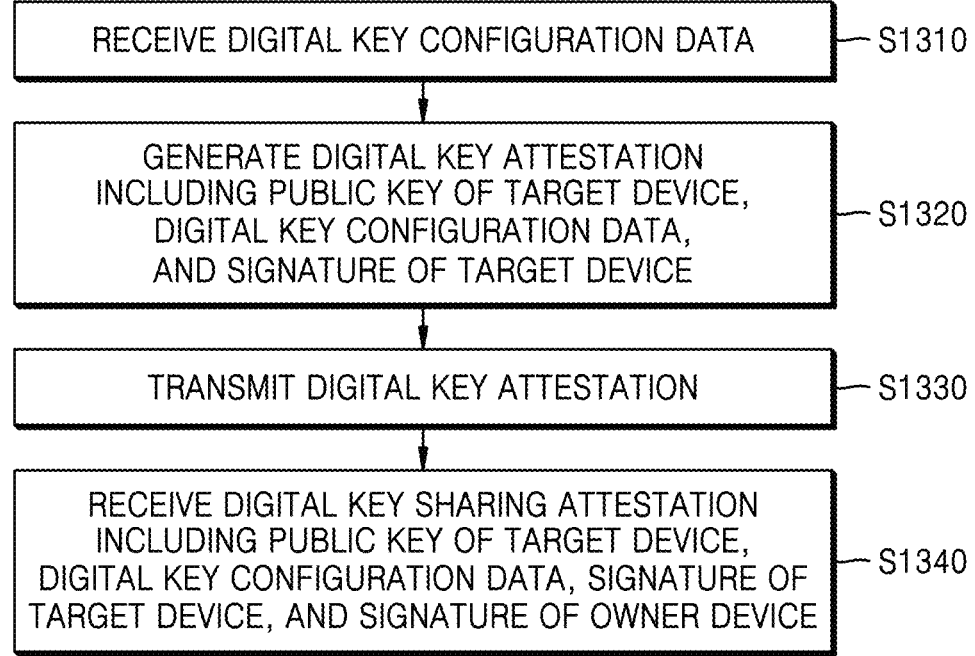

| RECEIVE DIGITAL KEY CONFIGURATION DATA | S1310 |

| GENERATE DIGITAL KEY ATTESTATION INCLUDING PUBLIC KEY OF TARGET DEVICE, DIGITAL KEY CONFIGURATION DATA, AND SIGNATURE OF TARGET DEVICE | S1320 |

| TRANSMIT DIGITAL KEY ATTESTATION | S1330 |

| RECEIVE DIGITAL KEY SHARING ATTESTATION INCLUDING PUBLIC KEY OF TARGET DEVICE, DIGITAL KEY CONFIGURATION DATA, SIGNATURE OF TARGET DEVICE, AND SIGNATURE OF OWNER DEVICE | S1340 |

S1490
DK Verified Attestation

S1470
DK Creation Attestation

Backend Server     220

Service Provider     210

Backend Server     230

– Verify DK Creation Attestation
– Generate DK Verified Attestation
S1480

100

Owner Device

300

Target Device

– Verify DK Verified Attestation
– Generate DK Sharing Attestation
S14100

S1580
DK Creation Attestation

Backend Server

220

Service Provider

210

Backend Server

230

S1570
DK Creation Attestation

100
Owner Device

300
Target Device

- Verify DK Creation Attestation
- Generate DK Sharing Attestation
S1590

METHOD BY WHICH DEVICE SHARES DIGITAL KEY

PRIORITY

This application is a Continuation Applications of U.S. patent application Ser. No. 17/295,344, which was filed in the U.S. Patent and Trademark Office on May 19, 2021, which is a National Phase Entry of PCT International Application No. PCT/KR2019/014482, which was filed on Oct. 30, 2019, and claims priority to Korean Patent Application Nos. 10-2018-0143914 and 10-2019-0006454, which were filed on Nov. 20, 2018, and Jan. 17, 2019, respectively, the entire content of each of which is incorporated herein by reference.

TECHNICAL FIELD

The present disclosure relates to a method of sharing a digital key between devices.

BACKGROUND ART

With the supply of personalized electronic devices, such as smart phones and tablet personal computers (PCs), technologies for performing security, authentication, and the like using digitized virtual keys (i.e., digital keys) have been developed. As one method of digital key technology, a technology of integrating a digital key to a mobile device, for example, a smart phone, by using a wireless communication technology, such as near field communication (NFC), is being developed.

As the digital key is inserted into the mobile device, a user of the mobile device may open or close a door by using the digital key instead of a physical key. Also, a function of the digital key is further extended such that the user of the mobile device may use the digital key to access a device or control the device.

The use of a digital key can bring great improvements in user convenience and industrial effects, but concerns regarding security have also been raised. Due to characteristics of the digital key that needs to be combined with an electronic device, the digital key may be exposed to a risk, such as hacking with respect to the electronic device. Accordingly, processing of the digital key with a high security level is necessary.

SUMMARY

Provided is a method of enabling more convenient and safe sharing with respect to sharing a digital key between devices.

According to an embodiment of the present disclosure, a method, performed by an owner device, of transmitting a digital key to a target device, includes: receiving, from a service provider server via a first backend server, a public key generated by the target device; generating the digital key including data including the public key, and a signature regarding the data; and transmitting the digital key to the target device via the first backend server and the service provider server.

According to an embodiment of the present disclosure, a method, performed by a target device, of receiving a digital key from an owner device, includes: transmitting a public key to the owner device via a first backend server, a service provider server, and a second backend server; receiving, from the owner device, the digital key including data including the public key, and a signature of the owner device regarding the data; and controlling an electronic device over which the owner device has control authority, by using the digital key.

According to an embodiment of the present disclosure, an owner device for transmitting, to a target device, a digital key for enabling the target device to control an electronic device over which the owner device has control authority, includes: a communicator configured to receive, from a service provider server via a first backend server, a public key generated by the target device; and at least one processor configured to generate a digital key including data including the public key, and a signature regarding the data, wherein the communicator is further configured to transmit the digital key to the target device via the first backend server and the service provider server.

According to an embodiment of the disclosure, a target device for receiving, from an owner device, a digital key for controlling an electronic device over which the owner device has control authority, includes: a communicator configured to transmit a public key to the owner device via a first backend server, a service provider server, and a second backend server, and receive, from the owner device, a digital key including data including the public key, and a signature of the owner device regarding the data; and at least one processor configured to control the electronic device over which the owner device has the control authority, by using the digital key.

According to an embodiment of the present disclosure, a method, performed by a service provider server, of transmitting a digital key to a target device, includes: transmitting a first public key of the service provider server to an owner device via a first backend server; receiving, from the owner device, first data including the first public key and an attestation including a signature of the owner device regarding the first data; transmitting a fourth identification (ID) to the owner device; receiving, from the target device via the second backend server, the fourth ID and a second public key of the target device; generating the digital key including second data including the second public key, and a signature regarding the second data; and transmitting the digital key to the target device via the second backend server.

According to an embodiment of the present disclosure, a method, performed by a target device, of receiving a digital key form a service provider server, includes: receiving an identification (ID) from an owner device; transmitting the ID and a public key of the target device to the service provider server via a backend server, based on the ID; receiving, from the service provider server via the backend server, data including the public key and the digital key including a signature of the service provider server regarding the data; and controlling an electronic device over which the owner device has control authority, by using the digital key.

According to an embodiment of the present disclosure, a method, performed by an owner device, of transmitting a digital key to a target device, includes: transmitting digital key configuration data; receiving a digital key attestation including a public key of the target device, the digital key configuration data, and a signature of the target device; generating a digital key sharing attestation including the public key of the target device, the digital key configuration data, the signature of the target device, and a signature of the owner device; and transmitting the digital key sharing attestation.

According to an embodiment of the present disclosure, a method, performed by a target device, of receiving a digital key from an owner device, includes: receiving digital key configuration data; generating a digital key attestation including a public key of the target device, the digital key configuration data, and a signature of the target device; transmitting the digital key attestation; and receiving a digital key sharing attestation including the public key of the target device, the digital key configuration data, the signature of the target device, and a signature of the owner device.

According to an embodiment of the present disclosure, an owner device for transmitting, to a target device, a digital key enabling the target device to control an electronic device over which the owner device has control authority, includes: a communicator configured to transmit digital key configuration data, and receive a digital key attestation including a public key of the target device, the digital key configuration data, and a signature of the target device; and at least one processor configured to generate a digital key sharing attestation including the public key of the target device, the digital key configuration data, the signature of the target device, and a signature of the owner device, wherein the communicator is further configured to transmit the digital key sharing attestation.

According to an embodiment of the present disclosure, a target device for receiving, from an owner device, a digital key for controlling an electronic device over which the owner device has control authority, includes: a communicator configured to receive a digital key configuration data; and at least one processor configured to generate a digital key attestation including a public key of the target device, the digital key configuration data, and a signature of the target device, wherein the communicator is further configured to transmit the digital key attestation and receive a digital key sharing attestation including the public key of the target device, the digital key configuration data, the signature of the target device, and a signature of the owner device.

BRIEF DESCRIPTION OF DRAWINGS

FIGS. 9A through 9D are diagrams for describing a digital key sharing method according to an embodiment.

FIGS. 10A through 10C are diagrams for describing a digital key sharing method according to an embodiment.

FIGS. 11A through 11C are diagrams for describing a digital key sharing method according to an embodiment.

FIG. 12 is a flowchart of a method, performed by an owner device, of transmitting a digital key to a target device, according to an embodiment.

FIG. 13 is a flowchart of a method, performed by a target device, of receiving a digital key from an owner device, according to an embodiment.

DETAILED DESCRIPTION

Figure 1:
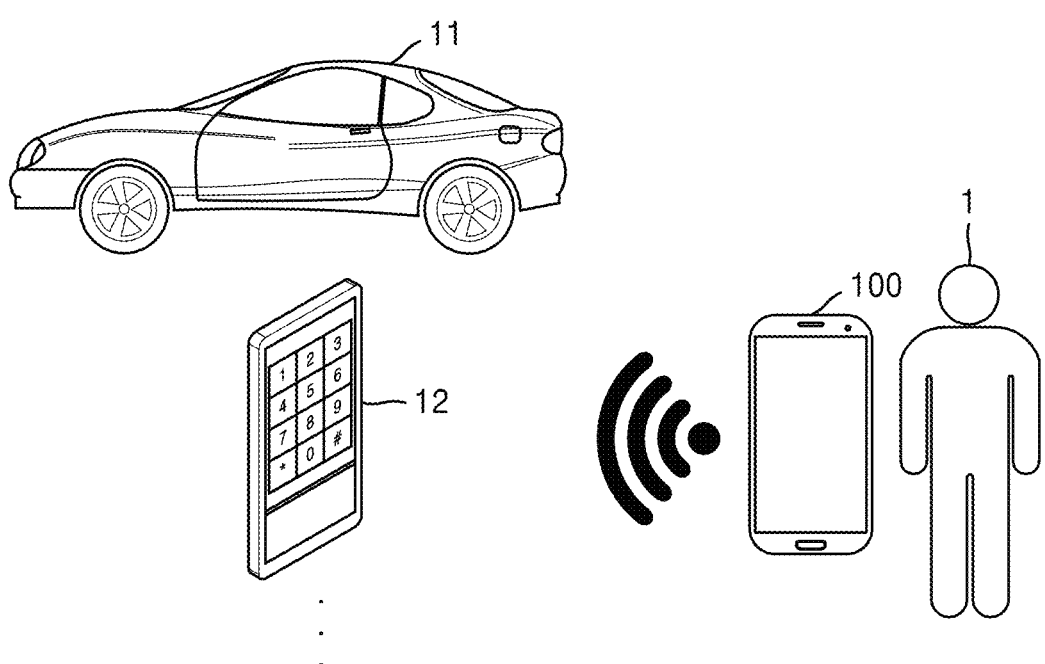
FIG. 1 is a diagram for describing the use of a digital key.

According to an embodiment of the present disclosure, a method, performed by an owner device, of transmitting a digital key to a target device, includes: receiving, from a service provider server via a first backend server, a public key generated by the target device; generating the digital key including data including the public key, and a signature regarding the data; and transmitting the digital key to the target device via the first backend server and the service provider server.

Hereinafter, embodiments of the present disclosure will be described in detail with reference to the accompanying drawings such that one of ordinary skill in the art may easily implement the present disclosure. However, the present disclosure may be implemented in various different forms and is not limited to the embodiments described herein. Also, in the drawings, parts irrelevant to the description are omitted in order to clearly describe the present disclosure, and like reference numerals designate like elements throughout the specification.

Some embodiments of the present disclosure may be represented by functional block configurations and various processing operations. Some or all of these functional blocks may be implemented by various numbers of hardware and/or software configurations that perform particular functions. For example, the functional blocks of the present disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the present disclosure may employ conventional techniques for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, the present disclosure will be described in detail with reference to accompanying drawings.

FIG. 1 is a diagram for describing the use of a digital key.

FIG. 1 illustrates an owner device 100, a user 1 of the owner device 100, and electronic devices 11 and 12 for performing control and access by using a digital key loaded in the owner device 100.

The owner device 100 may include a personalized mobile device, but is not limited thereto and may include various types of electronic devices. For example, the owner device 100 may include a smart phone, a tablet personal computer (PC), a PC, a camera, or a wearable device. The owner device 100 may perform processes of generating, deleting, and managing the digital key for accessing the electronic devices 11 and 12 and controlling the electronic devices 11 and 12, and perform authentication on the digital key.

The electronic devices 11 and 12 may interwork with the owner device 100 to perform an operation for generating the digital key and may be controlled and accessed by using the digital key.

For example, the owner device 100 may store the digital key for interworking with the electronic device 11 mounted on a vehicle. The owner device 100 may control various operations of the vehicle by using the stored digital key. For example, the owner device 100 may use the digital key to open or close a door of the vehicle, start an engine, or control various devices mounted on the vehicle. In addition, an operation related to autonomous driving, such as an automatic parking system, may be controlled.

As another example, the owner device 100 may store the digital key for interworking with a door lock 12. The owner device 100 may open or close a door by using the stored digital key.

An electronic device controllable by the owner device 100 by using the digital key is not limited to examples shown in FIG. 1, and a digital key technology may be applied to various electronic devices. Hereinafter, for convenience of description, an example in which the owner device 100 interworks with the electronic device 11 mounted on the vehicle will be described. However, the following description may be applied to a case where the owner device 100 interworks with various electronic devices other than the electronic device 11 of the vehicle.

Figure 2:
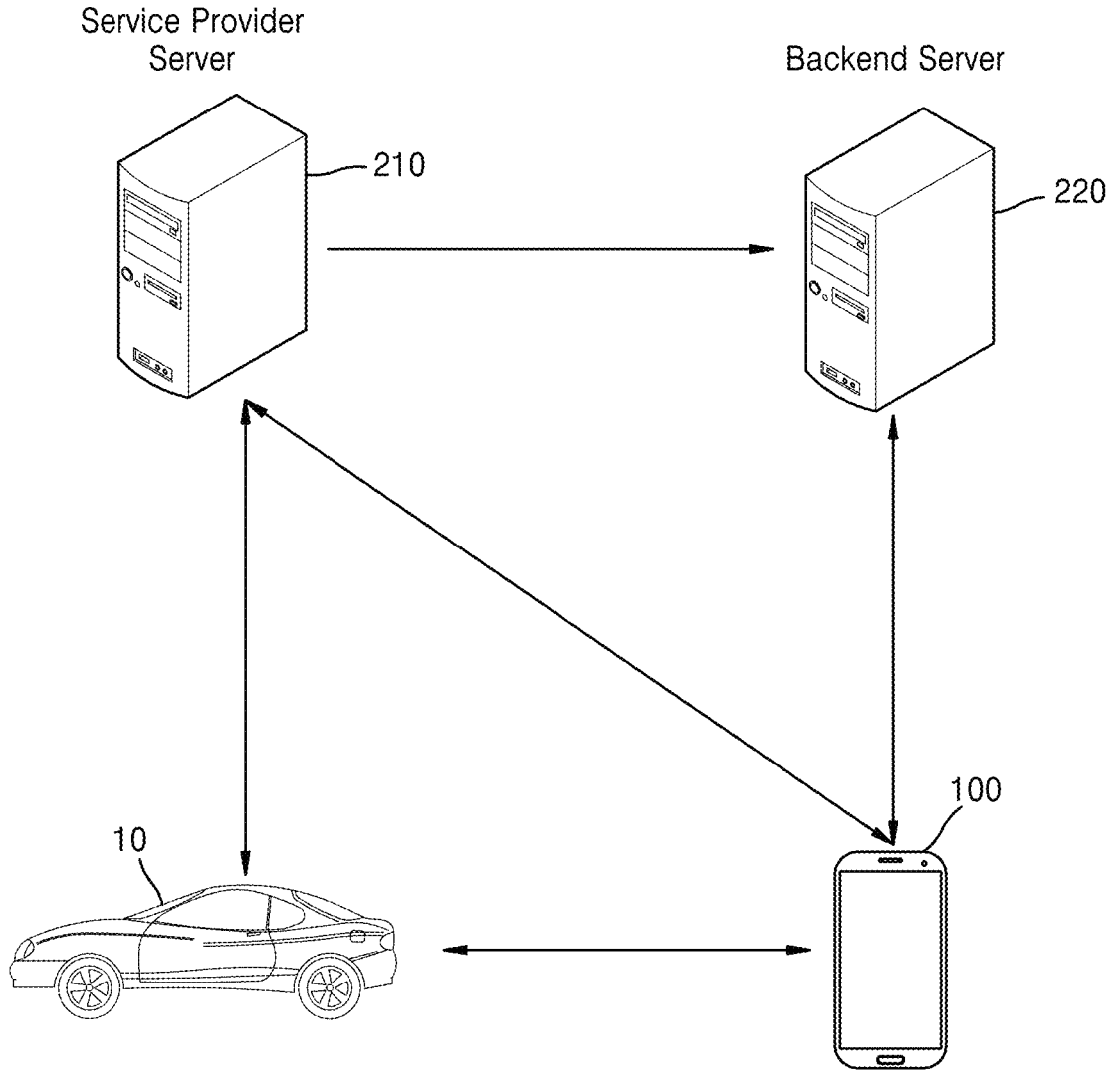
FIG. 2 is a diagram for describing a system for realizing a service using a digital key.

FIG. 2 is a diagram for describing a system for realizing a service using a digital key.

FIG. 2 illustrates a service provider server 210, a backend server 220, the owner device 100, and an electronic device 10. In FIG. 2, an example in which the electronic device 10 is an electronic device mounted on a vehicle is illustrated, but an embodiment is not limited thereto and the electronic device 10 may include various devices capable of being accessed and controlled by a digital key.

The service provider server 210 is a server operated by a service provider who is to provide a digital key service to a user. The service provider denotes, for example, an operator who provides a service related to a vehicle, a hotel, a house, a building, or the like, and may provide the digital key service to the user as an additional service according to a main service. For example, a vehicle company sells vehicles and a hotel, house, or building company provides hotel, house, building-related services. For example, the service provider server may be operated by the vehicle company. For example, the service provider server may provide the digital key service for an access function, such as opening or closing a door, starting an engine, or controlling.

The service provider server 210 may include a user information database including user account information such as identification (ID) or password of the user, or sales product or service information. For example, the vehicle company may store, when selling a vehicle, information about ID and password of the user, an ID number of the sold vehicle, and whether the digital key service is used.

The backend server 220 provides a technology and service for safely issuing and storing the digital key to the owner device 100. The backend server 220 may be, for example, a server operated by a manufacturer of the owner device 100, a server operated by a mobile carrier providing a mobile communication service, or a server operated by a service providing dealer providing a digital key service.

For example, when the user purchases a vehicle and wants to store a digital key of the vehicle in the owner device 100, an authentication procedure may be performed between the service provider server 210 and the owner device 100. After the authentication procedure of determining whether the user is a valid user and whether the vehicle is a valid vehicle is completed, the owner device 100 may generate the digital key, store the digital key, and manage the stored digital key.

The electronic device 10 is an entity corresponding to a product and service sold by the service provider to the user. For example, the electronic device 10 may include a door of a vehicle, hotel, house, building, or the like. In particular, the electronic device 10 may include not only a door, trunk door, or a gas tank cover of the vehicle, but also an access gate for starting or controlling the vehicle.

The present disclosure provides a method, performed by the owner device 100, of issuing a digital key for using the electronic device 10 over which the owner device 100 has control authority, and sharing a digital key issued to another device.

When a user of the owner device 100 is to issue a digital key for using his/her property (for example, a vehicle) and transmit the digital key to a friend's device, a following general method may be used.

According to the general method, an original equipment manufacturer (OEM) (for example, a vehicle manufacturer) that produced the property may operate a backend server, the user and the friend may join the backend server of the OEM, and the digital key may be shared between the owner device 100 and the friend's device by using a function provided by the backend server of the OEM. According to such a general method, it is necessary for the user and the friend to join the backend server of the OEM (for example, a web portal of the vehicle manufacturer), and the user may be inconvenienced by having to manage a separate account according to manufacturers of properties.

Accordingly, hereinafter, an efficient method enabling the user and the friend to further conveniently share the digital key is proposed.

Figure 3:
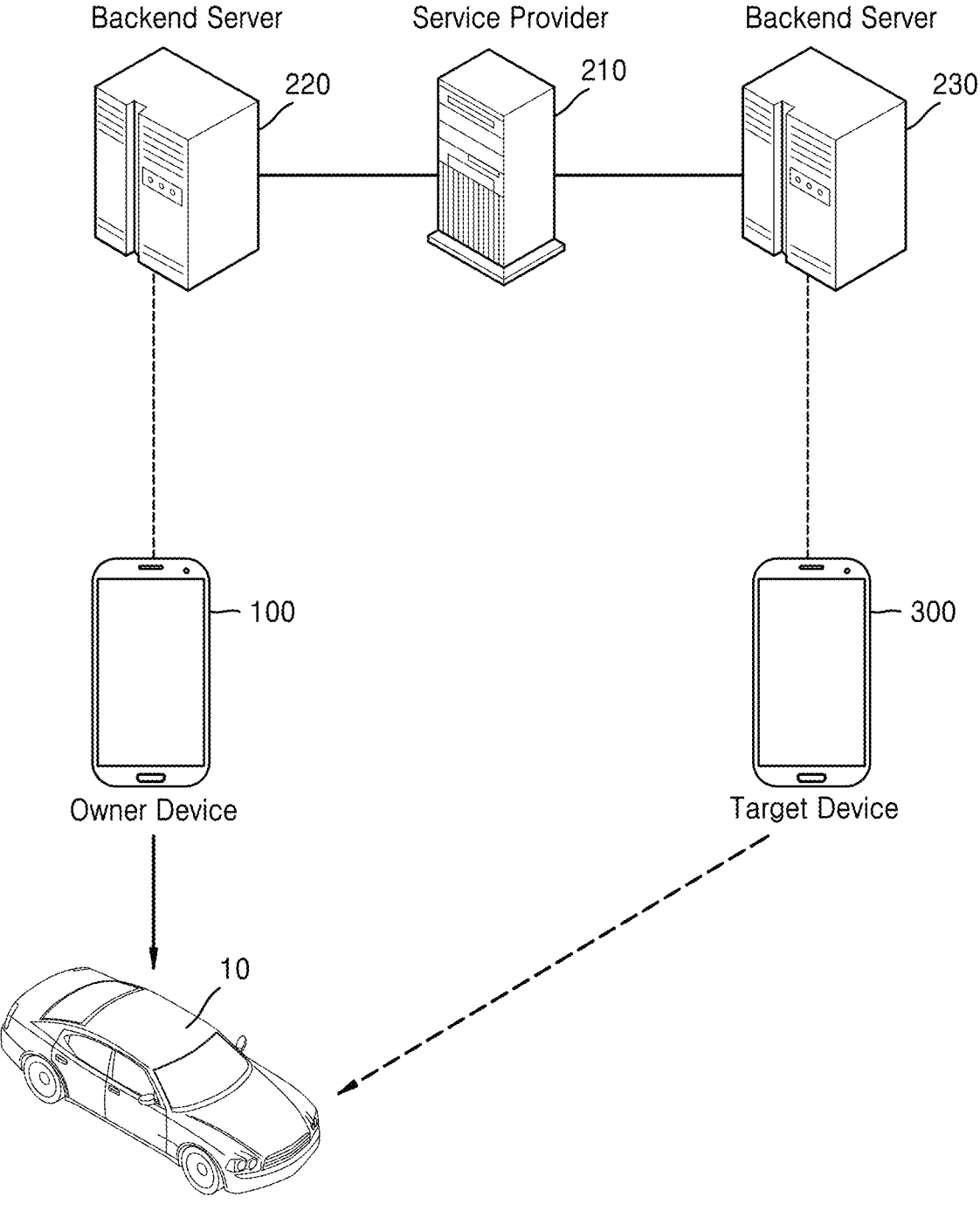
FIG. 3 is a diagram for describing a system for sharing a digital key, according to various embodiments.

FIG. 3 is a diagram for describing a system for sharing a digital key, according to various embodiments of the present disclosure. FIG. 3 illustrates an architecture of the system according to various embodiments of the present disclosure. The system of FIG. 3 may include the owner device 100, the first backend server 220, the service provider server 210, a second backend server 230, and a target device 300.

The owner device 100 of FIG. 3 may be a terminal apparatus of the first backend server 220 and a subject that is to issue a digital key and transmit the digital key to the target device. The target device 300 may be a terminal apparatus of the second backend server 230 and a subject that is to receive the digital key. For example, the user of the owner device 100 may share the digital key with the target device 300 owned by the friend so as to lend a vehicle of the user to the friend.

The service provider server 210 may be a backend server operated by a manufacturer of a property (for example, the vehicle) corresponding to the digital key to be shared between the owner device 100 and the target device 300, or a backend server operated by an arbitrary service provider associated with the manufacturer. For example, the service provider server 210 may be a server of the vehicle manufacturer. Alternatively, the service provider server 210 may be a backend server operated by a manufacturer of an electronic device (for example, an electronic device mounted on the vehicle) corresponding to the digital key to be shared between the owner device 100 and the target device 300, or a backend server operated by an arbitrary service provider associated with the manufacturer.

The first backend server 220 may be a server operated by a manufacturer of the owner device 100 (hereinafter, also referred to as a device OEM A) and the second backend server 230 may be a server operated by a manufacturer of the target device 300 (hereinafter, also referred to as a device OEM B). The manufacturer of the owner device 100 and the manufacturer of the target device 300 may be the same or different from each other.

Hereinafter, various embodiments of the present disclosure to be described are proposed under following two assumptions.

1) Assumption 1: A reliability relationship is established between the first backend server 220 (or the second backend server 230) and the service provider server 210. In other words, there is a mutual contract for providing a digital key service between the device OEM A (or the device OEM B) and a service provider.

2) Assumption 2: A device OEM is able to authenticate identity of a terminal manufactured by the device OEM. For example, the device OEM A may specify the owner device 100 and the device OEM B may specify the target device 300.

According to various embodiments of the disclosure, there may be various methods, performed by the owner device 100, of issuing, to the target device 300, authority (i.e., a digital key) for using the electronic device 10 over which the owner device 100 has control authority.

A method proposed in some embodiments among the various embodiments of the present disclosure may include following two operations.

1) The target device 300 generates a public key and transmits the generated public key to the owner device 100.

2) The owner device 100 generates a digital key of the target device 300 and transmits the generated digital key to the target device 300.

The owner device 100 may generate the digital key of the target device 300 by signing a series data including the public key of the target device 300 by using a private key of the owner device 100. The digital key of the target device 300 may have a data structure in which the public key of the target device 300, the series of data, and a signature of the owner device 100 are combined.

The series of data included in the digital key of the target device 300 may include various types of information related to use of the digital key. For example, the series of data may include a range of functions of the electronic device 10 available to the target device 300 by the digital key, additional shareability of the digital key, and a validity period of the digital key.

When the electronic device 10 is an electronic device mounted on a vehicle and the target device 300 is authorized to access and control the vehicle by using the digital key, the digital key of the target device 300 may include information about a range of functions of the vehicle available to the target device 300 by using the digital key. For example, the series of data included in the digital key may include information about whether the target device 300 is able to open or close a door of the vehicle, whether the target device 300 is able to open or close a door of a trunk, and/or whether the target device 300 is able to start an engine, by using the digital key. Also, the series of data included in the digital key may include information about whether the target device 300 is able to share the digital key received from the owner device 100 with a third terminal device, information about a region drivable by the vehicle when the target device 300 controls the vehicle by using the digital key (for example, a geo fence indicating a virtual parameter set to indicate a drivable region), and/or information related to a speed of the vehicle when the target device 300 controls driving of the vehicle by using the digital key (for example, a maximum speed drivable by the vehicle under control of the target device 300 or a threshold speed generating a continuous alarm sound when the vehicle exceeds the threshold speed).

Meanwhile, another method proposed in some embodiments among the various embodiments of the present disclosure may include following three operations.

1) The owner device 100 requests the service provider server 210 for key sharing, and authorizes the service provider server 210 to issue the digital key of the target device 300.

2) The target device 300 generates a public key and transmits the generated public key to the service provider server 210.

3) The service provider server 210 generates the digital key of the target device 300 and transmits the generated digital key to the target device 300.

The service provider server 210 may generate the digital key of the target device 300 by signing a series data including the public key of the target device 300 by using a private key of the service provider server 210. The digital key of the target device 300 may have a data structure in which the public key of the target device 300, the series of data, and a signature of the service provider server 210 are combined.

The series of data included in the digital key of the target device 300 may include various types of information related to use of the digital key. For example, the series of data may include a range of functions of the electronic device 10 available to the target device 300 by the digital key and a validity period of the digital key. The series of data may be transmitted when the owner device 100 requests the service provider server 210 for key sharing or may be set by the service provider server 210.

When the electronic device 10 is an electronic device mounted on a vehicle and the target device 300 is authorized to access and control the vehicle by using the digital key, the digital key of the target device 300 may include information about a range of functions of the vehicle available to the target device 300 by using the digital key. For example, the series of data included in the digital key may include information about whether the target device 300 is able to open or close a door of the vehicle, whether the target device 300 is able to open or close a door of a trunk, and whether the target device 300 is able to start an engine, by using the digital key.

In the present disclosure for convenience of description, a public key may be denoted as PK, a private key may be denoted as SK, and a digital key may be denoted as DK.

Hereinafter, a method, performed by the owner device 100, of generating the digital key and transmitting the digital key to the target device 300, and a method, performed by the target device 300, of receiving the digital key from the owner device 100, according to some embodiments of the present disclosure, will be described in detail with reference to FIGS. 4 and 5.

Figure 4:
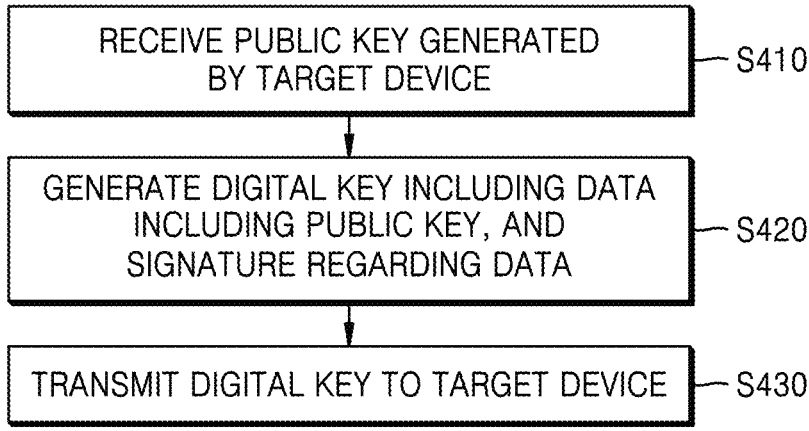
FIG. 4 is a flowchart of a method, performed by an owner device, of transmitting a digital key to a target device, according to an embodiment.

FIG. 4 is a flowchart of a method, performed by an owner device, of transmitting a digital key to a target device, according to some embodiments.

The owner device 100 according to an embodiment may transmit, to the target device 300, the digital key for controlling the electronic device 10 over which the owner device 100 has the control authority.

In operation S410, the owner device 100 according to an embodiment may receive the public key generated by the target device 300 from the service provider server 210 via the first backend server 220.

In operation S420, the owner device 100 according to an embodiment may generate a digital key including data including the public key received in operation S410, and a signature regarding the data.

The digital key may be for assigning the control authority to the target device 300 for the electronic device 10 over which the owner device 100 has the control authority. The data included in the digital key may include the public key of the target device 300 and further include at least one of a range of the control authority assigned to the target device 300 and a validity period of the digital key.

In operation S430, the owner device 100 according to an embodiment may transmit the digital key generated in operation S420 to the target device 300 via the first backend server 220 and the service provider server 210.

According to an embodiment of the present disclosure, the method shown in FIG. 4 may further include receiving, by the owner device 100, a first ID from the service provider server 210 via the first backend server 220.

Before the owner device 100 receives the first ID from the service provider server 210, the owner device 100 may request the service provider server 210 for the first ID. Also, authentication may be performed between at least two entities from among the owner device 100, the first backend server 220, and the service provider server 210. After the authentication is performed, the owner device 100 may receive the first ID from the service provider server 210 via the first backend server 220.

Also, the method by which the owner device 100 transmits the digital key may further include transmitting, by the owner device 100, the first ID to the target device 300. The first ID may include information about the service provider server 210. Also, the first ID may further include at least one of information about the owner device 100 and information about the first backend server 220.

By transmitting, by the owner device 100, the first ID including information about the service provider server 210 to the target device 300, the target device 300 may transmit the public key to the service provider server 210 via the second backend server 230 based on the first ID, in operation S410. Detailed descriptions about the corresponding embodiment will be described with reference to FIGS. 6A through 6D.

Also, according to an embodiment of the present disclosure, the method shown in FIG. 4 may further include receiving a second ID from the target device 300.

The second ID may include at least one of information about the service provider server 210 and information about the second backend server 230. Also, the second ID may further include information about the target device 300.

The owner device 100 may receive the second ID from the target device 300 to transmit the second ID to the first backend server 220 and receive the public key stored in the service provider server 210 via the first backend server 220, based on the second ID, in operation S410. The owner device 100 may transmit the digital key and the second ID to the service provider server 210 via the first backend server 220 to finally transmit the digital key to the target device 300 via the service provider server 210. Detailed descriptions about the corresponding embodiment will be described with reference to FIGS. 7A through 7C.

Also, according to an embodiment of the present disclosure, the method shown in FIG. 4 may further include receiving, by the owner device 100, the first ID via the first backend server 220, transmitting the first ID to the target device, and receiving the second ID from the target device.

The first ID may include at least one of information about the service provider server 210 and information about the first backend server 220. The second ID may include at least one of information about the service provider server 210 and information about the second backend server 230.

Accordingly, when receiving the public key in operation S410, the owner device 100 may request the first backend server 220 for the public key by using the first ID and the second ID, and receive the public key from the service provider server 210 via the first backend server 220. Also, when transmitting the digital key in operation S430, the owner device 100 may transmit the digital key, the first ID, and the second ID to the second backend server 230 connected to the target device 300, via the first backend server 220 and the service provider server 210. Detailed descriptions about the corresponding embodiment will be described with reference to FIGS. 8A through 8D.

Also, according to an embodiment of the present disclosure, the method shown in FIG. 4 may further include receiving, by the owner device 100, the second ID from the target device 300. The second ID may include information about the second backend server 230 connected to the target device 300 and further include information about the service provider server 210.

When receiving the public key in operation S410, the owner device 100 may transmit the second ID to the first backend server 220. Also, the owner device 100 may receive the public key stored in the second backend server 230 via the service provider server 210 and the first backend server 220, based on the second ID.

Also, when transmitting, by the owner device 100, the digital key in operation S430, the digital key may be transmitted to the second backend server 230 via the first backend server 220 and the service provider server 210 to finally transmit the digital key to the target device 300 via the second backend server 230. Detailed descriptions about the corresponding embodiment will be described with reference to FIGS. 9A through 9D.

Also, according to an embodiment of the present disclosure, when transmitting, by the owner device 100, the digital key in operation S430, the owner device 100 may transmit the digital key and a third ID to the service provider server 210 via the first backend server 220.

The third ID may include information about a user of the target device 300. The third ID may be used for an authentication process for the service provider server 210 to transmit the digital key to the target device 300. The service provider server 210 may verify the target device 300 via a separate communication channel now shown in FIG. 4, by using the third ID. Detailed descriptions about the corresponding embodiment will be described with reference to FIGS. 10A through 10C.

Figure 5:
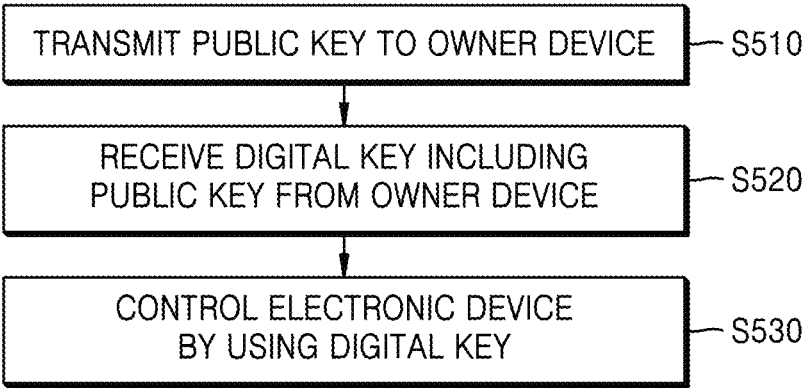
FIG. 5 is a flowchart of a method, performed by a target device, of receiving a digital key from an owner device, according to an embodiment.

FIG. 5 is a flowchart of a method, performed by a target device, of receiving a digital key from an owner device, according to some embodiment.

The target device 300 according to an embodiment may receive, from the owner device 100, the digital key for controlling the electronic device 10 over which the owner device 100 has the control authority.

In operation S510, the target device 300 according to an embodiment may transmit the public key to the owner device 100 via the first backend server 220, the service provider server 210, and the second backend server 230.

In operation S520, the target device 300 according to an embodiment may receive, from the owner device 100, the digital key including the data including the public key, and the signature of the owner device 100 regarding the data.

The digital key may be for assigning the control authority to the target device 300 for the electronic device 10 over which the owner device 100 has the control authority. The data included in the digital key may include the public key of the target device 300 and further include at least one of the range of the control authority assigned to the target device 300 and the validity period of the digital key.

In operation S530, the target device 300 according to an embodiment may control the electronic device 10 over which the owner device 100 has the control authority, by using the digital key.

According to an embodiment of the present disclosure, the method shown in FIG. 5 may further include receiving, by the target device 300, the first ID from the owner device 100. The first ID may include the information about the service provider server 210. Accordingly, when transmitting the public key in operation S510, the target device 300 may transmit the first ID and the public key to the service provider server 210 via the second backend server 230, based on the first ID. Also, when receiving the digital key in operation S520, the target device 300 may receive the digital key from the service provider server 210 via the second backend server 230. Hereinafter, the corresponding embodiment will be described in detail with reference to FIGS. 6A through 6D.

FIGS. 6A through 6D are diagrams for describing a digital key sharing method according to an embodiment.

Figure 6A:
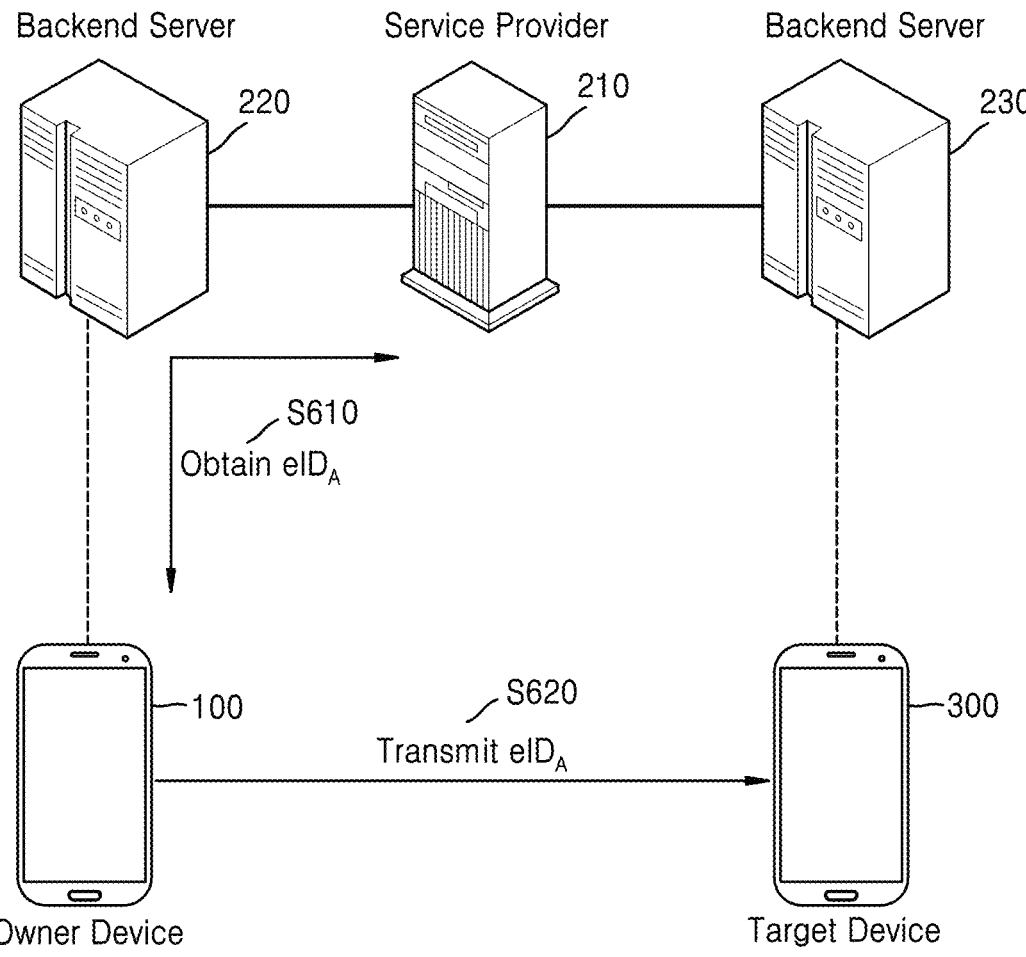
FIGS. 6A through 6D are diagrams for describing a digital key sharing method according to an embodiment.

FIG. 6A illustrates a preparation process for the owner device 100 to issue the digital key.

In operation S610, the owner device 100 may obtain an ephemeral ID eID$_A$ from the service provider server 210 via the first backend server 220. eID$_A$ may be the first ID described with reference to FIGS. 4 and 5.

eID$_A$ may be used to identify the owner device 100 during a digital key issuance process. eID$_A$ may be used to issue the digital key one time or to issue the digital key a plurality of times according to a policy. In other words, eID$_A$ may have a limit to the number of uses. eID$_A$ may be valid for a certain period of time and discarded after the certain period of time. In other words, eID$_A$ may have a limit to a validity period.

eID$_A$ may include information of a service provider (for example, a name, an address, or an identifier of the service provider or service provider server 210), and further include a value corresponding to the information (for example, a hash value of the information). eID$_A$ may include information of the user of the owner device 100 (for example, an owner of the owner device 100), such as a phone number or vehicle information of the user of the owner device 100, and further include a value corresponding to the information. The value corresponding to the information of the user of the owner device 100 may include, for example, a hash value of the information.

eID$_A$ may be used by combining values generated by one or more entities among the owner device 100, the first backend server 220, and the service provider server 210. When necessary, a negotiation procedure may be performed between the three entities to guarantee uniqueness of eID$_A$.

Following authentication procedures may be performed while obtaining eID$_A$ in operation S610 of FIG. 6A.

First, the owner device 100 may identify a digital key issuance intention of the user. The owner device 100 may identify whether the user of the owner device 100 is to issue the digital key. For example, the owner device 100 may identify whether the user intends to issue the digital key via a method, such as biometric authentication.

Then, authentication may be performed between the first backend server 220 and the owner device 100. Authentication of a device and a server may be performed, wherein the first backend server 220 authenticates the owner device 100 and the owner device 100 authenticates the first backend server 220.

Then, server authentication may be performed between the first backend server 220 and the service provider server 210. The first backend server 220 and the service provider server 210 may identify whether there is a mutual contract for providing a digital key issuance service.

Next, service eligibility authentication may be performed between the service provider server 210 and the owner device 100. The service provider server 210 may authenticate whether the user of the owner device 100 is eligible to receive a corresponding service. For example, when the service provider is a vehicle manufacturer A, the service provider server 210 may identify whether the owner device 100 has control authority for a vehicle manufactured by the vehicle manufacturer A, whether the owner device 100 stores a digital key for the vehicle manufactured by the vehicle manufacturer A, or whether the user of the owner device 100 is an owner of the vehicle manufactured by the vehicle manufacturer A.

In operation S620, the owner device 100 may transmit eID$_A$ to the target device 300.

Figure 6B:
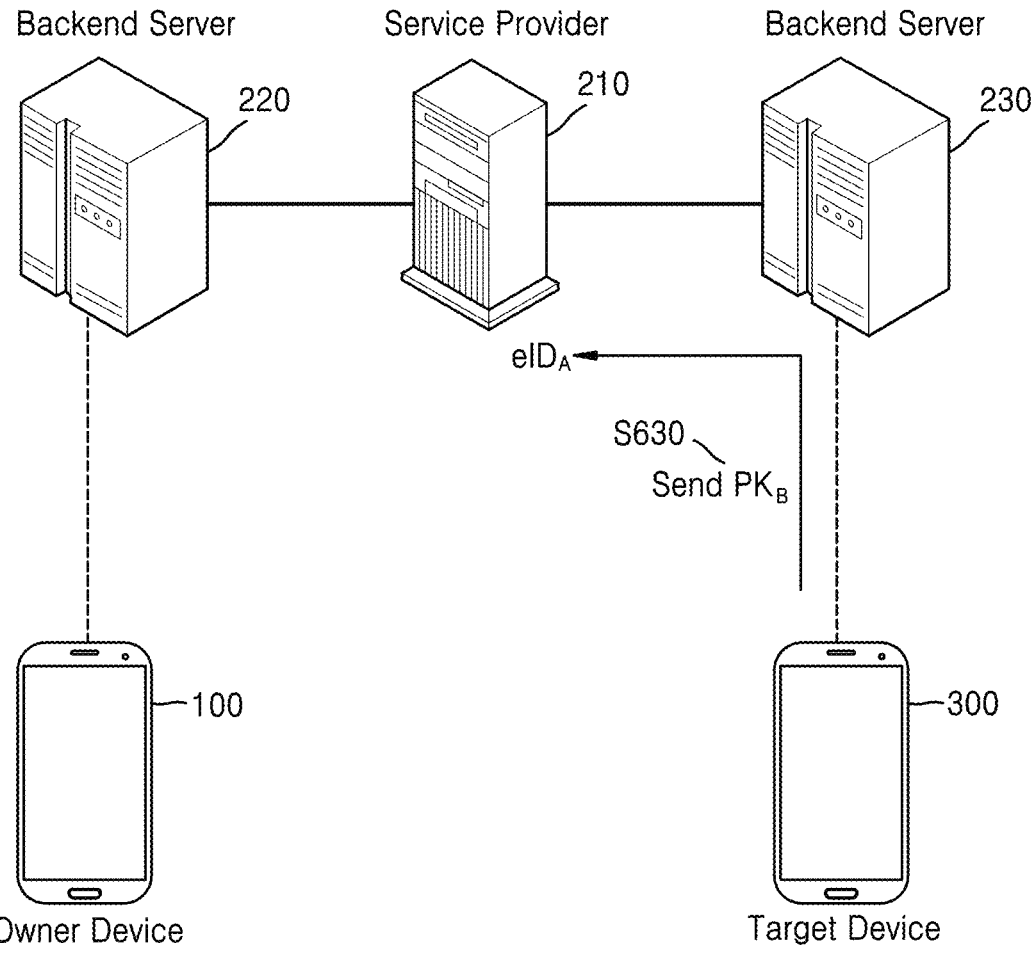

FIG. 6B illustrates a process by which the target device 300 requests the digital key to be used by itself.

In operation S630 of FIG. 6B, the target device 300 may transmit its public key PK$_B$ to the service provider server 210 via the second backend server 230.

The target device 300 generates the public key PK$_B$ to be included in the digital key to be used by itself. The target device 300 transmits PK$_B$ and eID$_A$ to the second backend server 230.

The second backend server 230 determines the service provider server 210 to be accessed by using information of eID$_A$. In this regard, eID$_A$ may include information for indicating the service provider server 210 that issued eID$_A$. For example, eID$_A$ may be configured in a form of eID1∥eID2. eID1 may include information for indicating the service provider server 210. eID2 may include information for indicating the owner device 100 or the first backend server 220.

The service provider server 210 may identify whether eID$_A$ received from the target device 300 via the second backend server 230 is a valid ephemeral ID issued by itself. When eID$_A$ received from the target device 300 is identified to be the valid ephemeral ID, the service provider server 210 stores PK$_B$.

Following authentication procedures may be performed while transmitting PK$_B$ in operation S630 of FIG. 6B.

First, the target device 300 may identify a digital key request intention of the user of the target device 300. The target device 300 may identify whether the user of the target device 300 is to request the digital key. For example, the target device 300 may identify whether the user intends to request the digital key via a method, such as biometric authentication.

Then, authentication may be performed between the second backend server 230 and the target device 300. Authentication of a device and a server may be performed, wherein the second backend server 230 authenticates the target device 300 and the target device 300 authenticates the second backend server 230.

Then, server authentication may be performed between the second backend server 230 and the service provider server 210. The second backend server 230 and the service provider server 210 may identify whether there is a mutual contract for providing a digital key sharing service.

Figure 6C:
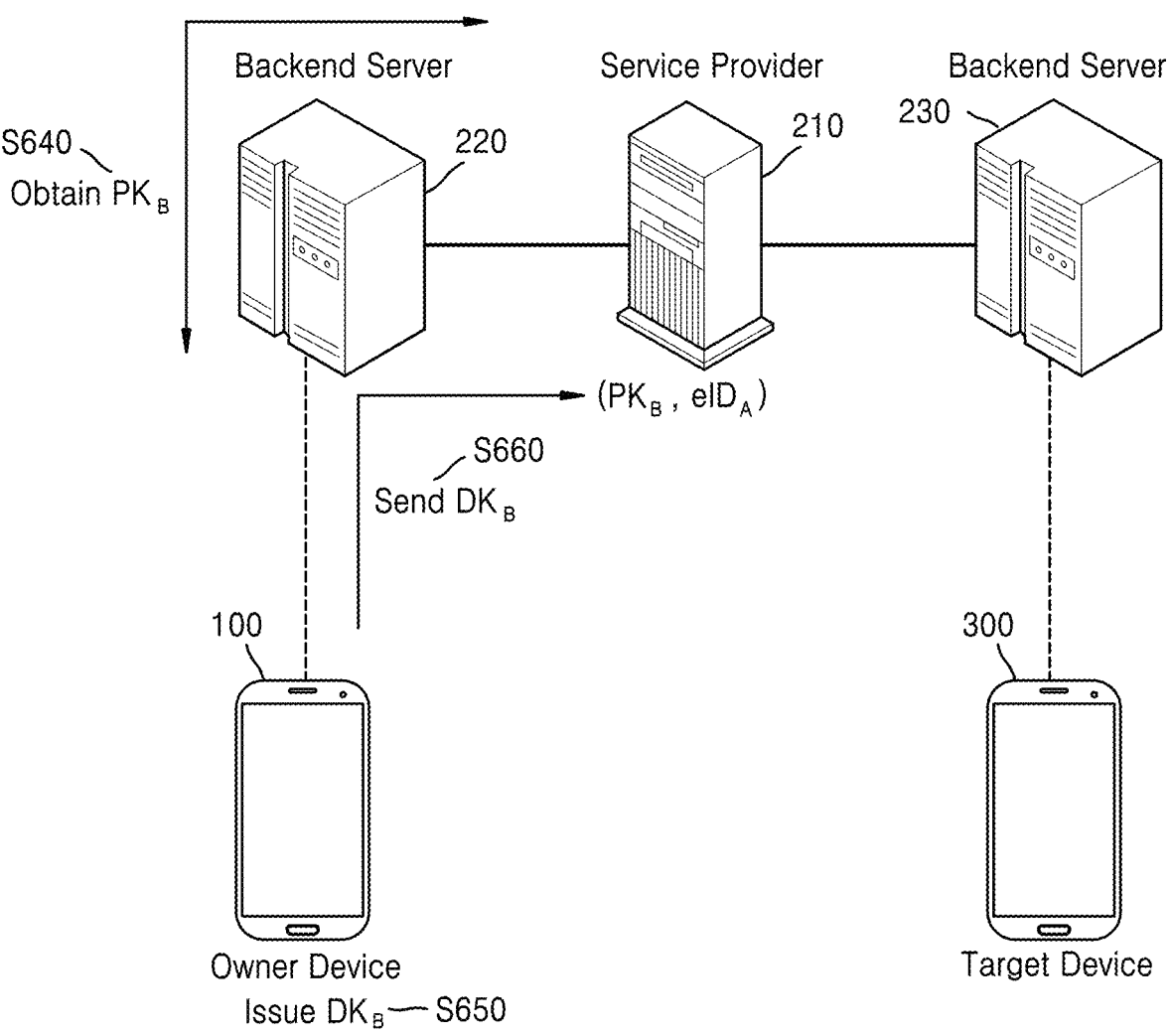

FIG. 6C illustrates a process by which the owner device 100 issues the digital key of the target device 300.

In operation S640 of FIG. 6C, the owner device 100 may obtain $PK_B$ from the service provider server 210 via the first backend server 220.

Here, the authentication process performed in operation S610 may be performed again. Identification of the intention of the user of the owner device 100, authentication between the first backend server 220 and the owner device 100, and authentication between the first backend server 220 and the service provider server 210 may be performed. Details overlapping those related to operation S610 will be omitted.

In operation S650, the owner device 100 uses $PK_B$ to generate $DK_B$ that is the digital key of the target device 300. The owner device 100 may generate the digital key of the target device 300 by signing a series data including the public key $PK_B$ of the target device 300 by using a private key of the owner device 100.

In operation S660, the owner device 100 transmits $DK_B$ to the service provider server 210 via the first backend server 220.

Here, the authentication process performed in operation S640 may be performed again. Identification of the intention of the user of the owner device 100, authentication between the first backend server 220 and the owner device 100, and authentication between the first backend server 220 and the service provider server 210 may be performed.

The service provider server 210 may further store $DK_B$ in addition to $eID_A$ and $PK_B$.

Figure 6D:
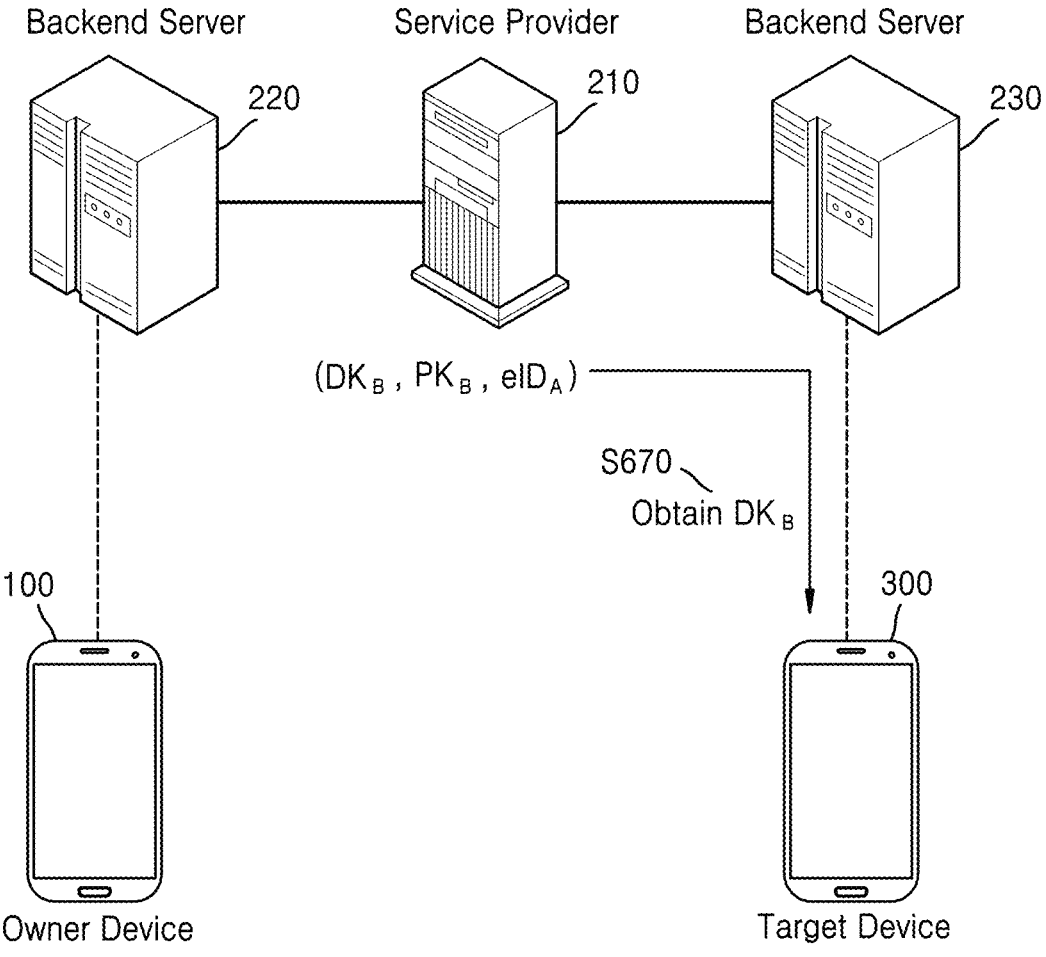

FIG. 6D shows a process by which the target device 300 finally obtains its own digital key $DK_B$.

In operation S670, the target device 300 obtains the digital key $DK_B$ from the service provider server 210 via the second backend server 230.

Here, the authentication process performed in operation S630 may be performed again. Identification of the intention of the user of the target device 300, authentication between the second backend server 230 and the target device 300, and authentication between the second backend server 230 and the service provider server 210 may be performed. Details overlapping those related to operation S630 will be omitted.

Figure 7A:
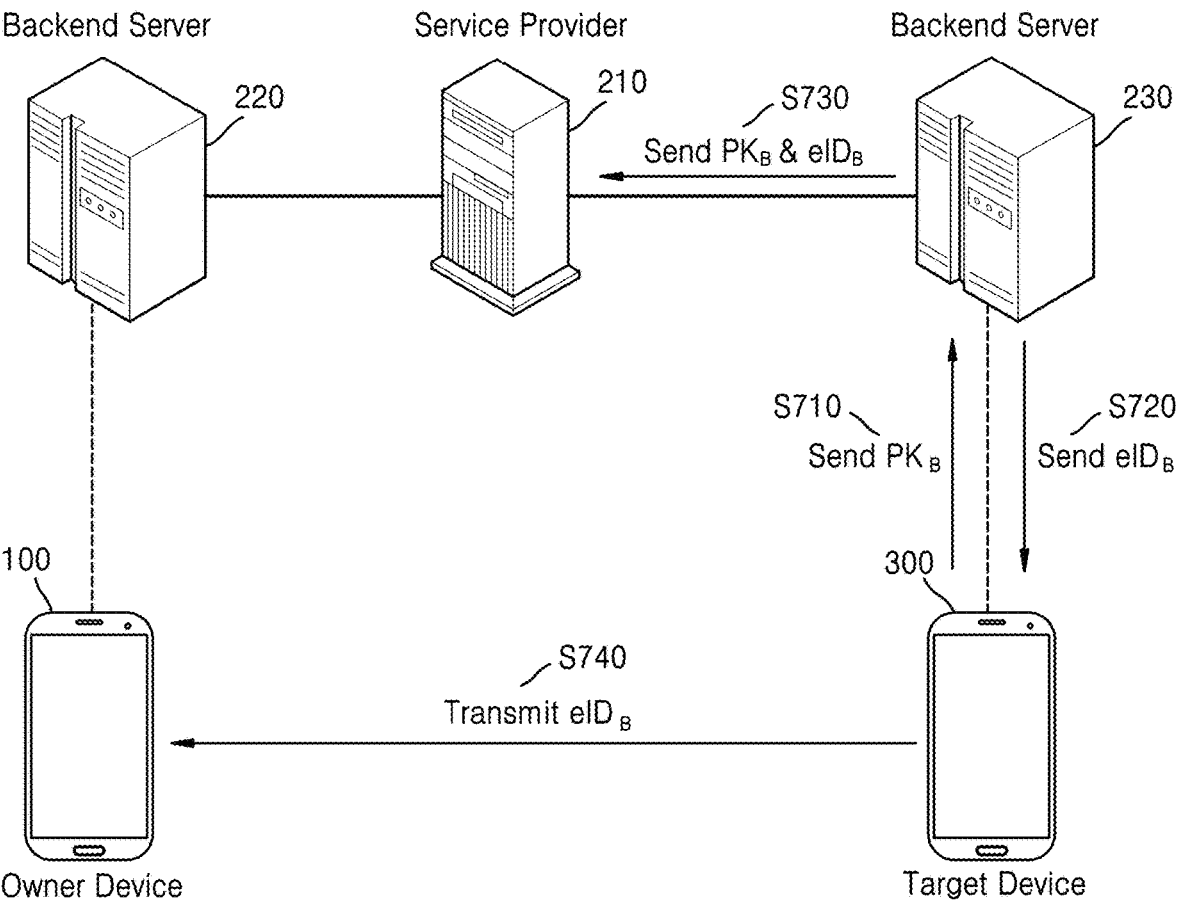
FIGS. 7A through 7C are diagrams for describing a digital key sharing method according to an embodiment.
Figure 7B:
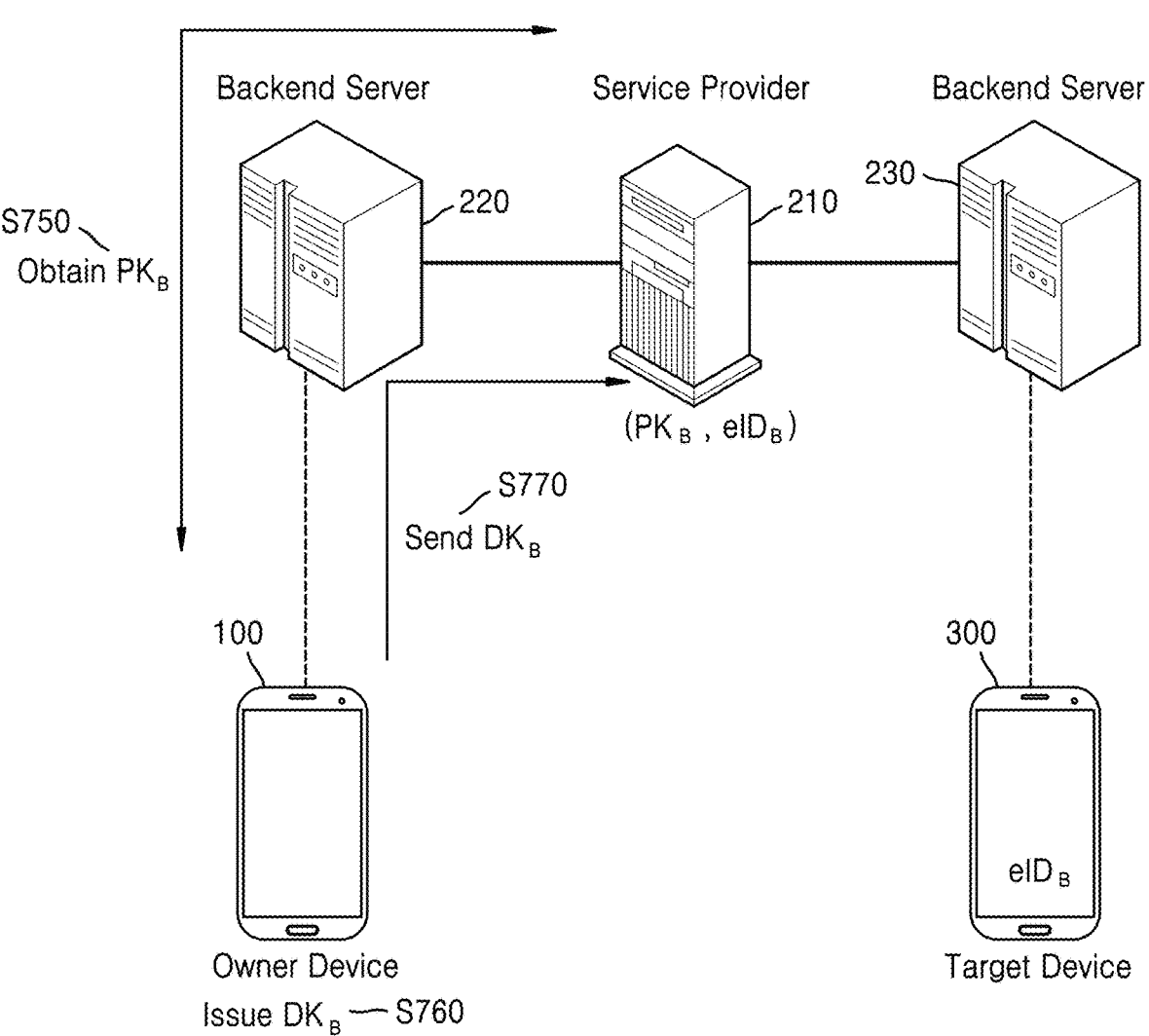
Figure 7C:
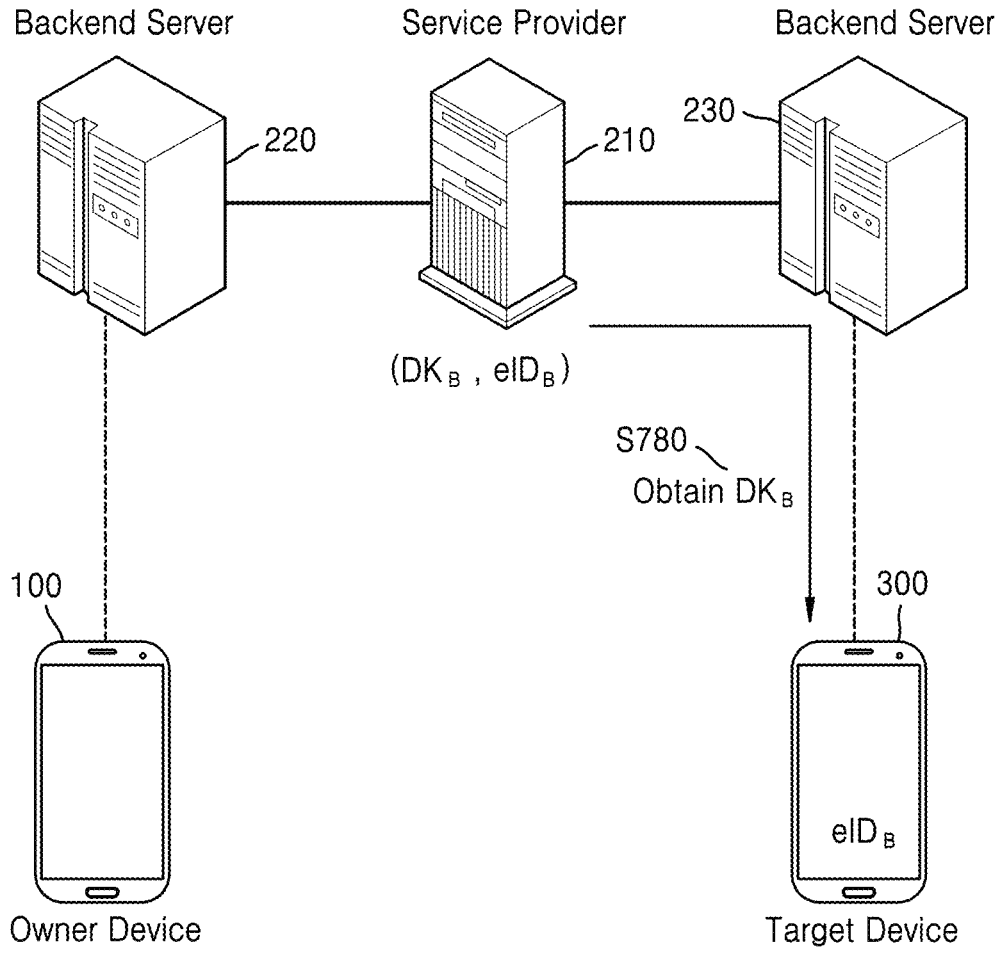

An embodiment shown in FIGS. 7A through 7C proposes a method of enabling issuance of the digital key by issuing an ephemeral ID for identifying the target device 300.

FIG. 7A shows the target device 300 requesting issuance of the digital key.

In operation S710, the target device 300 transmits its public key $PK_B$ to the second backend server 230.

The target device 300 generates the public key $PK_B$ to be included in the digital key to be used by itself, and transmits $PK_B$ to the second backend server 230. The second backend server 230 stores $PK_B$.

Here, the target device 300 may transmit, together with $PK_B$. information of the service provider (for example, the name, address, identifier, or the like of the service provider or service provider server 210). Also, the target device 300 may further transmit a value corresponding to the information of the service provider. The value corresponding to the information of the service provider 210 may include, for example, a hash value of the information.

Following authentication procedures may be performed while transmitting $PK_B$ in operation S710 of FIG. 7A.

First, the target device 300 may identify a digital key request intention of the user of the target device 300. The target device 300 may identify whether the user of the target device 300 is to request the digital key. For example, the target device 300 may identify whether the user intends to request the digital key via a method, such as biometric authentication.

Then, authentication may be performed between the second backend server 230 and the target device 300. Authentication of a device and a server may be performed, wherein the second backend server 230 authenticates the target device 300 and the target device 300 authenticates the second backend server 230.

In operation S720, the target device 300 may obtain the ephemeral ID $eID_B$ from the second backend server 230. $eID_B$ may be the second ID described with reference to FIGS. 4 and 5.

$eID_B$ may be used to identify the target device 300 during a digital key issuance process. $eID_B$ may be used to issue the digital key one time or to issue the digital key a plurality of times according to a policy. In other words, $eID_B$ may have a limit to the number of uses. $eID_B$ may be valid for a certain period of time and discarded after the certain period of time. In other words, $eID_B$ may have a limit to a validity period.

$eID_B$ may include information of a service provider (for example, a name, an address, or an identifier of the service provider or service provider server 210), and further include a value corresponding to the information (for example, a hash value of the information).

$eID_B$ may be used by combining values generated by one or more entities among the target device 300, the second backend server 230, and the service provider server 210. When necessary, a negotiation procedure may be performed between the three entities to guarantee uniqueness of $eID_B$.

In operation S730, the second backend server 230 transmits the public key $PK_B$ of the target device 300 to the service provider server 210. The second backend server 230 transmits the public key $PK_B$ of the target device 300 to the service provider server 210, together with $eID_B$. The service provider server 210 stores $PK_B$ and $eID_B$.

In operation S730 of FIG. 7A, authentication may be performed between the second backend server 230 and the service provider server 210. Authentication between servers may be performed, wherein the second backend server 230 authenticates the service provider server 210 and the service provider server 210 authenticates the second backend server 230.

In operation S740, the target device 300 transmits $eID_B$ to the owner device 100. The target device 300 stores $eID_B$.

FIG. 7B illustrates a process by which the owner device 100 issues the digital key of the target device 300.

In operation S750, the owner device 100 obtains $PK_B$ from the service provider server 210 via the first backend server 220.

The owner device 100 transmits $eID_B$ to the first backend server 220. When transmitting $eID_B$ to the first backend server 220, the owner device 100 may additionally include and transmit information for identifying the service provider server 210, which is required for the first backend server 220 to access the service provider server 210.

The first backend server 220 determines the service provider server 210 to be accessed by using information received from the owner device 100. In this regard, information indicating the service provider server 210 may be additionally transmitted from the owner device 100 to the first backend server 220, or the information indicating the service provider server 210 may be included in $eID_B$.

Also, the first backend server 220 requests the service provider server 210 for a public key corresponding to $eID_B$. The service provider server 210 may identify whether the requested $eID_B$ is a valid ephemeral ID stored in the service provider server 210. Upon identifying that the requested $eID_B$ is the valid ephemeral ID, the service provider server 210 transmits $PK_B$ that is the public key corresponding to $eID_B$ to the first backend server 220. The first backend server 220 transmits $PK_B$ to the owner device 100.

Following authentication procedures may be performed while the owner device 100 obtains $PK_B$ in operation S750 of FIG. 7B.

First, the owner device 100 may identify a digital key issuance intention of the user. The owner device 100 may identify whether the user of the owner device 100 is to issue the digital key. For example, the owner device 100 may identify whether the user intends to issue the digital key via a method, such as biometric authentication.

Then, authentication may be performed between the first backend server 220 and the owner device 100. Authentication of a device and a server may be performed, wherein the first backend server 220 authenticates the owner device 100 and the owner device 100 authenticates the first backend server 220.

Then, server authentication may be performed between the first backend server 220 and the service provider server 210. The first backend server 220 and the service provider server 210 may identify whether there is a mutual contract for providing a digital key issuance service.

Next, service eligibility authentication may be performed between the service provider server 210 and the owner device 100. The service provider server 210 may authenticate whether the user of the owner device 100 is eligible to receive a corresponding service.

In operation S760, the owner device 100 uses $PK_B$ to generate $DK_B$ that is the digital key of the target device 300. The owner device 100 may generate the digital key $DK_B$ of the target device 300 by signing a series data including the public key $PK_B$ of the target device 300 by using the private key of the owner device 100.

In operation S770, the owner device 100 transmits $DK_B$ and $eID_B$ to the service provider server 210 via the first backend server 220.

Here, the authentication process performed in operation S750 may be performed again. The user intention identification of the owner device 100, the authentication between the first backend server 220 and the owner device 100, the authentication between the first backend server 220 and the service provider server 210, and the service eligibility authentication between the service provider server 210 and the owner device 100 may be performed.

The service provider server 210 may further store $DK_B$ together with $eID_B$.

FIG. 7C shows a process by which the target device 300 finally obtains its own digital key $DK_B$.

In operation S780, the target device 300 obtains the digital key $DK_B$ from the service provider server 210 via the second backend server 230.

In operation S780, the authentication process performed in operation S710 may be performed again. The identification of the intention of the user of the target device 300, the authentication between the second backend server 230 and the target device 300, and the authentication between the second backend server 230 and the service provider server 210 may be performed.

An embodiment shown in FIGS. 8A through 8D proposes a method of issuing the digital key for the target device 300 by issuing an ephemeral ID for identifying the owner device 100 and an ephemeral ID for identifying the target device 300.

Figure 8A:
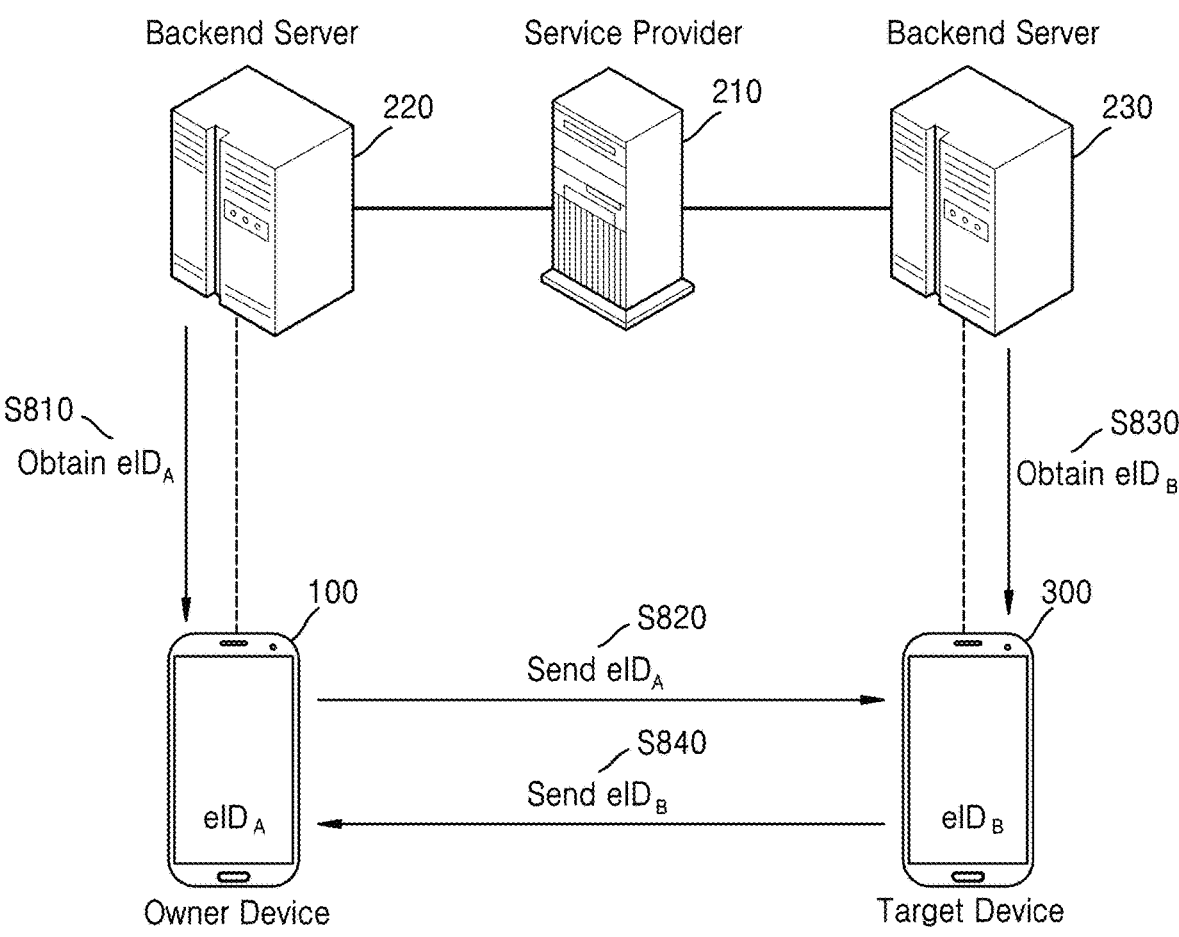
FIGS. 8A through 8D are diagrams for describing a digital key sharing method according to an embodiment.

FIG. 8A illustrates a process in which the owner device 100 and the target device 300 prepare to issue the digital key.

In operation S810, the owner device 100 obtains the ephemeral ID $eID_A$ from the first backend server 220. $eID_A$ may be the first ID described with reference to FIGS. 4 and 5.

$eID_A$ may be used to identify the owner device 100 during a digital key issuance process. $eID_A$ may be used to issue the digital key one time or to issue the digital key a plurality of times according to a policy. In other words, $eID_A$ may have a limit to the number of uses. $eID_A$ may be valid for a certain period of time and discarded after the certain period of time. In other words, $eID_A$ may have a limit to a validity period.

$eID_A$ may include information of the device OEM A (for example, a name, an address, or an identifier of the device OEM A or first backend server 220), and further include a value corresponding to the information (for example, a hash value of the information). The first backend server 220 may be a backend server of the device OEM A.

$eID_A$ may include information of a service provider (for example, a name, an address, or an identifier of the service provider or service provider server 210), and further include a value corresponding to the information (for example, a hash value of the information).

$eID_A$ may be used by combining values generated by one or more entities among the owner device 100 and the first backend server 220. When necessary, a negotiation procedure may be performed between the two entities to guarantee uniqueness of $eID_A$.

A following authentication process may be performed while obtaining $eID_A$ in operation S810.

First, the owner device 100 may identify a digital key issuance intention of the user. The owner device 100 may identify whether the user of the owner device 100 is to issue the digital key. For example, the owner device 100 may identify whether the user intends to issue the digital key via a method, such as biometric authentication.

Then, authentication may be performed between the first backend server 220 and the owner device 100. Authentication of a device and a server may be performed, wherein the first backend server 220 authenticates the owner device 100 and the owner device 100 authenticates the first backend server 220.

Then, service eligibility authentication may be performed between the first backend server 220 and the owner device 100. For example, the first backend server 220 may determine whether the digital key requested to be shared by the owner device 100 is a digital key capable of a key sharing service via a contact policy or the like with a manufacturer of a corresponding vehicle. Alternatively, when the owner device 100 requests the first backend server 220 for digital key sharing, a method of identifying whether the owner device 100 is a device capable of key sharing or the user of the owner device 100 is a user capable of key sharing, based on an attribute or the like applied to the digital key of the owner device 100.

In operation S820, the owner device 100 may transmit $eID_A$ to the target device 300.

In operation S830, the target device 300 obtains the ephemeral ID $eID_B$ from the second backend server 230. $eID_B$ may be the second ID described with reference to FIGS. 4 and 5.

$eID_B$ may be used to identify the target device 300 during a digital key issuance process. $eID_B$ may be used to issue the digital key one time or to issue the digital key a plurality of times according to a policy. In other words, $eID_B$ may have a limit to the number of uses. $eID_B$ may be valid for a certain period of time and discarded after the certain period of time. In other words, $eID_B$ may have a limit to a validity period.

$eID_B$ may include information of the device OEM B (for example, a name, an address, or an identifier of the device OEM B or second backend server 230), and further include a value corresponding to the information (for example, a hash value of the information). The second backend server 230 may be a backend server of the device OEM B.

$eID_B$ may include information of a service provider (for example, a name, an address, or an identifier of the service provider or service provider server 210), and further include a value corresponding to the information (for example, a hash value of the information).

$eID_B$ may be used by combining values generated by one or more entities among the target device 300 and the second backend server 230. When necessary, a negotiation procedure may be performed between the two entities to guarantee uniqueness of $eID_B$.

In operation S830, a following authentication process may be performed while obtaining the ephemeral ID $eID_B$.

First, the target device 300 may identify an intention of the user of the target device 300. For example, the target device 300 may identify whether the user intends to request the digital key via a method, such as biometric authentication.

Then, authentication may be performed between the second backend server 230 and the target device 300. Authentication of a device and a server may be performed, wherein the second backend server 230 authenticates the target device 300 and the target device 300 authenticates the second backend server 230.

In operation S840, the target device 300 may transmit $eID_B$ to the owner device 100.

In operation 8A, operations S810 and S820, and operations S830 and S840 are dependent on each other and are independent from each other. Accordingly, an order of performing operations S810 and S820, and operations S830 and S840 do not affect overall operations.

Figure 8B:
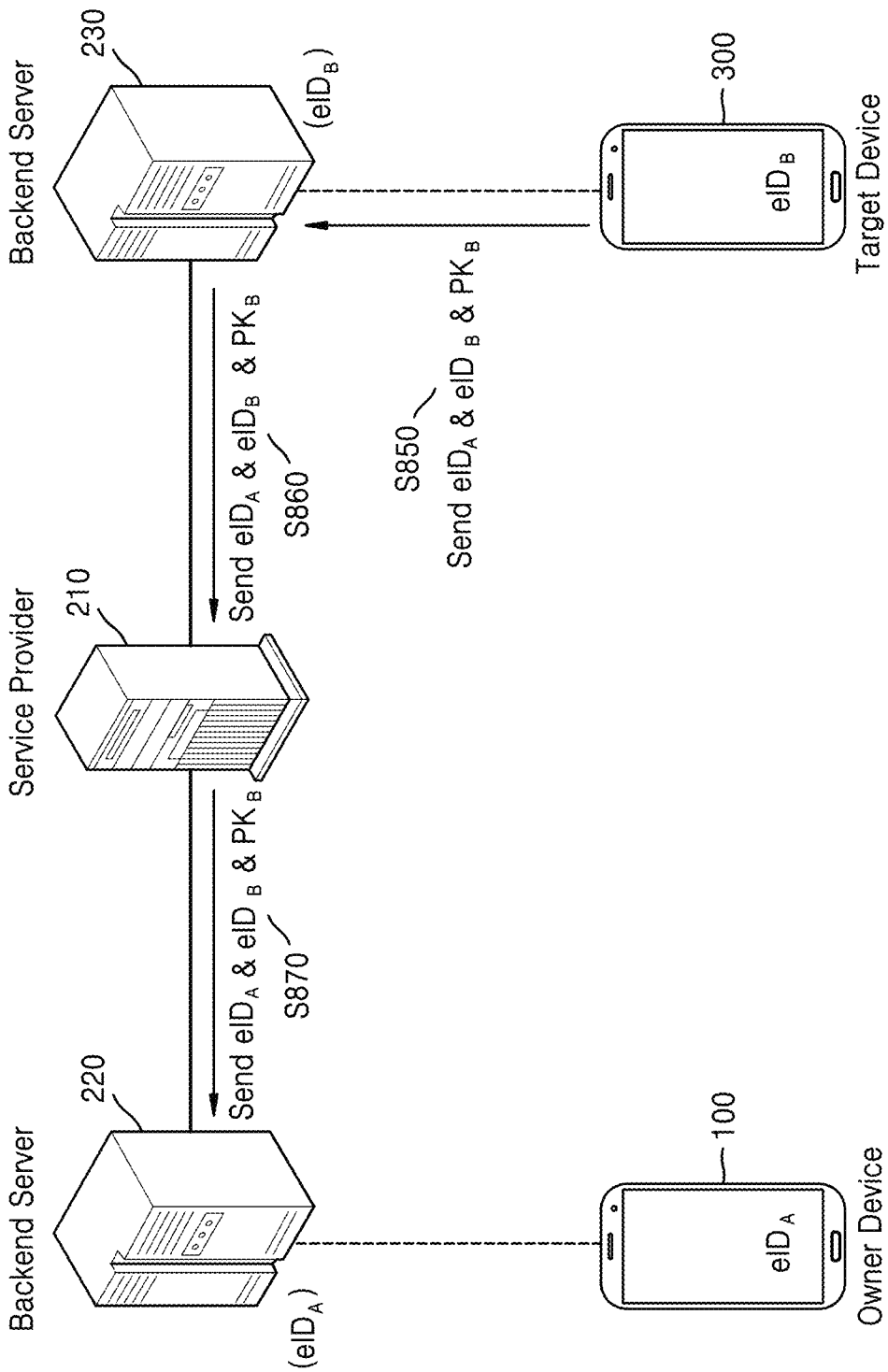

FIG. 8B illustrates a process by which the target device 300 requests the digital key to be used by itself.

In operation S850, the target device 300 transmits its public key $PK_B$. $eID_A$, and $eID_B$ to the second backend server 230.

The target device 300 generates the public key $PK_B$ to be included in the digital key to be used by itself, and transmits $PK_B$. $eID_A$, and $eID_B$ to the second backend server 230. Also, the target device 300 may additionally transmit the information of the service provider server 210 to which the second backend server 230 is to access.

In operation S860, the second backend server 230 transmits $PK_B$, $eID_A$, and $eID_B$ to the service provider server 210.

The second backend server 230 determines the service provider server 210 to be accessed by using information received from the target device 300. In this regard, information indicating the service provider server 210 may be additionally transmitted from the target device 300 to the service provider server 210, or the information indicating the service provider server 210 may be included in $eID_A$.

The second backend server 230 transmits $PK_B$, $eID_A$, and $eID_B$ to the service provider server 210. The second backend server 230 stores $eID_B$ and $eID_A$ by connecting (or matching) $eID_B$ and $eID_A$.

In operation S870, the service provider server 210 transmits $PK_B$, $eID_A$, and $eID_B$ to the first backend server 220.

The service provider server 210 determines the first backend server 220 to be accessed by using the information received from the second backend server 230. The service provider server 210 transmits $PK_B$, $eID_A$, and $eID_B$ to the first backend server 220.

The first backend server 220 may identify whether $eID_A$ received from the service provider server 210 is the valid ephemeral ID issued by itself. After identifying that $eID_A$ is the valid ephemeral ID, the first backend server 220 stores $PK_B$ and $eID_B$.

The information transmitted by the target device 300 to the first backend server 220 via the second backend server 230 and the service provider server 210 may be divided into information $eID_A$ about a recipient, information $eID_B$ about a sender, and the public key $PK_B$.

Following authentication processes may be performed while operations 850 to S870 are performed.

First, the target device 300 may identify a digital key request intention of the user of the target device 300. The target device 300 may identify whether the user of the target device 300 is to request the digital key. For example, the target device 300 may identify whether the user intends to request the digital key via a method, such as biometric authentication.

Then, authentication may be performed between the second backend server 230 and the target device 300. Server authentication may be performed between the second backend server 230 and the service provider server 210. Then, server authentication may be performed between the service provider server 210 and the first backend server 220.

Figure 8C:
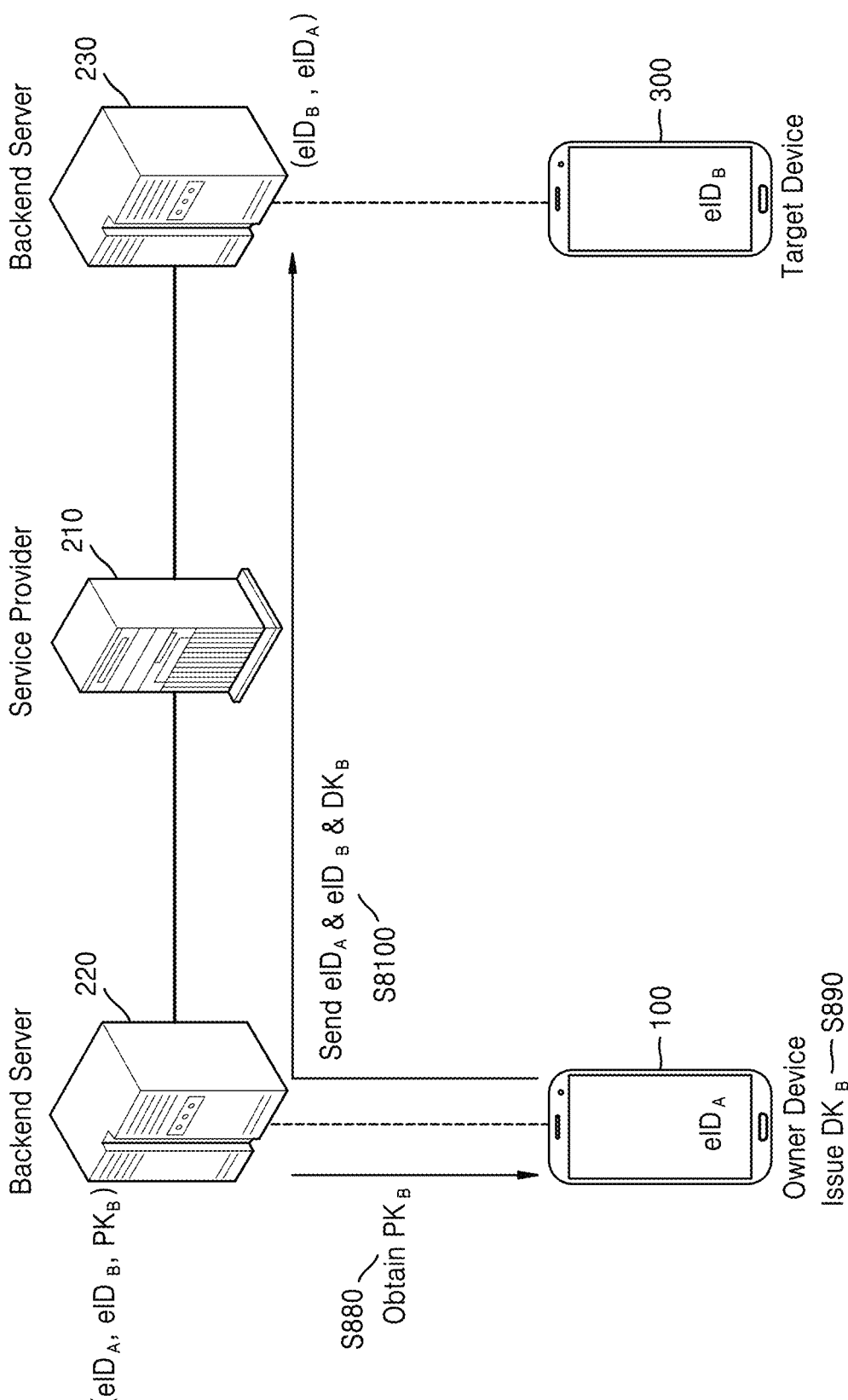

FIG. 8C illustrates a process by which the owner device 100 issues the digital key of the target device 300.

In operation S880, the owner device 100 obtains $PK_B$ from the first backend server 220.

The owner device 100 requests the first backend server 220 for the public key connected to $eID_A$ and $eID_B$. The first backend server 220 identifies whether $eID_A$ is the valid ephemeral ID issued by itself. The first backend server 220 identifies whether the requested $eID_B$ is the valid ephemeral ID connected to $eID_A$ stored therein. After identifying that the requested $eID_B$ is valid, the first backend server 220 transmits $PK_B$ to the owner device 100.

Here, authentication between a device and a server may be performed again between the first backend server 220 and the owner device 100.

In operation S890, the owner device 100 uses $PK_B$ to generate $DK_B$ that is the digital key of the target device 300. The owner device 100 may generate the digital key $DK_B$ of the target device 300 by signing a series data including the public key $PK_B$ of the target device 300 by using a private key of the owner device 100.

In operation S8100, the owner device 100 transmits $DK_B$, $eID_A$, and $eID_B$ to the second backend server 230 via the first backend server 220 and the service provider server 210. The transmitted information may be divided into the information $eID_B$ about a recipient, the information $eID_A$ about a sender, and the digital key $DK_B$.

In operation S8100, the user intention identification of the owner device 100, the authentication between the first backend server 220 and the owner device 100, the authentication between the first backend server 220 and the service provider server 210, and the authentication between the service provider server 210 and the second backend server 230 may be performed again.

In operation S8100, the second backend server 230 verifies whether $eID_B$ is the valid ephemeral ID, verifies whether $eID_A$ is information corresponding to the valid $eID_B$, and stores $DK_B$.

Figure 8D:
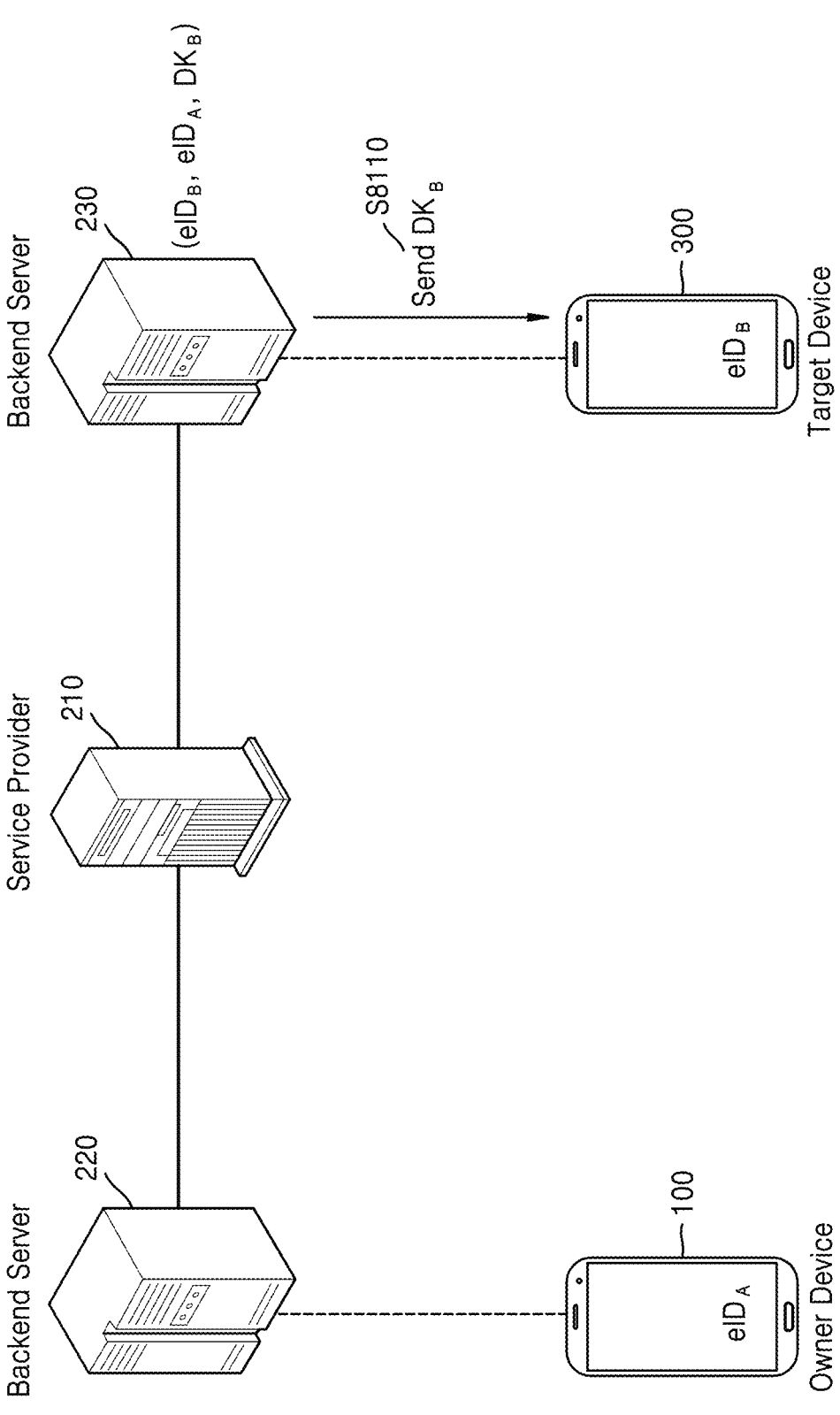

FIG. 8D shows a process by which the target device 300 finally obtains its own digital key $DK_B$.

In operation S8110, the target device 300 obtains the digital key $DK_B$ from the second backend server 230.

In operation S8110, the user intention identification of the owner device 100 and the authentication between the first backend server 220 and the owner device 100 may be performed again.

An embodiment shown in FIGS. 9A through 9D proposes a method of enabling issuance of a digital key as the second backend server 230 operates a digital key issuance service for the target device 300.

Figure 9A:
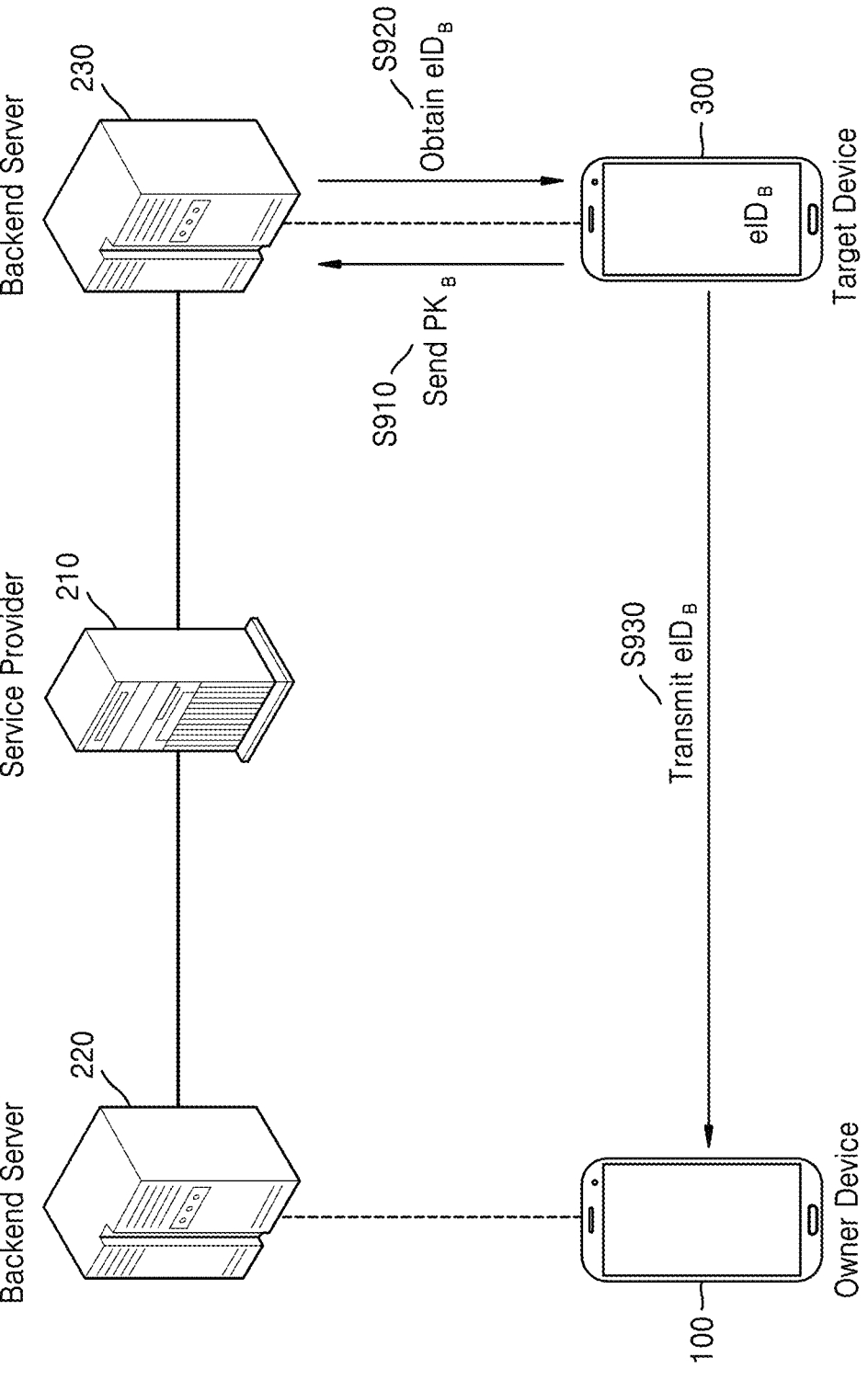

FIG. 9A illustrates a process in which the target device 300 prepare to issue the digital key.

In operation S910, the target device 300 transmits its public key $PK_B$ to the second backend server 230.

The target device 300 generates the public key $PK_B$ to be included in the digital key to be used by itself, and transmits $PK_B$ to the second backend server 230. The second backend server 230 stores $PK_B$ of the target device 300.

A following authentication process may be performed when the target device 300 transmits $PK_B$.

The target device 300 may identify a digital key request intention of the user of the target device 300. For example, the target device 300 may identify whether the user intends to request the digital key via a method, such as biometric authentication.

Then, authentication may be performed between the second backend server 230 and the target device 300. Authentication of a device and a server may be performed, wherein the second backend server 230 authenticates the target device 300 and the target device 300 authenticates the second backend server 230.

In operation S920, the target device 300 obtains the ephemeral ID $eID_B$ from the second backend server 230. $eID_B$ may be the second ID described with reference to FIGS. 4 and 5.

$eID_B$ may be used to identify the target device 300 during a digital key issuance process. $eID_B$ may be used to issue the digital key one time or to issue the digital key a plurality of times according to a policy. In other words, $eID_B$ may have a limit to the number of uses. $eID_B$ may be valid for a certain period of time and discarded after the certain period of time. In other words, $eID_B$ may have a limit to a validity period.

$eID_B$ may include information of the device OEM B (for example, a name, an address, or an identifier of the device OEM B or second backend server 230), and further include a value corresponding to the information (for example, a hash value of the information). The second backend server 230 may be a backend server of the device OEM B.

$eID_B$ may be used by combining values generated by one or more entities among the target device 300 and the second backend server 230. When necessary, a negotiation procedure may be performed between the two entities to guarantee uniqueness of $eID_B$.

In operation S930, the target device 300 transmits $eID_B$ to the owner device 100.

Figure 9B:
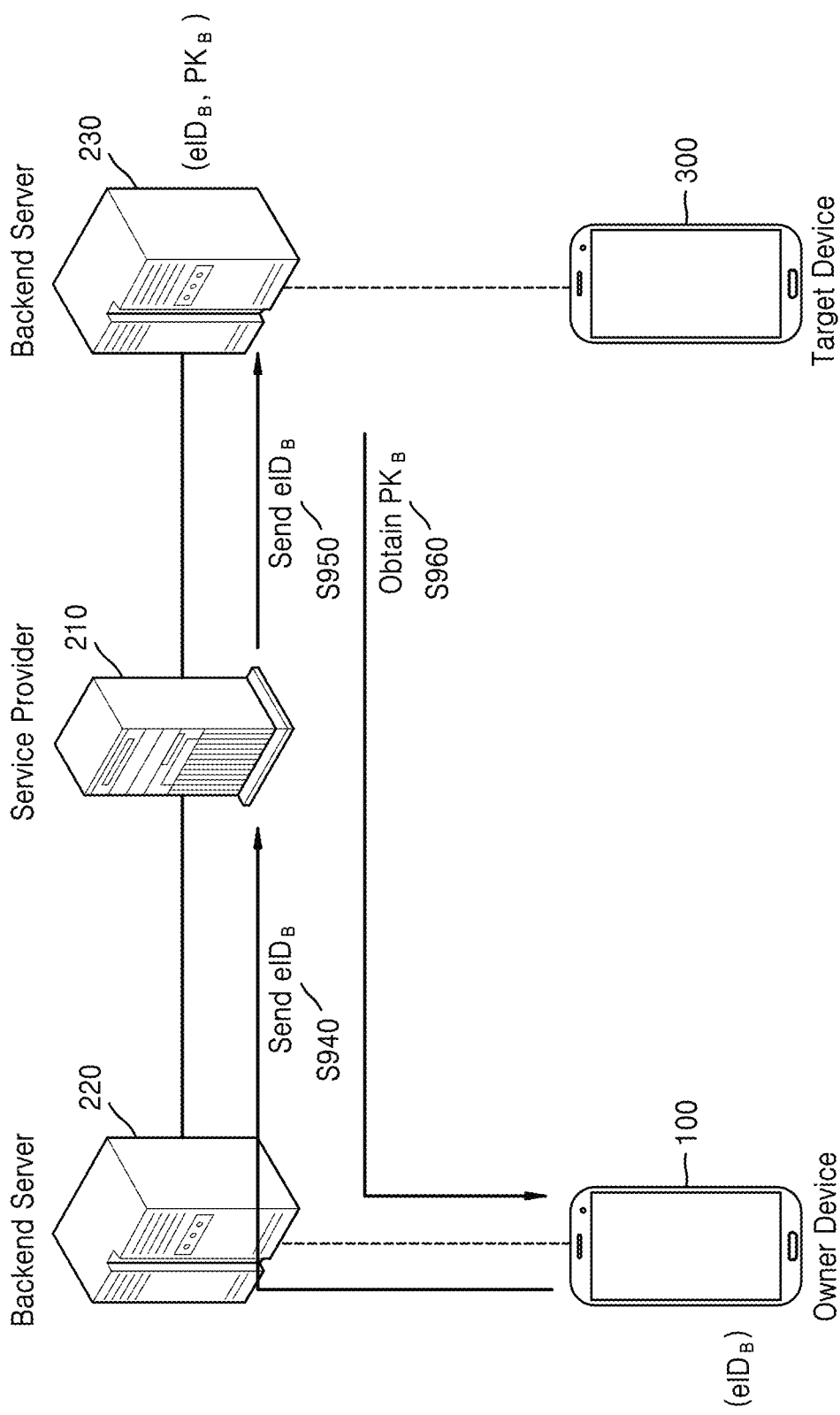

FIG. 9B illustrates a process by which the owner device 100 requests and obtains the public key of the target device 300 to issue the digital key to the target device 300.

In operation S940, the owner device 100 transmits $eID_B$ to the service provider server 210 via the first backend server 220.

The owner device 100 transmits $eID_B$ to the first backend server 220. Here, the owner device 100 may additionally transmit information indicating the service provider server 210 and the second backend server 230, which is required for an access.

The first backend server 220 determines the service provider server 210 to be accessed by using information received from the owner device 100. In this regard, information indicating the service provider server 210 may be additionally transmitted from the owner device 100 to the first backend server 220, or the information indicating the service provider server 210 may be included in $eID_B$.

The first backend server 220 transmits $eID_B$ to the service provider server 210. The first backend server 220 may additionally transmit information indicating the second backend server 230, which is required for an access.

In operation S940, following authentication processes may be performed.

First, the owner device 100 may identify a digital key issuance intention of the user. The owner device 100 may identify whether the user of the owner device 100 is to issue the digital key. For example, the owner device 100 may identify whether the user intends to issue the digital key via a method, such as biometric authentication.

Then, authentication may be performed between the first backend server 220 and the owner device 100. Then, server authentication may be performed between the first backend server 220 and the service provider server 210. The first backend server 220 and the service provider server 210 may identify whether there is a mutual contract for providing a digital key issuance service. Then, service eligibility authentication may be performed between the service provider server 210 and the owner device 100.

In operation S950, the service provider server 210 transmits $eID_B$ to the service provider server 210.

Here, the service provider server 210 determines the second backend server 230 to be accessed by using the information received from the first backend server 220, and transmits $eID_B$ to the second backend server 230.

In operation S950, server authentication may be performed between the second backend server 230 and the service provider server 210.

In operation S960, the owner device 100 obtains $PK_B$ from the second backend server 230 via the service provider server 210 and the first backend server 220.

The second backend server 230 identifies whether $eID_B$ received in operation S950 is the valid ephemeral ID issued by itself, and transmits $PK_B$ to the service provider server 210. The service provider server 210 transmits $PK_B$ to the first backend server 220. The first backend server 220 transmits $PK_B$ to the owner device 100.

Figure 9C:
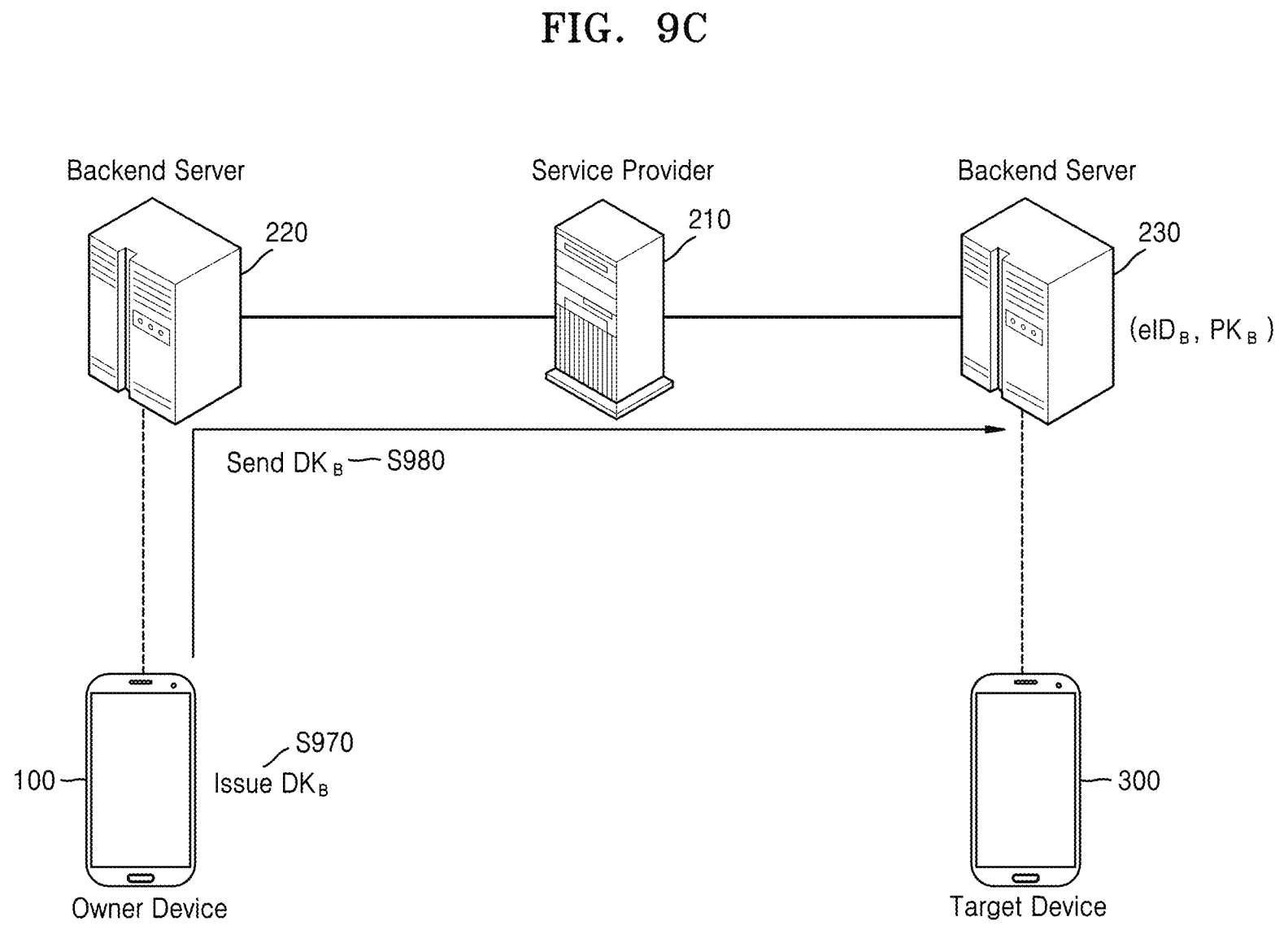

FIG. 9C illustrates a process by which the owner device 100 issues the digital key of the target device 300.

In operation S970, the owner device 100 uses $PK_B$ to generate $DK_B$ that is the digital key of the target device 300. The owner device 100 may generate the digital key of the target device 300 by signing a series data including the public key $PK_B$ of the target device 300 by using a private key of the owner device 100.

In operation S980, the owner device 100 transmits $DK_B$ to the second backend server 230 via the first backend server 220 and the service provider server 210. The second backend server 230 stores $DK_B$.

Here, the user intention identification of the owner device 100, the authentication between the first backend server 220 and the owner device 100, the authentication between the first backend server 220 and the service provider server 210, and the authentication between the service provider server 210 and the second backend server 230 may be performed again.

Figure 9D:
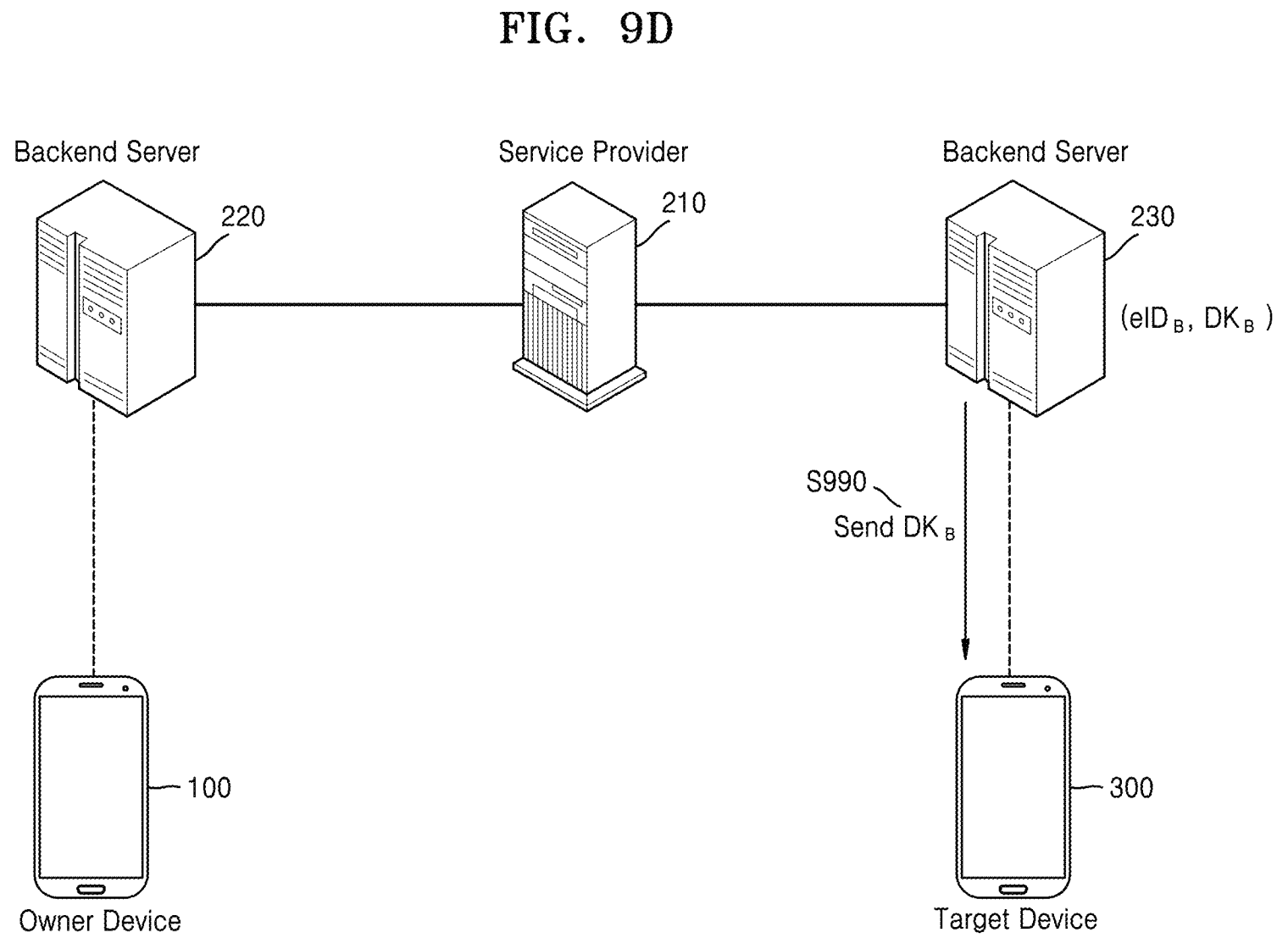

FIG. 9D shows a process by which the target device 300 finally obtains its own digital key $DK_B$.

In operation S990, the target device 300 obtains the digital key from the second backend server 230.

In operation S990, the user intention identification of the target device 300 and the authentication between the second backend server 230 and the target device 300 may be performed again.

Figure 10A:
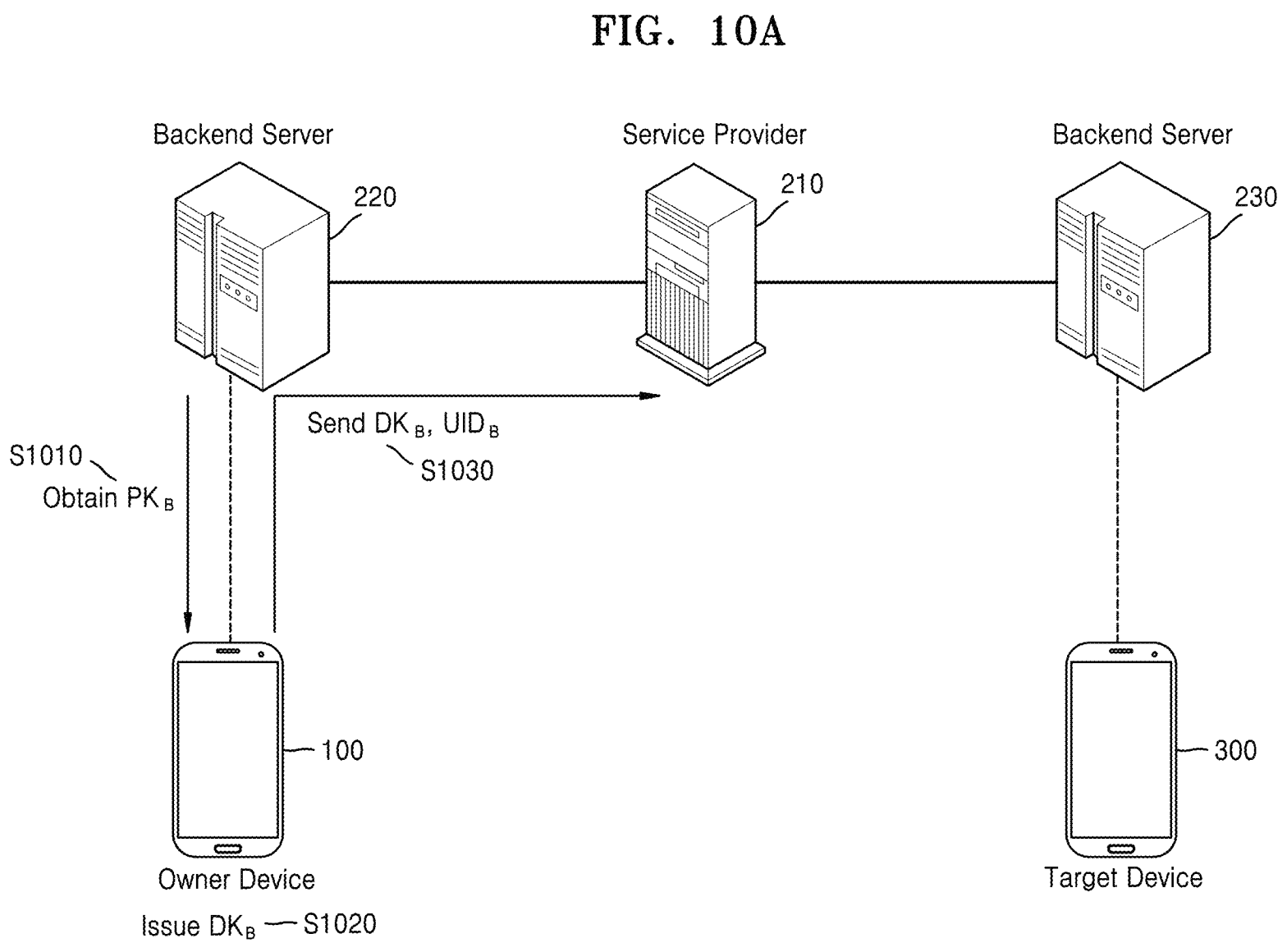
Figure 10B:
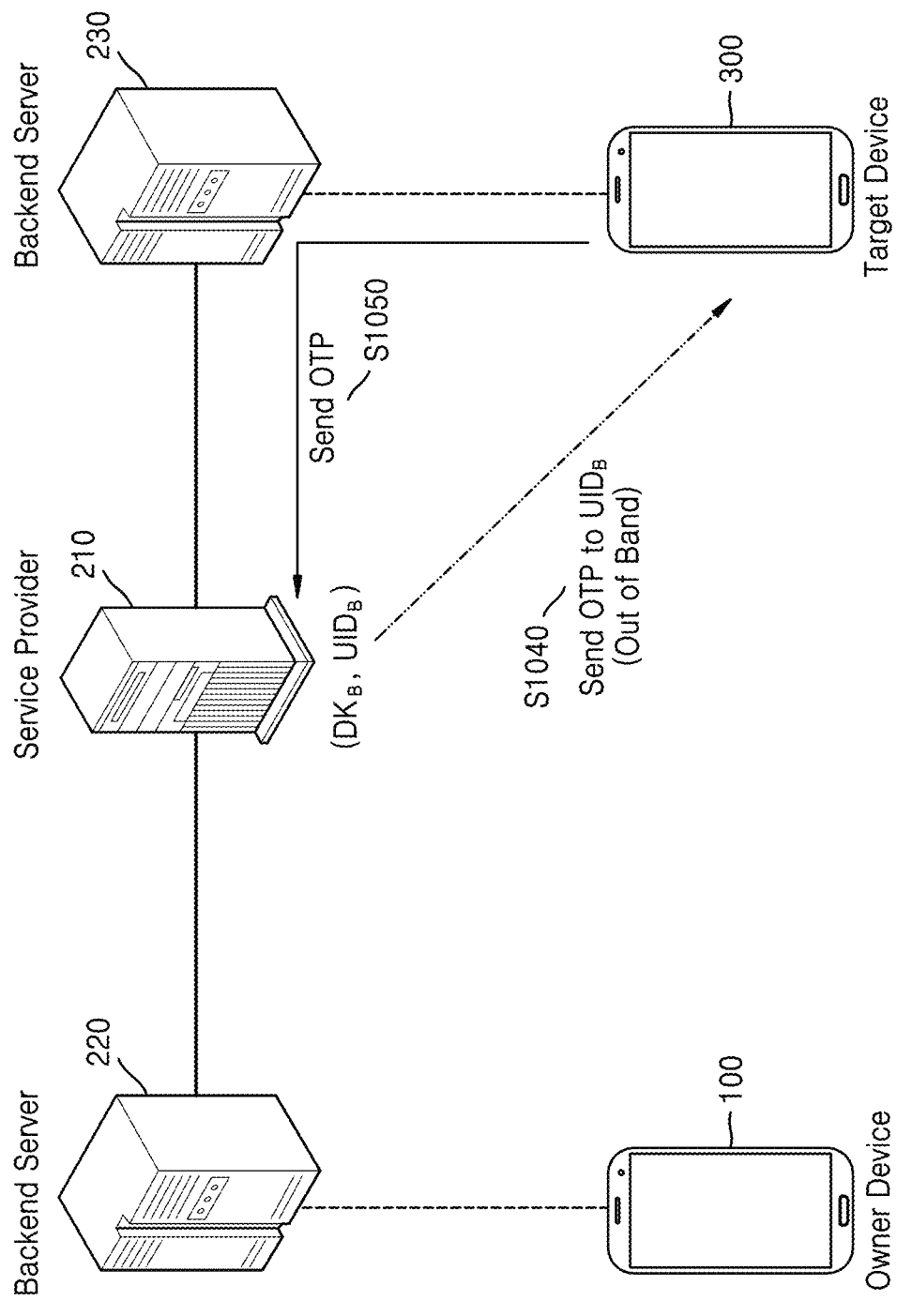

An embodiment shown in FIGS. 10A and 10B proposes a method of issuing the digital key to the target device 300 after performing second authentication by using a separate communication channel for verification of the target device 300.

The embodiment shown in FIGS. 10A and 10B may be additionally applied to the embodiment shown in FIGS. 6A through 6D, the embodiment shown in FIGS. 7A through 7C, the embodiment shown in FIGS. 8A through 8D, and the embodiment shown in FIGS. 9A through 9D.

FIG. 10A illustrates a process by which the owner device 100 issues the digital key of the target device 300.

In operation S1010, the owner device 100 obtains $PK_B$.

In operation S1020, the owner device 100 uses $PK_B$ to generate $DK_B$ that is the digital key of the target device 300.

Operations S1010 and S1020 may be performed by using the above-described methods. Thus, additional descriptions are not be provided.

In operation S1030, the owner device 100 transmits $DK_B$ and $UID_B$ to the service provider server 210 via the first backend server 220. The service provider server 210 stores $DK_B$ and $UID_B$.

$UID_B$ may be user information of the target device 300. The user of the target device 300 may be an owner of the target device 300. The user of the target device 300 may be a friend to whom the user of the owner device 100 wants to lend his/her property (for example, a vehicle) by issuing the digital key.

$UID_B$ may include the user information of the target device 300 (for example, a name, phone number, or email address of the friend, the friend's ID registered in the service provider server 210, or the friend's ID registered in the second backend server 230). $UID_B$ may be generated by using information that is previously stored in the owner device 100. $UID_B$ may be the third ID described with reference to FIGS. 4 and 5.

FIG. 10B illustrates a process by which the service provider server 210 performs the second authentication by using the separate communication channel to verify the user of the target device 300.

In operation S1040, the service provider server 210 transmits a onetime passcode (OTP) to the target device 300 via a second communication channel by using $UID_B$ information. The second communication channel may be, for example, a short message service (SMS), an email, a messenger service, or an application of the service provider server 210 capable of receiving a push notification from a server.

The OTP is arbitrary information generated by the service provider server 210, valid only for a certain period of time, and then discarded afterwards.

In operation S1050, the target device 300 transmits the OTP to the service provider server 210 via the second backend server 230. The target device 300 may sign the OTP with a secret key SKB corresponding to $PK_B$, and additionally transmit a value obtained by signing the OTP with SKB.

Figure 10C:
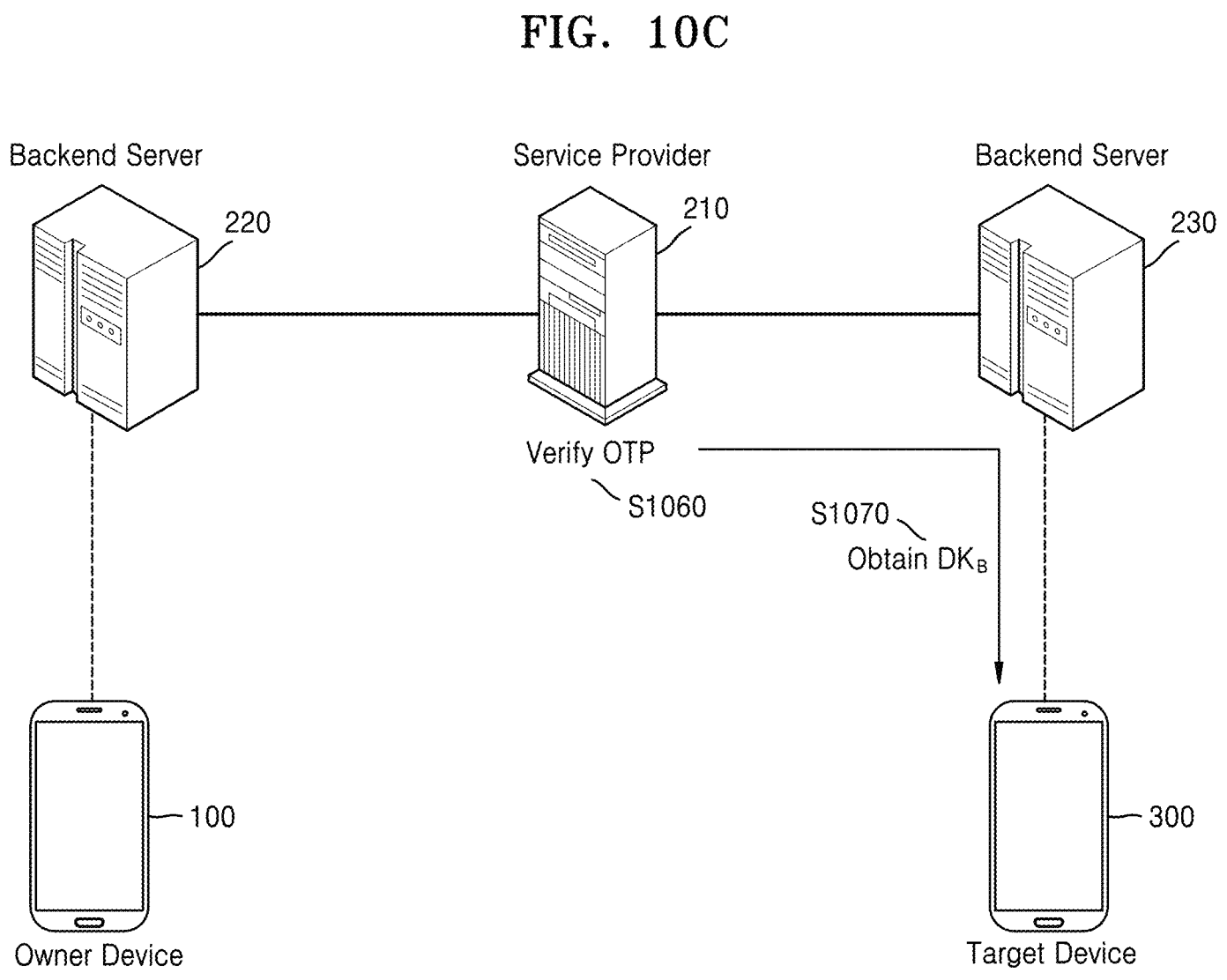

FIG. 10C illustrates a process of transmitting the digital key after the service provider server 210 verifies the target device 300 via OTP verification.

In operation S1060, the service provider server 210 verifies the OTP received from the target device 300.

In operation S1060, the service provider server 210 may perform following verification.

First, the service provider server 210 verifies whether the OTP is valid. Then, the service provider server 210 identifies whether the OTP is transmitted by the target device 300 corresponding to the valid $eID_B$. The signature of the target device 300 with respect to the OTP is verified with $PK_B$.

In operation S1070, the target device 300 obtains the digital key $DK_B$ from the service provider server 210 via the second backend server 230.

Figure 11A:
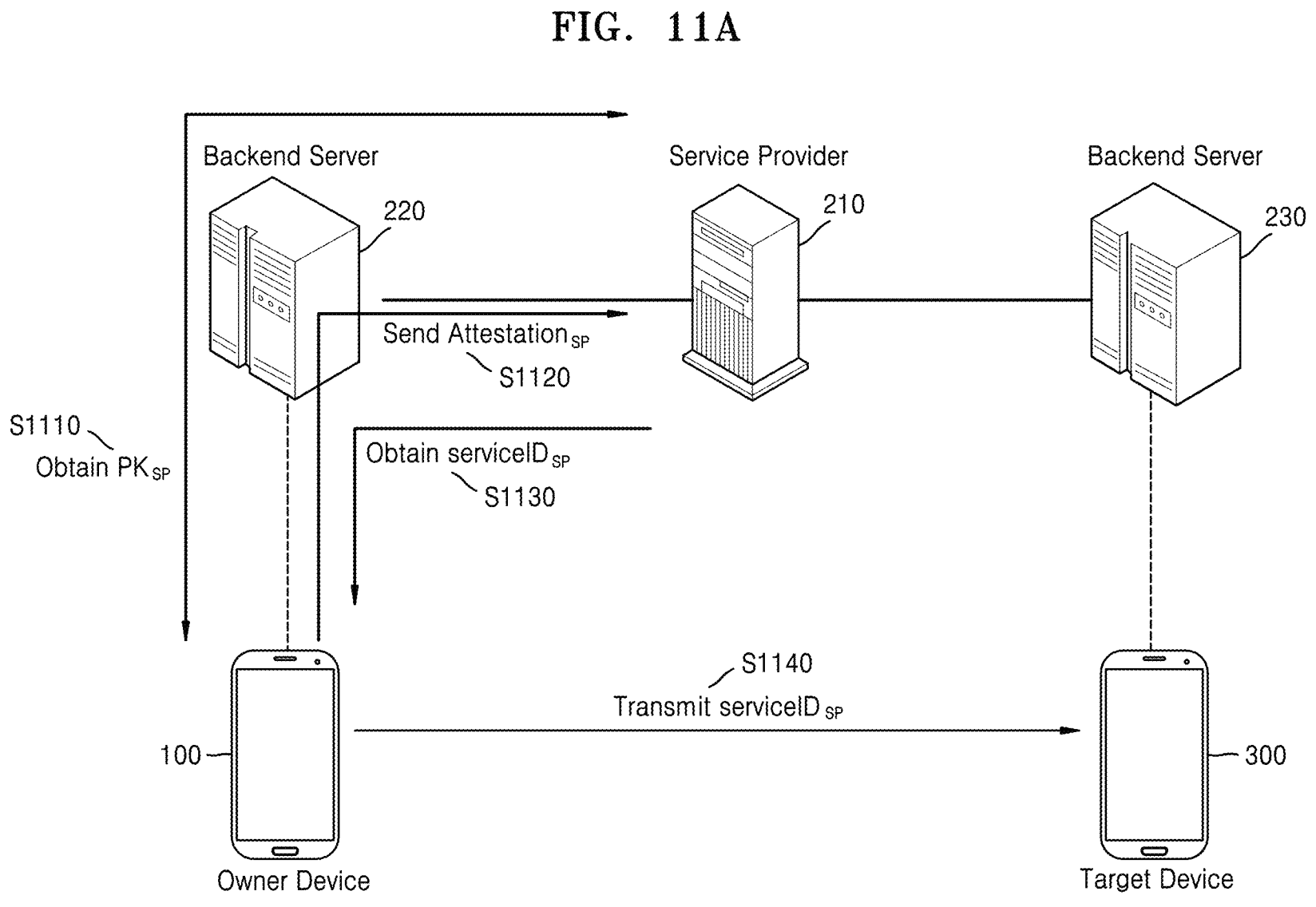
Figure 11B:
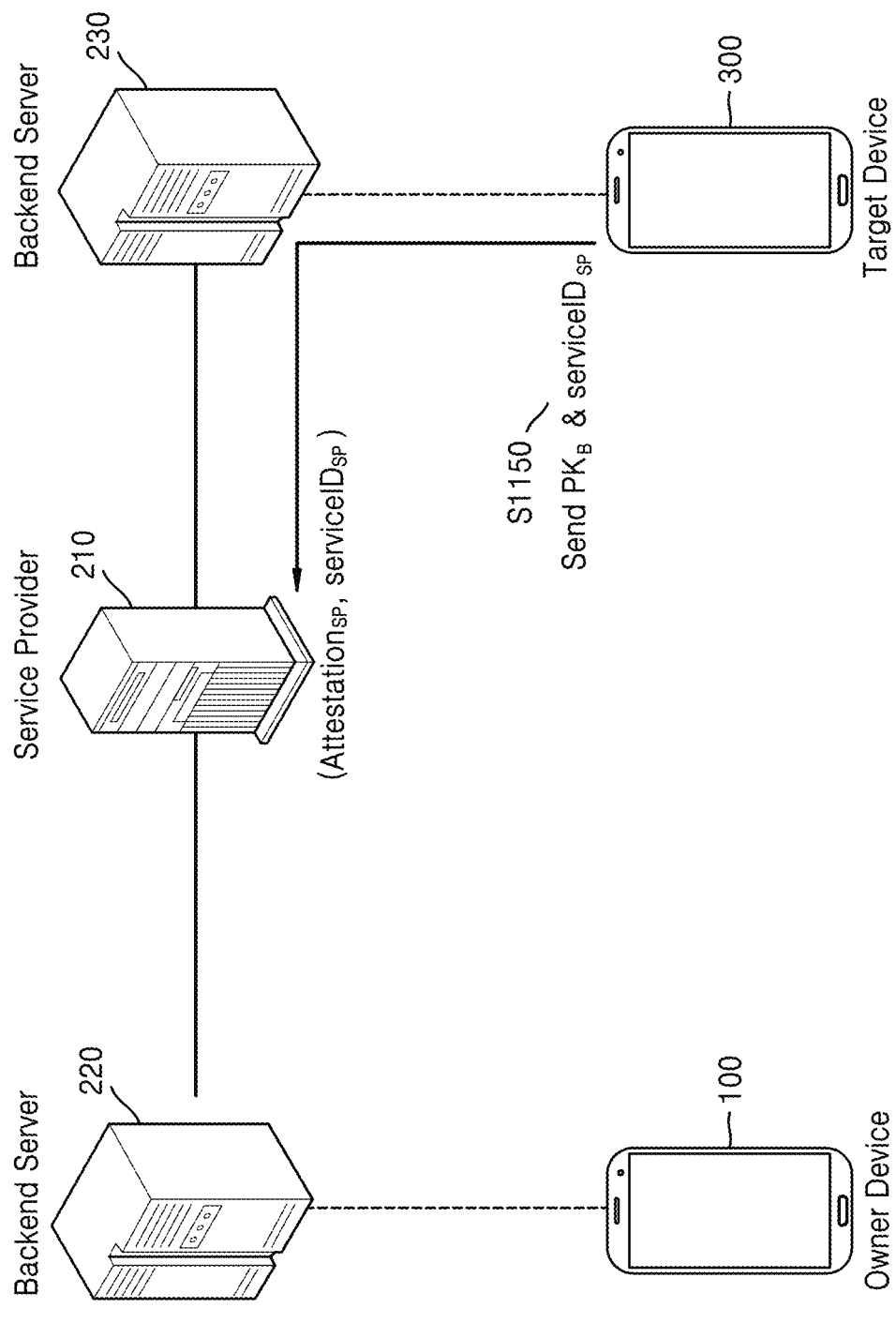
Figure 11C:
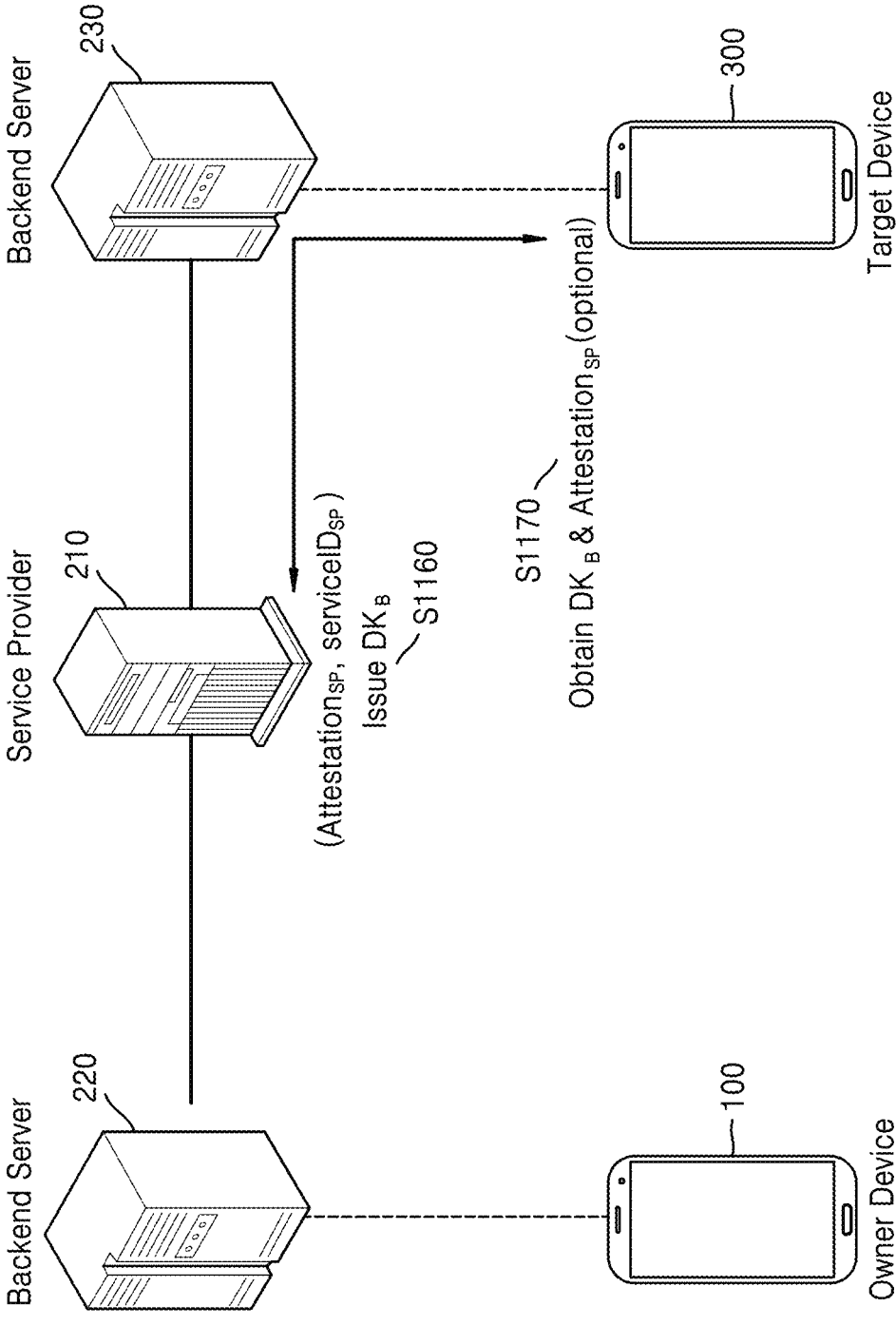

Meanwhile, an embodiment shown in FIGS. 11A through 11C proposes a method by which the service provider server 210 issues the digital key to the target device 300, on behalf of the owner device 100.

FIG. 11A illustrates a process in which the owner device 100 assigns, to the service provider server 210, authority to issue the digital key, such that the service provider server 210 is able to issue the digital key for the target device 300, on behalf of the owner device 100.

In operation S1110, the owner device 100 obtains a public key $PK_{SP}$ of the service provider server 210 from the service provider server 210 via the first backend server 220.

When the service provider server 210 issues the digital key on behalf of the owner device 100, the service provider server 210 uses the secret key $SK_{SP}$ to sign the public key of the target device. $PK_{SP}$ is the public key pairing up with the secret key $SK_{SP}$.

The service provider server 210 may generate a new $PK_{SP}$ each time for issuing a digital key a single time. Alternatively, according to a policy, one $PK_{SP}$ may be used to issue the digital key a plurality of times.

In operation S1120, the owner device 100 transmits $Attestation_{SP}$ to the service provider server 210 via the first backend server 220.

$Attestation_{SP}$ is an attestation indicating that the owner device 100 has allowed the issuance of the digital key. $Attestation_{SP}$ includes information obtained as the owner device 100 signs $PK_{SP}$ of the service provider server 210 with its secret key. For example, $Attestation_{SP}$ may include the public key $PK_{SP}$ of the service provider server 210, a series of data, and the signature of the owner device 100. The series of data may include information related to the use of the digital key and/or information related to the issue of the digital key.

For example, the series of data may include the range of functions of the electronic device 10 available to the target device 300 by the digital key and the validity period of the digital key. For example, Attestation$_{SP}$ may include information about a range of functions of a vehicle usable by the target device 300 by using the digital key issued by the service provider server 210.

As another example, the series of data may include a range of authority signable by the service provider server 210 on behalf of the owner device 100. An example in which the target device 300 is able to have control authority for all functions of the vehicle, for example, open or close a door of the vehicle, open or close a trunk, start an engine, and the like, by using the digital key issued by the owner device 100 will be described. On the other hand, the target device 300 may be assigned with control authority for only some functions as stated in Attestation$_{SP}$, when the digital key issued by the service provider server 210 is used. In other words, the service provider server 210 may be set to issue the digital key capable of assigning the control authority for only some functions as stated in Attestation$_{SP}$. For example, issuance authority of the service provider server 210 may be restricted to issue only a digital key capable of controlling opening and closing of the door of the vehicle.

A following authentication process may be performed while the owner device 100 obtains PK$_{SP}$ and transmits Attestation$_{SP}$ in operations S1110 and S1120.

First, the owner device 100 may identify a digital key issuance intention of the user. For example, the owner device 100 may identify whether the user intends to issue the digital key via a method, such as biometric authentication.

Then, authentication may be performed between the first backend server 220 and the owner device 100, and server authentication may be performed between the first backend server 220 and the service provider server 210. Then, service eligibility authentication may be performed between the service provider server 210 and the owner device 100.

In operation S1130, the service provider server 210 generates serviceID$_{SP}$ and transmits serviceID$_{SP}$ to the owner device 100 via the first backend server 220.

serviceID$_{SP}$ may be used to identify an issuance service that is performed by the service provider server 210 during the digital key issuance process.

serviceID$_{SP}$ may be generated each time to issue the digital key a single time. Alternatively, according to a policy, serviceID$_{SP}$ may be generated and used to issue the digital key a plurality of times. serviceID$_{SP}$ may be valid for a certain period of time and discarded after the certain period of time.

serviceID$_{SP}$ may include information of a service provider (for example, a name, an address, or an identifier of the service provider or service provider server 210), and further include a value corresponding to the information (for example, a hash value of the information).

serviceID$_{SP}$ may be used by combining values generated by one or more entities among the owner device 100, the first backend server 220, and the service provider server 210. When necessary, a negotiation procedure may be performed between the three entities to guarantee uniqueness of serviceID$_{SP}$. In the present disclosure, serviceID$_{SP}$ may be referred to as a fourth ID.

In operation S1140, the owner device 100 transmits serviceID$_{SP}$ to the target device 300.

FIG. 11B illustrates a process by which the target device 300 requests the digital key to be used by itself.

In operation S1150, the target device 300 transmits its public key to the service provider server 210 via the second backend server 230.

The target device 300 generates the public key PK$_B$ to be included in the digital key to be used by itself. The target device 300 transmits PK$_B$ and serviceID$_{SP}$ to the second backend server 230. The information transmitted from the target device 300 may include information indicating the service provider server 210 required for an access.

The second backend server 230 determines the service provider server 210 to be accessed by using information received from the target device 300. In this regard, the information indicating the service provider server 210 may be additionally transmitted from the target device 300 to the second backend server 230 or may be included in service-ID$_{SP}$.

Also, the second backend server 230 transmits PK$_B$ and serviceID$_{SP}$ to the service provider server 210.

In operation S1150, following authentication processes may be performed.

First, the target device 300 may identify a digital key request intention of the user of the target device 300. For example, the target device 300 may identify whether the user intends to request the digital key via a method, such as biometric authentication.

Then, authentication may be performed between the second backend server 230 and the target device 300, and authentication may be performed between the second backend server 230 and the service provider server 210.

FIG. 11C illustrates a process by which the service provider server 210 issues the digital key of the target device 300 and the target device 300 finally obtains its digital key.

In operation S1160, the service provider server 210 uses PK$_B$ to generate DK$_B$ that is the digital key of the target device 300. The service provider server 210 may generate the digital key DK$_B$ of the target device 300 by signing the series data including the public key PK$_B$ of the target device 300 by using the private key of the service provider server 210.

The service provider server 210 identifies whether serviceID$_{SP}$ received from the target device 300 is a valid service ID issued by itself. The service provider server 210 generates DK$_B$ after identifying that serviceID$_{SP}$ received from the target device 300 is the valid service ID.

In operation S1170, the target device 300 obtains the digital key from the service provider server 210 via the second backend server 230.

In operation S1170, the target device 300 may identify an intention of the user of the target device 300. For example, the target device 300 may identify whether the user intends to request the digital key via a method, such as biometric authentication. Then, authentication may be performed between the second backend server 230 and the target device 300, and authentication may be performed between the second backend server 230 and the service provider server 210.

In operation S1170, Attestation$_{SP}$ may be additionally transmitted from the service provider server 210 to the target device 300 and stored.

FIG. 12 is a flowchart of a method, performed by an owner device, of transmitting a digital key to a target device, according to an embodiment.

The owner device 100 according to an embodiment may transmit, to the target device 300, the digital key for controlling the electronic device 10 over which the owner device 100 has the control authority. The digital key may be for assigning the control authority to the target device 300 for the electronic device 10 over which the owner device 100 has the control authority.

In operation S1210, the owner device 100 according to an embodiment may transmit digital key configuration data.

The digital key configuration data may include information to be provided by the owner device 100 to generate the digital key. The digital key configuration data may include the series of data included in the digital key described above. For example, the digital key configuration data may include at least one of the range of control authority assigned to the target device 300 and the validity period of the digital key.

The owner device 100 according to an embodiment may transmit the digital key configuration data to the service provider server 210 via the first backend server 220. In response to the transmission of the digital key configuration data, the owner device 100 may receive an ID from the service provider server 210 via the first backend server 220. The owner device 100 may transmit the ID to the target device 300.

The ID may perform a function of transaction ID during the whole digital key sharing process. The ID may include information of the service provider server (for example, a name, an address, or an identifier of a service provider or service provider server 210), and further include a value corresponding to the information (for example, a hash value of the information). The ID may include information of the user of the owner device 100 (for example, an owner of the owner device 100), such as a phone number or vehicle information of the user of the owner device 100, and further include a value corresponding to the information. The value corresponding to the information of the user of the owner device 100 may include, for example, a hash value of the information.

When the owner device 100 receives the ID, authentication may be performed between at least two of the owner device 100, the first backend server 220, and the service provider server 210. After the authentication is performed, the ID may be received from the service provider server 210 via the first backend server 220.

The owner device 100 according to another embodiment may transmit the digital key configuration data to the target device 300.

In operation S1220, the owner device 100 according to an embodiment may receive a digital key attestation including the public key of the target device 300, the digital key configuration data, and the signature of the target device 300.

According to an embodiment, the owner device 100 may receive the digital key attestation from the service provider server 210 via the first backend server 220. Alternatively, the owner device 100 may receive the digital key attestation from the target device 300.

The owner device 100 may receive the digital key attestation from the service provider server 210 via the first backend server 220. The digital key attestation may further include the signature of the service provider server 210.

According to another embodiment, the owner device 100 may receive the digital key attestation from the target device 300.

In operation S1230, the owner device 100 according to an embodiment may generate a digital key sharing attestation including the public key of the target device 300, the digital key configuration data, the signature of the target device 300, and the signature of the owner device 100.

The owner device 100 may perform authentication on the signature of the target device 300, which is included in the digital key attestation. The owner device 100 may perform authentication on the digital key configuration data included in the digital key attestation. The owner device 100 may generate the digital key sharing attestation by signing the digital key attestation.

In operation S1240, the owner device 100 according to an embodiment may transmit the digital key sharing attestation.

According to an embodiment, the owner device 100 may transmit the digital key sharing attestation to the target device 300 via the first backend server 220, the service provider server 210, and the second backend server 230.

According to another embodiment, the owner device 100 may transmit the digital key sharing attestation directly to the target device 300.

FIG. 13 is a flowchart of a method, performed by a target device, of receiving a digital key from an owner device, according to some embodiments.

The target device 300 according to an embodiment may receive, from the owner device 100, the digital key for controlling the electronic device 10 over which the owner device 100 has the control authority. The digital key may be for assigning the control authority to the target device 300 for the electronic device 10 over which the owner device 100 has the control authority.

In operation S1310, the target device 300 according to an embodiment may receive the digital key configuration data.

The digital key configuration data may include the information to be provided by the owner device 100 to generate the digital key. The digital key configuration data may include the series of data included in the digital key described above. For example, the digital key configuration data may include at least one of the range of control authority assigned to the target device 300 and the validity period of the digital key.

The target device 300 according to an embodiment may receive the ID from the owner device 100. The ID received from the owner device 100 may be an ID described with reference to operation S1210 of FIG. 12. Redundant descriptions are omitted.

The target device 300 may transmit the ID to the service provider server 210 via the second backend server 230. The target device 300 according to an embodiment may perform authentication between at least two of the target device 300, the second backend server 230, and the service provider server 210 when transmitting the ID. After the authentication is performed, the target device 300 may receive the digital key configuration data corresponding to the ID from the service provider server 210 via the second backend server 230.

The target device 300 according to another embodiment may receive the digital key configuration data from the owner device 100.

In operation S1320, the target device 300 according to an embodiment may generate the digital key attestation including the public key of the target device 300, the digital key configuration data, and the signature of the target device 300.

In operation S1330, the target device 300 according to an embodiment may transmit the digital key attestation.

The target device 300 according to an embodiment may transmit the digital key attestation to the service provider server 210 via the second backend server 230.

The target device 300 according to another embodiment may transmit the digital key attestation directly to the owner device 100.

In operation S1340, the target device 300 according to an embodiment may receive the digital key sharing attestation including the public key of the target device 300, the digital key configuration data, the signature of the target device 300, and the signature of the owner device 100.

The target device 300 according to an embodiment may receive the digital key sharing attestation from the service provider server 210 via the second backend server 230. The digital key sharing attestation may further include the signature of the service provider server 210.

The target device 300 according to another embodiment may receive the digital key sharing attestation directly from the owner device 100.

Hereinafter, each embodiment will be described in detail with reference to FIGS. 14A through 14D, 15, 17, and 18.

FIGS. 14A through 14D are diagrams for describing a digital key sharing method according to an embodiment.

Figure 14A:
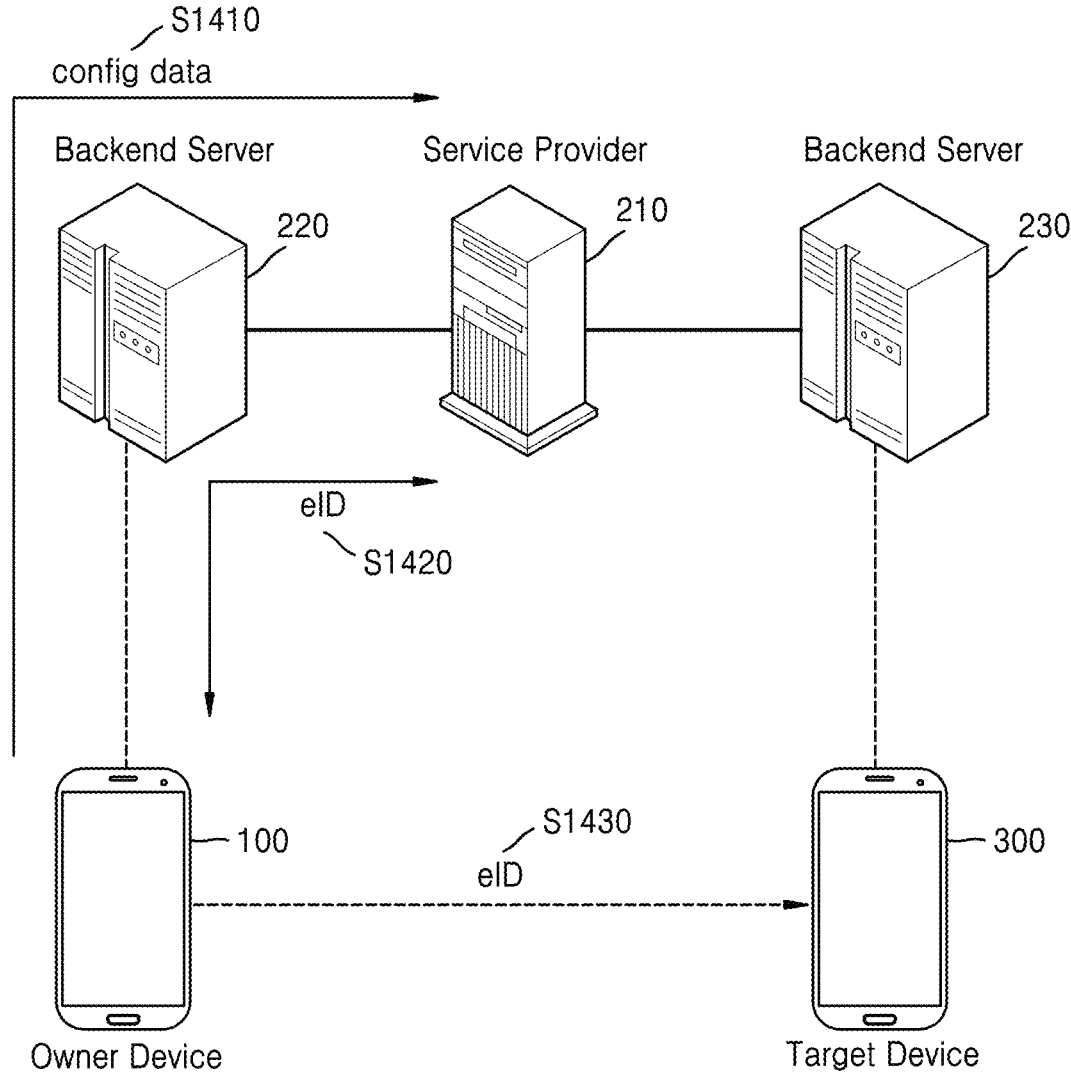
FIGS. 14A through 14D are diagrams for describing a digital key sharing method according to an embodiment.

Referring to FIG. 14A, in operation S1410, the owner device 100 may transmit the digital key configuration data to the service provider server 210 via the first backend server 220. The digital key configuration data may include information to be provided by the owner device 100 to generate the digital key.

Following authentication processes may be performed while the owner device 100 transmits the digital key configuration data to the first backend server 220 and the first backend server 220 transmits the digital key configuration data to the service provider server 210.

For example, the owner device 100 may identify a digital key issuance intention of the user. The owner device 100 may identify whether the user of the owner device 100 is to issue the digital key. For example, the owner device 100 may identify whether the user intends to issue the digital key via a method, such as biometric authentication.

As another example, mutual authentication may be performed between the first backend server 220 and the owner device 100. Authentication between a device and a server may be performed, wherein the first backend server 220 authenticates the owner device 100 and the owner device 100 authenticates the first backend server 220.

As another example, server authentication may be performed between the first backend server 220 and the service provider server 210. The first backend server 220 and the service provider server 210 may identify whether there is a mutual contract for providing a digital key issuance service.

Next, service eligibility authentication may be performed between the service provider server 210 and the owner device 100. The service provider server 210 may authenticate whether the user of the owner device 100 is eligible to receive a corresponding service.

After receiving the digital key configuration data, the service provider server 210 may transmit eID corresponding to the digital key configuration data to the owner device 100 via the first backend server 220, in operation S1420.

eID may perform a function of transaction ID during the whole digital key sharing process. eID may include information of the service provider server 210 (for example, a name, an address, or an identifier of a service provider or service provider server 210), and further include a value corresponding to the information (for example, a hash value of the information). The information about the service provider server 210 included in eID may be used by a device OEM backend server (for example, the first backend server 220 associated with the owner device 100 or the second backend server 230 associated with the target device 300) to identify the service provider server 210.

In operation S1430, the owner device 100 may transmit eID to the target device 300.

Figure 14B:
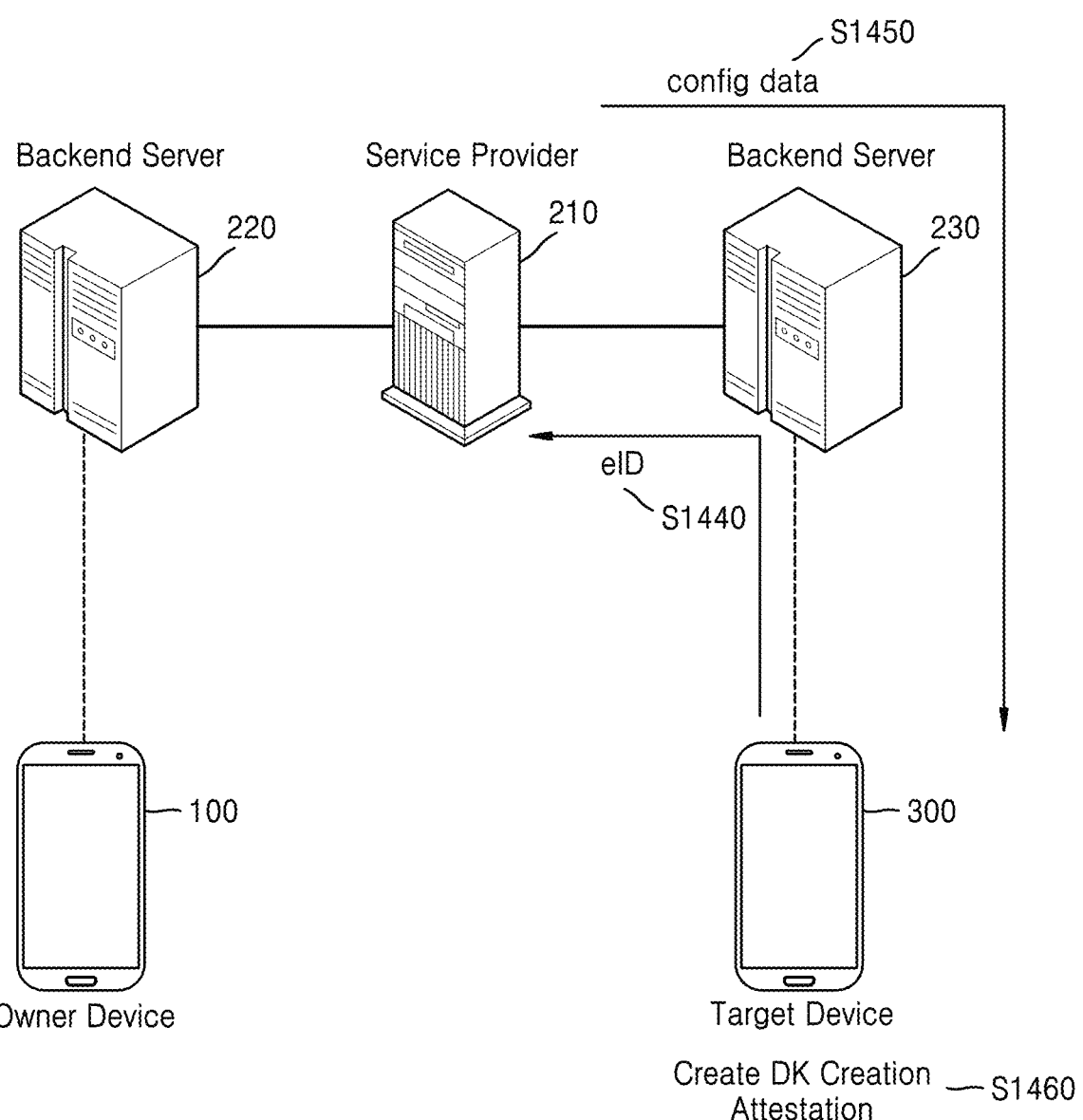

Referring to FIG. 14B, in operation S1440, the target device 300 may transmit eID to the service provider server

210 via the second backend server 230 to request the digital key configuration data. The second backend server 230 may identify the service provider server 210 based on the information about the service provider server 210 included in eID.

Following authentication processes may be performed while the target device 300 transmits eID to the second backend server 230 and the second backend server 230 transmits eID to the service provider server 210.

For example, the target device 300 may identify a digital key request intention of the user of the target device 300. The target device 300 may identify whether the user of the target device 300 is to request the digital key. For example, the target device 300 may identify whether the user intends to request the digital key via a method, such as biometric authentication.

As another example, authentication may be performed between the second backend server 230 and the target device 300. Authentication between a device and a server may be performed, wherein the second backend server 230 authenticates the target device 300 and the target device 300 authenticates the second backend server 230.

As another example, server authentication may be performed between the second backend server 230 and the service provider server 210. The second backend server 230 and the service provider server 210 may identify whether there is a mutual contract for providing a digital key sharing service.

In operation S1450, the service provider server 210 may transmit the digital key configuration data corresponding to eID to the target device 300 via the second backend server 230, in response to the reception of the eID.

In operation S1460, the target device 300 may generate the digital key attestation based on the digital key configuration data received from the service provider server 210. The digital key attestation generated by the target device 300 may be a digital key creation attestation. The digital key attestation generated by the target device 300 may include the series of data and the signature of the target device 300 with respect to the series of data. The series of data may include the digital key configuration data received by the target device 300 and additional information generated by the target device 300. The additional information generated by the target device 300 may include, for example, the public key of the target device 300.

Figure 14C:
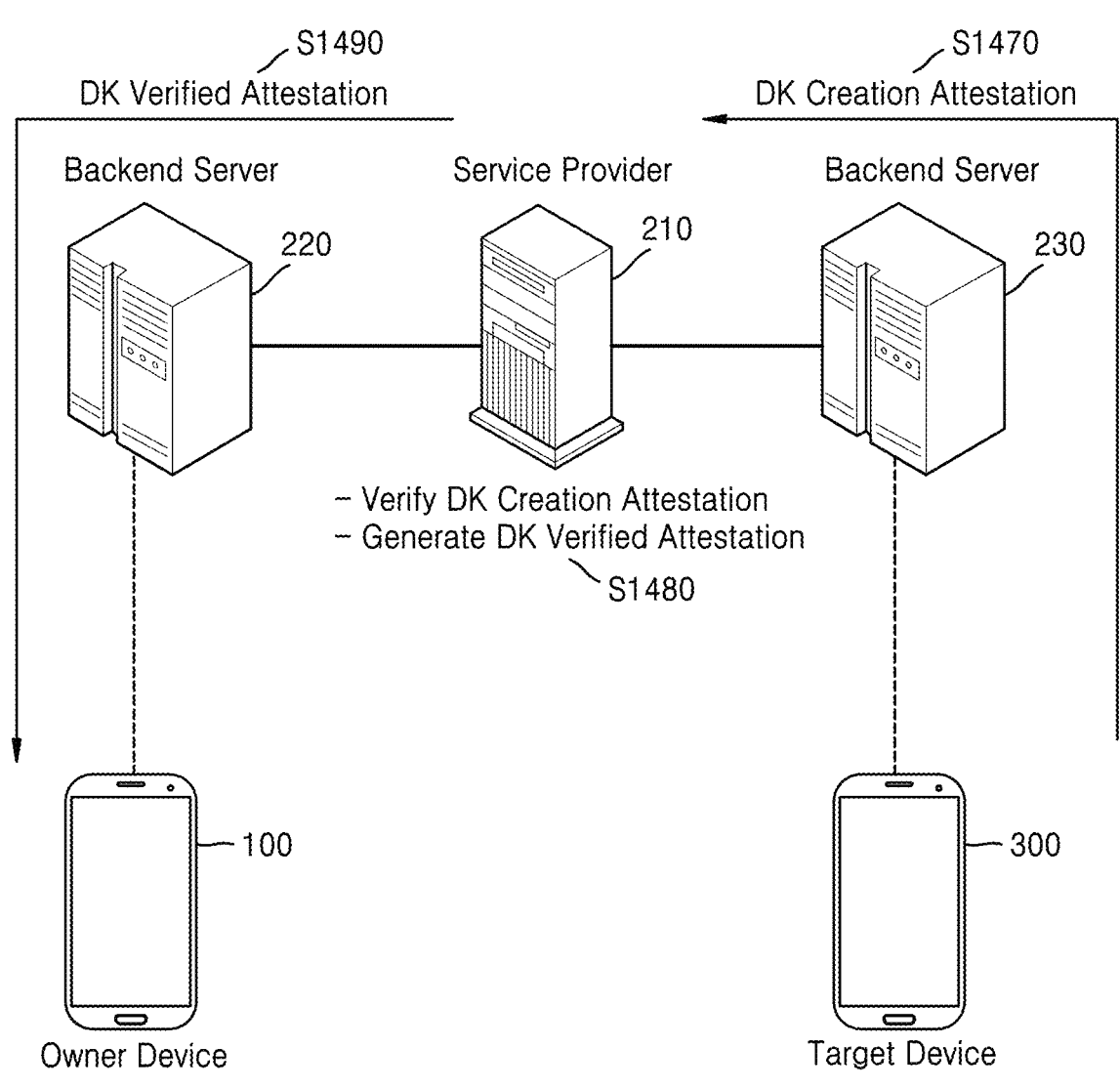

Referring to FIG. 14C, in operation S1470, the target device 300 may transmit the digital key attestation to the service provider server 210 via the second backend server 230.

The target device 300 may transmit, to the second backend server 230, eID, the digital key attestation, and an associated attestation. The associated attestation may be required to authenticate validity of the digital key attestation. The second backend server 230 may transmit, to the service provider server 210, eID, the digital key attestation, and the associated attestation.

The authentication process performed in operation S1440 may be performed again while operation S1470 is performed. Redundant descriptions are omitted.

In operation S1480, the service provider server 210 may authenticate the digital key attestation and generate a digital key verified attestation. The digital key verified attestation generated by the service provider server 210 may include the digital key attestation received from the target device 300 and the signature of the service provider server 210.

The service provider server 210 may authenticate the signature of the digital key attestation by using the associated attestation received from the target device 300. Also, the service provider server 210 may authenticate content of the digital key attestation by using the digital key configuration information stored in the service provider server 210. The service provider server 210 may generate the digital key verified attestation by signing the digital key attestation.

In operation S1490, the service provider server 210 may transmit the digital key verified attestation to the owner device 100 via the first backend server 220.

The service provider server 210 may transmit eID and the digital key verified attestation to the first backend server 220. The first backend server 220 may transmit eID and the digital key verified attestation to the owner device 100.

The authentication process performed in operation S1410 may be performed again while operation S1490 is performed. Redundant descriptions are omitted.

In operation S14100, the owner device 100 may generate the digital key sharing attestation based on the digital key verified attestation generated by the service provider server 210. To generate the digital key sharing attestation, the owner device 100 may authenticate the digital key verified attestation generated by the service provider server 210 again.

For example, the owner device 100 may verify the signature of the service provider server 210 included in the digital key verified attestation generated by the service provider server 210 or verify the content of the digital key configuration data included in the digital key verified attestation.

The digital key sharing attestation may include the digital key verified attestation generated by the service provider server 210 and the signature of the owner device 100. The owner device 100 may generate the digital key sharing attestation by signing the digital key attestation.

Figure 14D:
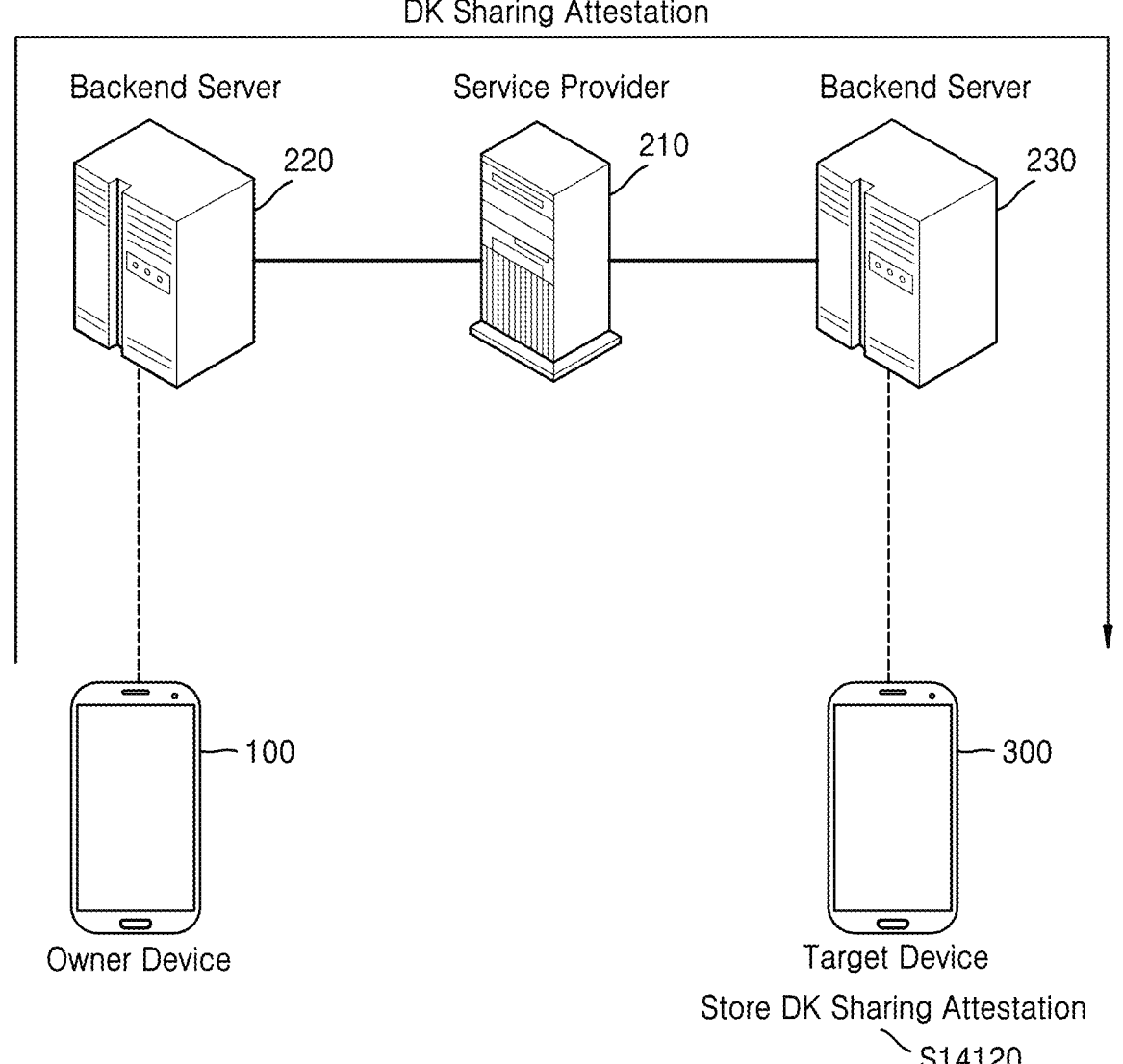

Referring to FIG. 14D, in operation S14110, the owner device 100 may transmit the digital key sharing attestation to the target device 300.

The owner device 100 may transmit eID and the digital key sharing attestation to the first backend server 220. The first backend server 220 may transmit eID and the digital key sharing attestation to the service provider server 210. The service provider server 210 may transmit eID and the digital key sharing attestation to the second backend server 230. The second backend server 230 may transmit eID and the digital key sharing attestation to the target device 300.

The authentication process performed in operations describe d above may be performed again while operation S14110 is performed. Redundant descriptions are omitted.

In operation S14120, the target device 300 may receive and store the digital key sharing attestation. The target device 300 may control the electronic device 10 by using the digital key sharing attestation.

Figure 15:
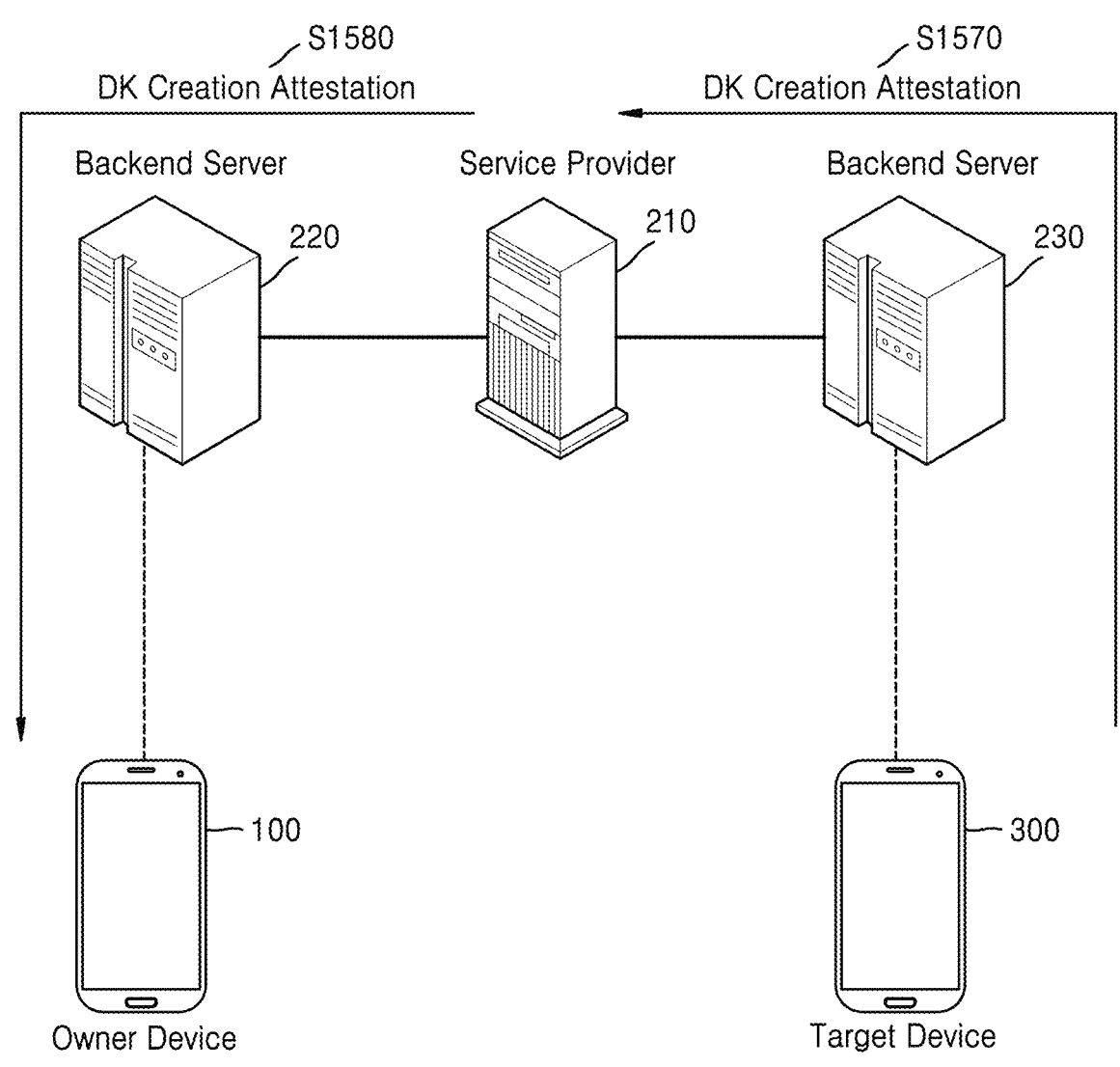
FIG. 15 is a diagram for describing a digital key sharing method according to an embodiment.

FIG. 15 is a diagram for describing a digital key sharing method according to another embodiment.

The digital key sharing method according to the other embodiment may include operations S1410 to S1460 and S14110 and S14120 of FIGS. 14A, 14B, and 14D, and may include operations S1570 to S1590 of FIG. 15 instead of operations S1470 to S14100 of FIG. 14C.

According to the other embodiment, as shown in FIG. 15, the authentication process for the digital key in the service provider server 210 may be omitted.

When the target device 300 generates the digital key attestation, the digital key attestation may be transmitted to the service provider server 210 via the second backend server 230 in operation S1570. The target device 300 may transmit, to the second backend server 230, eID, the digital key attestation, and the associated attestation. The associated attestation may be required to authenticate validity of the digital key attestation. The second backend server 230 may transmit, to the service provider server 210, eID, the digital key attestation, and the associated attestation.

The authentication process performed in operation S1440 of FIG. 14B may be performed again while operation S1570 is performed. Redundant descriptions are omitted.

In operation S1580, the service provider server 210 may transmit the digital key attestation to the owner device 100 via the first backend server 220.

The service provider server 210 may transmit eID, the digital key attestation, and the associated attestation to the first backend server 220. The first backend server 220 may transmit eID, the digital key attestation, and the associated attestation to the owner device 100.

The authentication process performed in operation S1410 may be performed again while operation S1580 is performed. Redundant descriptions are omitted.

In operation S1590, the owner device 100 may generate the digital key sharing attestation based on the digital key attestation. The owner device 100 may authenticate the digital key attestation to generate the digital key sharing attestation. The digital key sharing attestation may include the digital key attestation and the signature of the owner device 100.

The owner device 100 may authenticate the signature of the digital key attestation by using the received associated attestation. Also, the owner device 100 may authenticate the content of the digital key attestation by using the digital key configuration information stored in the owner device 100. The owner device 100 may generate the digital key sharing attestation by signing the digital key attestation. Also, the owner device 100 may transmit the digital key sharing attestation to the target device 300.

As described above, the owner device 100 may transmit the digital key to the target device 300 via the first and second backend servers 220 and 230, and the service provider server 210. However, the present disclosure is not limited by these embodiments.

Figure 16:
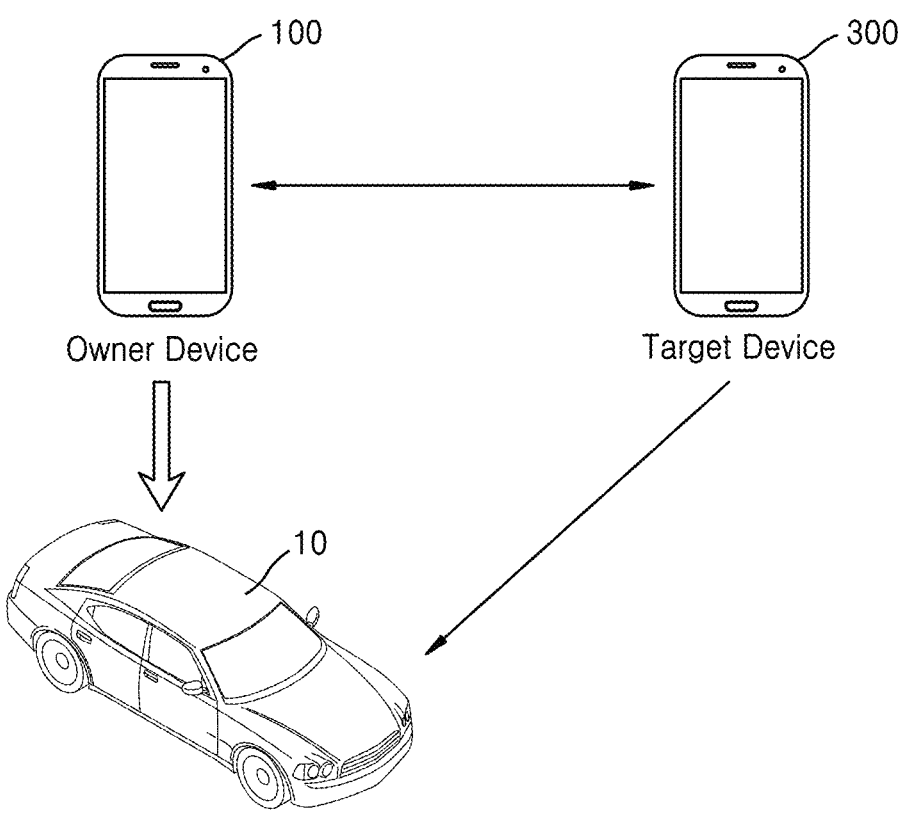
FIG. 16 is a diagram for describing a system for sharing a digital key, according to various embodiments.

As shown in FIG. 16, the owner device 100 according to various embodiments may share the digital key for the control authority of the electronic device 10 by directly communicating with the target device 300. For example, the owner device 100 and the target device 300 may perform a digital key sharing process by using a short range wireless communication method, such as near field communication (NFC). Hereinafter, a method of sharing a digital key as the owner device 100 directly communicates with the target device 300 will be described in detail with reference to FIGS. 17 and 18.

Figure 17:
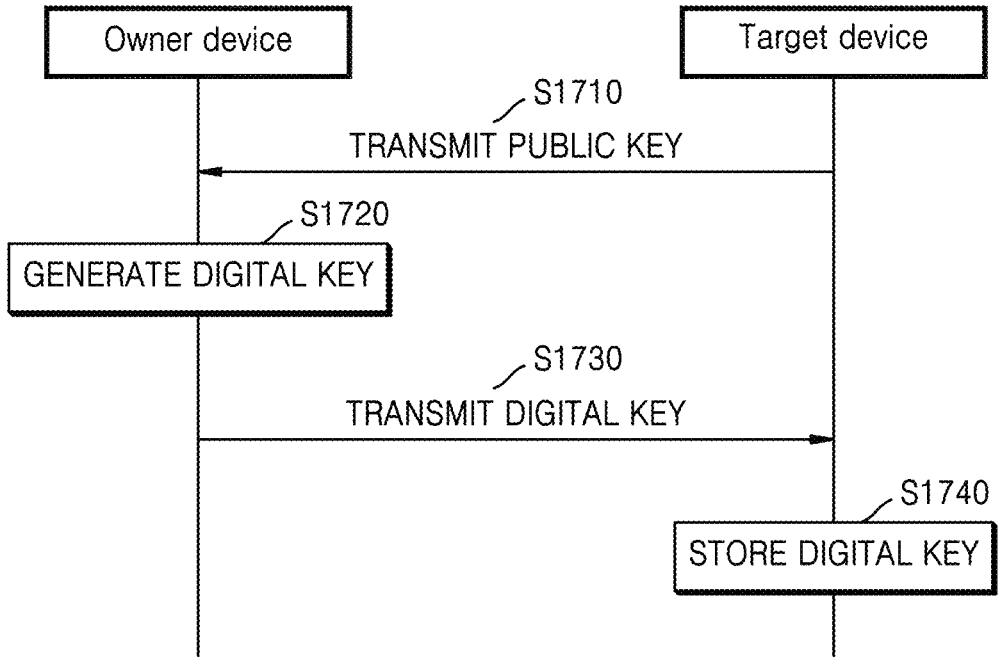
FIG. 17 is a flowchart of a method, performed by an owner device, of transmitting a digital key to a target device, according to an embodiment.

FIG. 17 is a flowchart of a method, performed by an owner device, of transmitting a digital key to a target device, according to an embodiment.

In operation S1710, the target device 300 according to an embodiment may transmit the public key. The target device 300 may generate the public key to be included in the digital key to be used by itself and transmit the public key to the owner device 100. The owner device 100 may receive the public key of the target device 300 from the target device 300.

In operation S1720, the owner device 100 may generate the digital key. The owner device 100 may generate the digital key of the target device 300 by using the public key of the target device 300. The owner device 100 may generate the digital key of the target device 300 by signing the series data including the public key of the target device 300 by using the private key of the owner device 100.

In operation S1730, the owner device 100 may transmit the digital key to the target device 300. In operation S1740, the target device 300 may store the received digital key.

Figure 18:
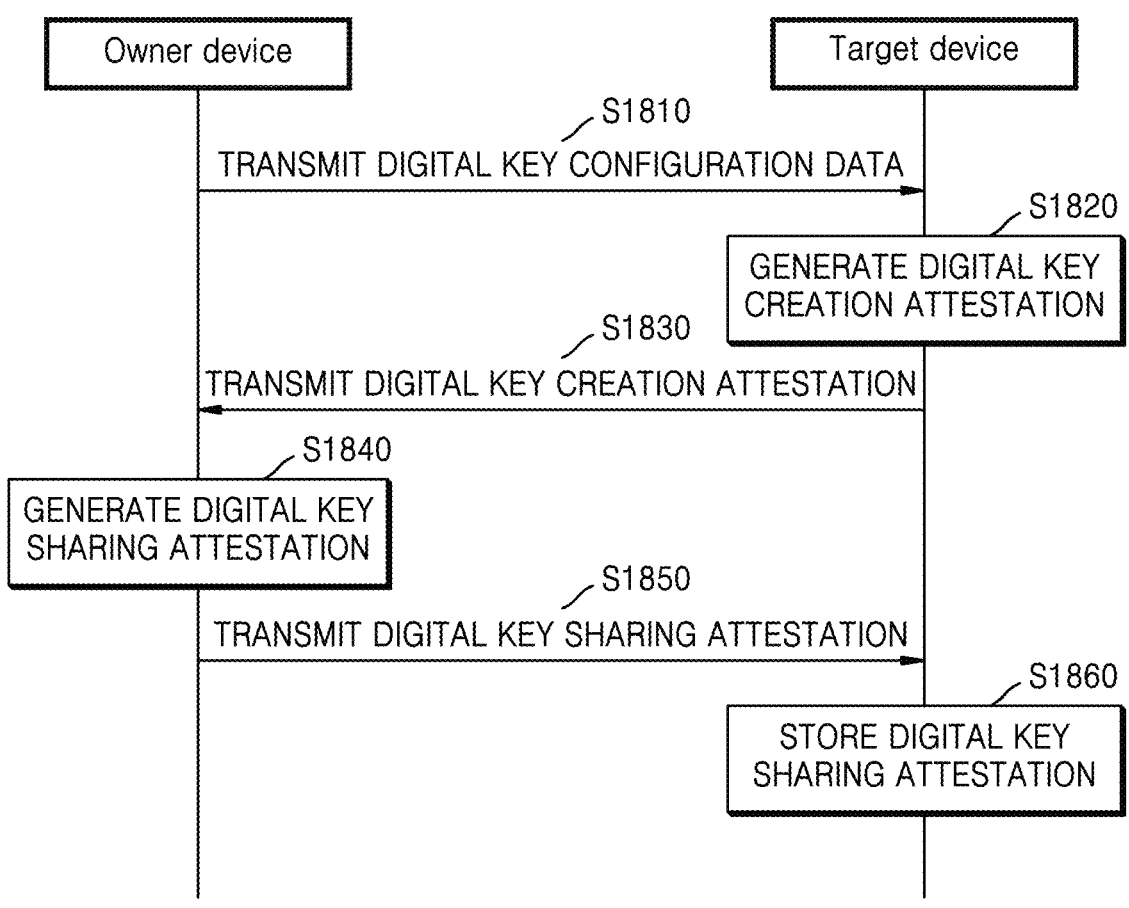
FIG. 18 is a flowchart of a method, performed by an owner device, of transmitting a digital key to a target device, according to an embodiment.

FIG. 18 is a flowchart of a method, performed by an owner device, of transmitting a digital key to a target device, according to an embodiment.

In operation S1810, the owner device 100 according to an embodiment may transmit digital key configuration data to the target device 300. The digital key configuration data may include information to be provided by the owner device 100 to generate the digital key. For example, the digital key configuration data may include at least one of the range of control authority assigned to the target device 300 and the validity period of the digital key.

In operation S1820, the target device 300 according to an embodiment may generate the digital key creation attestation.

The target device 300 may generate the digital key creation attestation based on the digital key configuration data received from the owner device 100. The digital key creation attestation generated by the target device 300 may include the series of data and the signature of the target device 300 with respect to the series of data. The series of data may include the digital key configuration data received by the target device 300 and additional information generated by the target device 300. The additional information generated by the target device 300 may include, for example, the public key of the target device 300.

In operation S1830, the target device 300 according to an embodiment may transmit the digital key creation attestation directly to the owner device 100. The owner device 100 may receive the digital key creation attestation from the target device 300. The target device 300 may further transmit the associated attestation to the owner device 100. The associated attestation may be required to authenticate the validity of the digital key creation attestation.

In operation S1840, the owner device 100 according to an embodiment may generate the digital key sharing attestation. The owner device 100 may generate the digital key sharing attestation based on the digital key creation attestation. The owner device 100 may authenticate the digital key creation attestation to generate the digital key sharing attestation. The digital key sharing attestation may include the digital key creation attestation and the signature of the owner device 100.

The owner device 100 may authenticate the signature of the digital key creation attestation by using the received associated attestation. Also, the owner device 100 may authenticate the content of the digital key creation attestation by using the digital key configuration information stored in the owner device 100. The owner device 100 may generate the digital key sharing attestation by signing the digital key creation attestation.

In operation S1850, the owner device 100 according to an embodiment may transmit the digital key sharing attestation to the target device 300. In operation S1860, the target device 300 may store the received digital key.

Hereinafter, configurations of the owner device 100 and the target device 300 will be described. In the present specification, for convenience of description, the owner device 100 and the target device 300 are distinguished from each other, but the owner device 100 and the target device 300 may both be electronic devices, such as user equipments (UEs).

The UEs may include a personal computer, a cellular phone, a smart phone, a television (TV), a tablet computer, a laptop computer, a personal digital assistant (PDA), a portable multimedia player (PMP), a navigation device, an MP3 player, and a digital camera. The examples are not limited thereto and the UEs may include various devices.

While sharing the digital key, the owner device 100 may be a subject issuing the digital key or assigning issuance authority of the digital key. The target device 300 may be a subject receiving the digital key. Thus, a device may be an owner device or a target device depending on an operation performed during the digital key sharing process.

Figure 19:
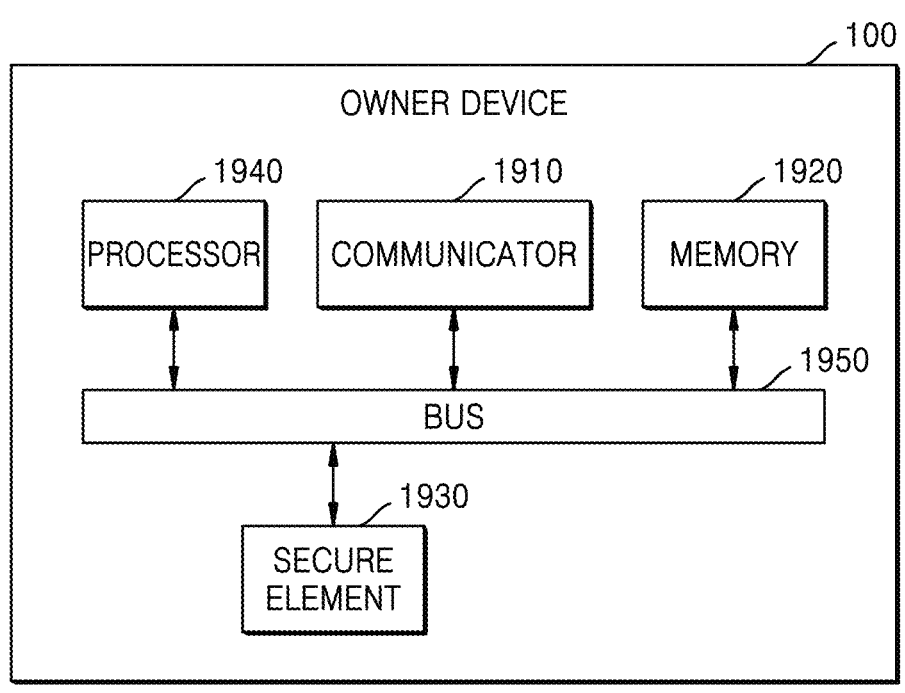
FIG. 19 is a diagram showing a configuration of an owner device, according to an embodiment.

FIG. 19 is a diagram showing a configuration of the owner device 100, according to an embodiment.

Referring to FIG. 19, the owner device 100 may include a communicator 1910, a memory 1920, a secure element 1930, a processor 1940, and a bus 1950 connecting components to each other. However, the owner device 100 may include more or fewer components than those shown in FIG. 19.

In FIG. 19, the owner device 100 includes one processor, but an embodiment is not limited thereto and the owner device 100 may include a plurality of processors. Hereinafter, at least some of operations and functions of the processor 1940 described below may be performed by a plurality of processors. The owner device 100 of FIG. 19 may perform the digital key sharing method according to various embodiments of the present disclosure, and descriptions of FIGS. 4 through 11B may be applied thereto. Thus, overlapping details thereof are not provided again.

The communicator 1910 may perform wired/wireless communication with another device, server, or network. In this regard, the communicator 1910 may include a communication module supporting at least one of various wired/wireless communication methods. For example, the communication module may be in a form of a chipset or may be a sticker/barcode (for example, a sticker including an NFC tag) including information required for communication.

The wireless communication may include, for example, at least one of cellular communication, wireless fidelity (Wi-Fi), Wi-Fi direct, Bluetooth, ultra-wide band (UWB), or NFC. The wired communication may include, for example, at least one of universal serial bus (USB) or high-definition multimedia interface (HDMI).

According to an embodiment, the communicator 1910 may include a communication module for short range communication. For example, the communicator 1910 may include a communication module for performing various short range communications, such as infrared communication, magnetic secure transmission (MST), and magnetic secure communication, in addition to Wi-Fi, Wi-Fi direct, Bluetooth, and NFC described above.

A program such as an application and various types of data such as a file may be installed and stored in the memory 1920. The processor 1940 may access and use the data stored in the memory 1920 or may store new data in the memory 1920. According to an embodiment, a program and data for processing the digital key may be installed and stored in the memory 1920. However, an embodiment of the present disclosure is not limited thereto, and the program and data for processing the digital key may be installed and stored in the secure element 1930.

The secure element 1930 is a secure storage device of the owner device 100, and is a secure region to which only an authenticated application is accessible. The secure element 1930 may be configured to be separated from a general storage area in terms of software or may be configured to be physically separated from the memory 1920.

The processor 1940 may control overall operations of the owner device 100 and include at least one processor, such as a central processing unit (CPU) or a graphics processing unit (GPU). The processor 1940 may control other components included in the owner device 100 to perform an operation for sharing the digital key. The processor 1940 may control other components included in the owner device 100 to perform operations of issuing the digital key and transmitting the digital key to the target device 300.

The processor 1940 may execute a program stored in the memory 1920 and the secure element 1930, read a file stored in the memory 1920 and the secure element 1930, or store a new file in the memory 1920 and the secure element 1930.

Also, the processor 1940 may transmit/receive data to/from the first backend server 220, the target device 300, or the service provider server 210. For example, the processor 1940 may transmit, to the first backend server 220, an ID, public key, and attestation for identifying a device. The processor 1940 may control the communicator 1910 to request the first backend server 220 to transmit data. For example, the processor 1940 may request the first backend server 220 for the ID or public key. According to some embodiments of the present disclosure, the processor 1940 may perform authentication with at least one of the first backend server 220 and the service provider server 210.

The bus 1950 is a common data transmission path connecting the communicator 1910, the memory 1920, the secure element 1930, and the processor 1940.

According to some embodiments of the present disclosure, the communicator 1910 may receive the public key generated by the target device 300 from the service provider server 210 via the first backend server 220. The processor 1940 may generate the digital key including data including the received public key, and a signature regarding the data. The communicator 1910 may transmit the digital key to the target device 300 via the first backend server 220 and the service provider server 210.

Meanwhile, according to an embodiment of the present disclosure, in which the owner device 100 assigns the issuance authority of the digital key to the service provider server 210, the communicator 1910 may receive the public key $PK_{SP}$ of the service provider server 210 from the service provider server 210 via the first backend server 220. The processor 1940 may generate an attestation including the data including the received public key, and the signature regarding the data. The communicator 1910 may transmit Attestation$_{SP}$ to the service provider server 210 via the first backend server 220.

According to some embodiments of the present disclosure, the owner device 100 may share the digital key by directly communicating with the target device 300. For example, the communicator 1910 of the owner device 100 may communicate with the target device 300 by using a short range wireless communication method, such as NFC, Wi-Fi direct, Bluetooth, or ultra-wideband (UWB).

The communicator 1910 of the owner device 100 according to an embodiment may receive the public key of the target device 300 from the target device 300. Also, the processor 1940 of the owner device 100 may generate the digital key including the public key and a signature regarding the public key. The communicator 1910 may transmit the digital key to the target device 300.

The communicator 1910 of the owner device 100 according to an embodiment may transmit the digital key configuration data, and receive the digital key attestation including the public key of the target device 300, the digital key configuration data, and the signature of the target device 300. In addition, the processor 1940 of the owner device 100 may generate the digital key sharing attestation including the public key of the target device 300, the digital key configuration data, the signature of the target device 300, and the signature of the owner device 100. The communicator 1910 may transmit the generated digital key sharing attestation.

Figure 20:
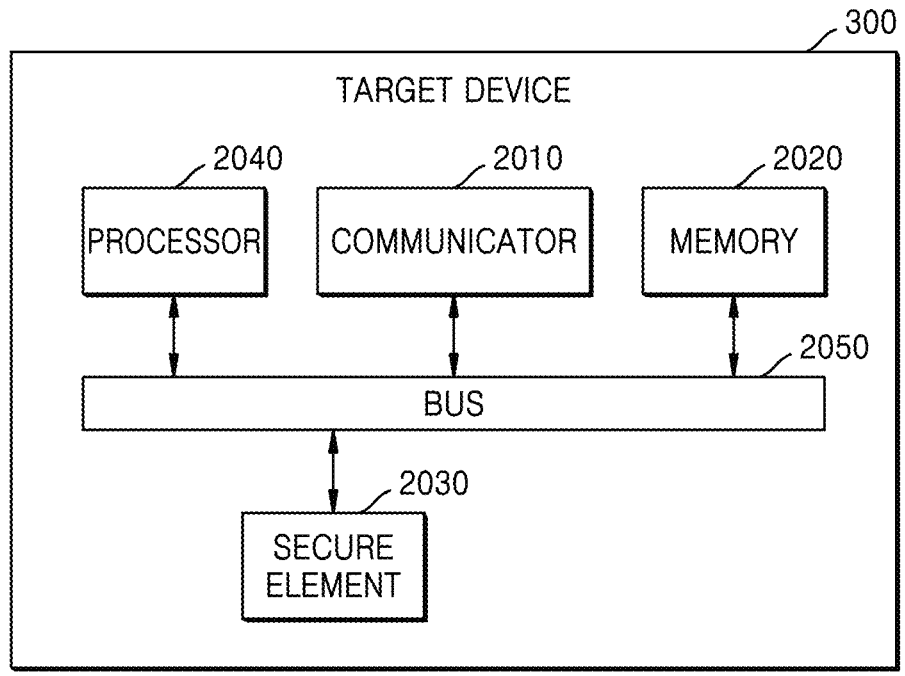
FIG. 20 is a diagram showing a configuration of a target device, according to an embodiment.

FIG. 20 is a diagram showing a configuration of the target device 300, according to an embodiment.

Referring to FIG. 20, the target device 300 may include a communicator 2010, a memory 2020, a secure element 2030, a processor 2040, and a bus 2050 connecting components to each other. However, the target device 300 may include more or fewer components than those shown in FIG. 20.

In FIG. 20, the target device 300 includes one processor, but an embodiment is not limited thereto and the target device 300 may include a plurality of processors. Hereinafter, at least some of operations and functions of the processor 2040 described below may be performed by a plurality of processors. The target device 300 of FIG. 20 may perform the digital key sharing method according to various embodiments of the present disclosure, and descriptions of FIGS. 4 through 18 may be applied thereto. Thus, overlapping details thereof are not provided again.

The communicator 2010 may perform wired/wireless communication with another device, server, or network. In this regard, the communicator 2010 may include a communication module supporting at least one of various wired/wireless communication methods. For example, the communication module may be in a form of a chipset or may be a sticker/barcode (for example, a sticker including an NFC tag) including information required for communication.

The wireless communication may include, for example, at least one of cellular communication, wireless fidelity (Wi-Fi), Wi-Fi direct, Bluetooth, ultra-wide band (UWB), or NFC. The wired communication may include, for example, at least one of universal serial bus (USB) or high-definition multimedia interface (HDMI).

According to an embodiment, the communicator 2010 may include a communication module for short range communication. For example, the communicator 2010 may include a communication module for performing various short range communications, such as infrared communication, magnetic secure transmission (MST), and magnetic secure communication, in addition to Wi-Fi, Wi-Fi direct, Bluetooth, and NFC described above.

A program such as an application and various types of data such as a file may be installed and stored in the memory 2020. The processor 2040 may access and use the data stored in the memory 2020 or may store new data in the memory 2020. According to an embodiment, a program and data for processing the digital key may be installed and stored in the memory 2020. However, an embodiment of the present disclosure is not limited thereto, and the program and data for processing the digital key may be installed and stored in the secure element 2030.

The secure element 2030 is a secure storage device of the target device 300, and is a secure region to which only an authenticated application is accessible. The secure element 2030 may be configured to be separated from a general storage area in terms of software or may be configured to be physically separated from the memory 2020.

The processor 2040 may control overall operations of the target device 300 and include at least one processor, such as a CPU or a GPU. The processor 2040 may control other components included in the target device 300 to perform an operation for sharing the digital key. The processor 2040 may control other components included in the target device 300 to perform operations of receiving the digital key and controlling the electronic device 10 by using the digital key.

The processor 2040 may execute a program stored in the memory 2020 and the secure element 2030, read a file stored in the memory 2020 and the secure element 2030, or store a new file in the memory 2020 and the secure element 2030.

Also, the processor 2040 may transmit/receive data to/from the second backend server 230, the owner device 100, or the service provider server 210. For example, the processor 2040 may transmit, to the second backend server 230, an ID, public key, and OTP for identifying a device. The processor 2040 may control the communicator 2010 to request the second backend server 230 to transmit data. For example, the processor 2040 may request the second backend server 230 for the ID or public key. According to some embodiments of the present disclosure, the processor 2040 may perform authentication with at least one of the second backend server 230 and the service provider server 210.

The bus 2050 is a common data transmission path connecting the communicator 2010, the memory 2020, the secure element 2030, and the processor 2040.

According to some embodiments of the present disclosure, the communicator 2010 may transmit the public key to the owner device 100. The communicator 2010 may transmit the public key to the owner device 100 via the second backend server 230, the service provider server 210, and the first backend server 220. Also, the communicator 2010 may receive, from the owner device 100, the digital key including the data including the public key, and the signature of the owner device 100 regarding the data. The processor 2040 may control the electronic device 10 over which the owner device 100 has the control authority, by using the received digital key.

According to an embodiment of the present disclosure, in which the digital key is issued to the target device 300 by the service provider server 210, the communicator 2010 may receive the ID from the owner device 100. The communicator 2010 may transmit the public key and ID of the target device 300 to the service provider server 210, based on the ID. The processor 2040 may receive the digital key including the data including the public key, and the signature of the service provider server 210 regarding the data, from the service provider server 210 via a backend server. The processor 2040 may control the electronic device 10 over which the owner device 100 has the control authority, by using the digital key.

According to some embodiments of the present disclosure, the target device 300 may share the digital key by directly communicating with the owner device 100. For example, the communicator 2010 of the target device 300 may communicate with the owner device 100 by using a short range wireless communication method, such as NFC, Wi-Fi direct, Bluetooth, or ultra-wideband (UWB).

The communicator 2010 of the target device 300 according to an embodiment may transmit the public key to the owner device 100 and receive, from the owner device 100, the digital key including the data including the public key, and the signature of the owner device 100 regarding the data. Also, the processor 2040 of the target device 300 may control the electronic device 10 over which the owner device 100 has the control authority, by using the digital key.

The communicator 2010 of the target device 300 according to an embodiment may receive the digital key configuration data. In addition, the processor 2040 of the target device 300 may generate the digital key attestation including the public key of the target device 300, the digital key configuration data, and the signature of the target device 300. The communicator 2010 may transmit the digital key attestation and receive the digital key sharing attestation including the public key of the target device 300, the digital key configuration data, the signature of the target device 300, and the signature of the owner device 100.

Figure 21:
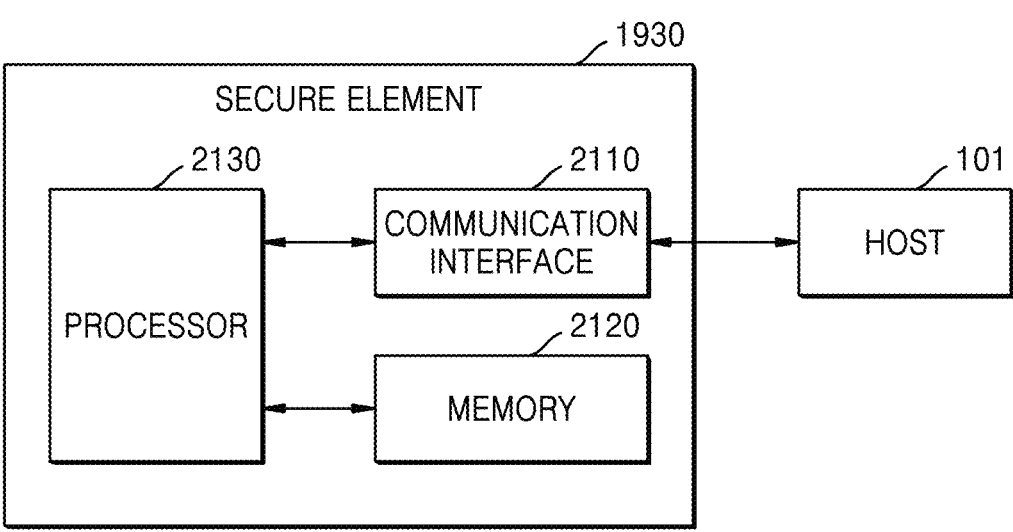
FIG. 21 is a diagram showing a configuration of a secure element, according to an embodiment.

FIG. 21 is a diagram showing a configuration of a secure element, according to an embodiment.

Referring to FIG. 21, the secure element 1930 may include a communication interface 2110, a memory 2120, and a processor 2130.

The secure element 1930 is a secure storage device of the owner device 100, and is a secure region to which only an authenticated application is accessible. According to an embodiment, the secure element 1930 may include an embedded secure element (eSE), a universal integrated circuit card (UICC), a secure digital (SD) card, an embedded UICC (eUICC), and/or a trusted execution environment (TEE).

The communication interface 2110 may communicate with a host 101. According to an embodiment, the communication interface 2110 may include at least one of various wired/wireless communication interfaces for communicating with the host 101. Here, the host 101 may be one of devices included in the owner device 100 and for example, may include an application processor (AP), a memory, or the like. The communication interface 2110 may be, for example, a serial interface such as ISO 7816, universal serial bus (USB), an inter-integrated circuit (I2C), a serial peripheral interface (SPI), a single wire protocol (SWP), and/or UWB, or any serial interface generally used for communication between two hardware devices. Alternatively, the communication interface 2110 may be a wireless interface, such as ISO 14443, Zigbee, Bluetooth, or the like, which directly connects an antenna to a hardware device. In addition, the communication interface 2110 may be a parallel interface connected to a central bus of the owner device 100, and in this case, the communication interface 2110 may include a buffer for receiving a command and data from the host 101.

A program such as an application and various types of data such as a file may be installed and stored in the memory 2120. The processor 2130 may access and use the data stored in the memory 2120 or may store new data in the memory 2120. According to an embodiment, a program and data for processing the digital key may be installed and stored in the memory 2120.

The processor 2130 may control overall operations of the secure element 1930 and include at least one processor, such as a CPU or a GPU. The processor 2130 may control other components included in the secure element 1930 to perform an operation for processing the digital key. For example, the processor 2130 may execute a program stored in the memory 2120, read a file stored in the memory 2120, or store a new file in the memory 2120. According to an embodiment, the processor 2130 may execute a program stored in the memory 2120 to perform an operation for processing the digital key.

The secure element 1930 of FIG. 19 corresponds to the secure element 2030 of FIG. 20. Thus, the descriptions of FIG. 21 may be identically applied in relation to the secure element 2030 of FIG. 20.

The embodiments may be implemented as a software program that includes instructions stored on computer-readable storage media.

A computer is an apparatus capable of calling a stored instruction from a storage medium and operating according to the embodiment according to the called instruction, and may include an image transmitting apparatus and an image receiving apparatus according to the embodiments.

A computer-readable storage medium may be provided in the form of a non-transitory storage medium. The term "non-transitory" only means that a storage medium does not include a signal and is tangible, and does not distinguish whether data is stored in the storage medium semi-permanently or temporarily.

Furthermore, an electronic device or a method according to the embodiments may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program distributed electronically via a manufacturer of an electronic device or an electronic market. For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a terminal, in a system including a server and a terminal (for example, a backend server and a device). Alternatively, when there is a third device, e.g., a smartphone, that communicates with a server or a terminal, the computer program product may include a storage medium of the third device. Alternatively, the computer program product may include the software program transmitted from the server to the terminal or the third device, or transmitted from the third device to the terminal.

In this case, one of the server, the terminal, and the third device may perform a method according to the embodiments by executing the computer program product. Alternatively, two or more of the server, the terminal, and the third device may perform the method according to the embodiments in a distributed fashion by executing the computer program product.

For example, a server, for example, a cloud server or an artificial intelligence server, may execute the computer program product stored in the server to control the terminal communicatively connected to the server to perform the method according to the embodiments.

In another example, the third device may execute the computer program product to control the terminal communicatively connected to the third device to perform the method according to the embodiment. In detail, the third device may remotely control an image transmitting apparatus and an image receiving apparatus to transmit or receive a packet image.

When the third device executes the computer program product, the third device may download the computer program product from the server and execute the downloaded computer program product. Alternatively, the third device may execute a computer program product provided in a preloaded state to perform the method according to the embodiments.

What is claimed is:

1. A method, performed by an owner device in a wireless communication system, the method comprising:
transmitting, to a friend device, key configuration data;
receiving, from the friend device, certification information signed by a private key of the friend device, the certification information including a public key of the friend device;
generating a key attestation based on the certification information and the key configuration data; and
transmitting, to the friend device, information including the key attestation.

2. The method of claim 1,
wherein the key configuration data comprises at least one of a validity period of a digital key or a range of access right assigned to the friend device.

3. The method of claim 1,
wherein the key configuration data comprises information about at least one of whether the friend device is able to open or close a door of a vehicle, whether the friend device is able to open or close a door of a trunk, or whether the friend device is able to start an engine.

4. The method of claim 1,
wherein generating the key attestation includes signing the public key of the friend device included in the certificate information by using a private key of the owner device.

5. The method of claim 1,
wherein the key attestation includes a signature with the private key of the owner device.

6. A method, performed by a friend device in a wireless communication system, the method comprising:
receiving, from an owner device, key configuration data;
generating, based on the key configuration data, certification information signed by a private key of the friend device, the certification information including a public key of the friend device;
transmitting, to the owner device, the certification information; and
receiving, from the owner device, information including a key attestation.

7. The method of claim 6,
wherein the key configuration data comprises at least one of a validity period of a digital key or a range of access right assigned to the friend device.

8. The method of claim 6,
wherein the key configuration data comprises information about at least one of whether the friend device is able to open or close a door of a vehicle, whether the friend device is able to open or close a door of a trunk, or whether the friend device is able to start an engine.

9. The method of claim 6,
wherein the key attestation is signed using a private key of the owner device based on the public key of the friend device included in the certificate information.

10. The method of claim 6,
wherein the key attestation includes a signature with the private key of the owner device.

11. An owner device in a wireless communication system, the owner device comprising:
memory storing one or more instructions; and
at least one processor configured to execute the one or more instructions to:
transmit, to a friend device, key configuration data;
receive, from the friend device, certification information signed by a private key of the friend device, the certification information including a public key of the friend device;

generate a key attestation based on the certification information and the key configuration data; and transmit, to the friend device, information including the key attestation.

12. The owner device of claim 11, wherein the key configuration data comprises at least one of a validity period of a digital key or a range of access right assigned to the friend device.

13. The owner device of claim 11, wherein the key configuration data comprises information about at least one of whether the friend device is able to open or close a door of a vehicle, whether the friend device is able to open or close a door of a trunk, or whether the friend device is able to start an engine.

14. The owner device of claim 11, wherein the at least one processor is further configured to execute the one or more instructions to sign the public key of the friend device included in the certificate information by using a private key of the owner device.

15. The owner device of claim 11, wherein the key attestation includes a signature with the private key of the owner device.

16. A friend device in a wireless communication system, the friend device comprising:

memory storing one or more instructions; and at least one processor configured to execute the one or more instructions to:

receive, from an owner device, key configuration data;

generate, based on the key configuration data, certification information signed by a private key of the friend device, the certification information including a public key of the friend device;

transmit, to the owner device, the certification information; and receive, from the owner device, information including a key attestation.

17. The friend device of claim 16, wherein the key configuration data comprises at least one of a validity period of a digital key or a range of access right assigned to the friend device.

18. The friend device of claim 16, wherein the key configuration data comprises information about at least one of whether the friend device is able to open or close a door of a vehicle, whether the friend device is able to open or close a door of a trunk, or whether the friend device is able to start an engine.

19. The friend device of claim 16, wherein the key attestation is signed using a private key of the owner device based on the public key of the friend device included in the certificate information.

20. The friend device of claim 16, wherein the key attestation includes a signature with the private key of the owner device.

* * * * *